United States Patent [19]
Dieterle et al.

[11] Patent Number: 6,091,887
[45] Date of Patent: Jul. 18, 2000

[54] METHOD AND APPARATUS FOR CONTROLLING A PHYSICAL PARAMETER

[75] Inventors: Roland Dieterle, St. Georgen; Arno Karwath, Rottweil; Herman Rappenecker, Vohrenbach, all of Germany

[73] Assignee: Papst-Motoren GmbH & Co. KG, St. Georgen, Germany

[21] Appl. No.: 09/077,650

[22] PCT Filed: Nov. 26, 1996

[86] PCT No.: PCT/EP96/05216

§ 371 Date: Jun. 2, 1998

§ 102(e) Date: Jun. 2, 1998

[87] PCT Pub. No.: WO97/21268

PCT Pub. Date: Jun. 12, 1997

[30]  Foreign Application Priority Data

Dec. 4, 1995 [DE] Germany ............ 195 45 109

[51] Int. Cl.[7] .................................................. H02P 5/17
[52] U.S. Cl. .................. 388/811; 388/819; 318/599; 702/79
[58] Field of Search ................. 388/800–811; 312/432, 434, 811, 599; 375/238; 702/79

[56]  References Cited

U.S. PATENT DOCUMENTS

| | | | |
|---|---|---|---|
| 3,873,897 | 3/1975 | Mueller | 318/138 |
| 4,024,445 | 5/1977 | Tokuda et al. | 318/318 |
| 4,471,281 | 9/1984 | Uezumi | 318/606 |
| 4,488,096 | 12/1984 | Cap | 318/328 |
| 4,749,927 | 6/1988 | Rodal | 318/599 |
| 4,829,218 | 5/1989 | Bauer | 388/811 |
| 4,871,952 | 10/1989 | Ishizaka | 388/829 |
| 4,876,491 | 10/1989 | Squires | 318/138 |
| 4,979,055 | 12/1990 | Squires | 360/69 |
| 5,065,341 | 11/1991 | Gruner | 364/516 |
| 5,410,229 | 4/1995 | Sebastian et al. | 318/434 |
| 5,590,235 | 12/1996 | Rappenecker | 388/803 |

FOREIGN PATENT DOCUMENTS

| | | |
|---|---|---|
| 0 352 397 | 1/1990 | European Pat. Off. . |
| 14 63 140 | 7/1969 | Germany . |
| 19 32 574 | 1/1970 | Germany . |
| 19 45 944 | 3/1971 | Germany . |

(List continued on next page.)

OTHER PUBLICATIONS

Friedrich Fröhr et al., *Einführung in die elektronische Regelungstechnik*, [Introduction to Electronic Control Technology], 4th Edition, 1976, Siemens AG, Berlin & Munich, pp. 1–20.

(List continued on next page.)

*Primary Examiner*—David Martin
*Attorney, Agent, or Firm*—Milton, Oliver, Ware, Fressola, Van der Sluys & Adolphson LLP

[57]  ABSTRACT

The invention relates to a method for adjusting a real value (actual value) of a physical quantity to a preset value (target value) with the following steps:

(a) the difference between the target value and the actual value (referred to below as the control deviation) and its sign (referred to below as the control sign) is determined repeatedly at interval; (b) the control deviation is converted into at least one electrical signal during or after each measurement, and the duration thereof (referred to below as the control deviation duration) is proportional to the absolute value of the control deviation at least in the range of the target value, and the value thereof is a function of the control sign; (c) the charge of an analog electrical memory arrangement is affected by this at least one electrical signal during the control deviation duration; (d) depending on the value of the charge of the memory arrangement, the physical quantity is directly or indirectly affected to keep it in the range of the target value. Said control method, which is partially based on analog and partially on digital components produces, for a motor which uses a microprocessor for commutating or controlling, a rotation speed controller with a very simple structure.

47 Claims, 35 Drawing Sheets

FOREIGN PATENT DOCUMENTS

| | | |
|---|---|---|
| 23 46 380 C3 | 11/1974 | Germany . |
| 25 26 044 | 1/1976 | Germany . |
| 27 55 343 C2 | 6/1979 | Germany . |
| 30 44 027 A1 | 8/1981 | Germany . |
| 30 33 889 A1 | 4/1982 | Germany . |
| 31 15 243 C2 | 4/1982 | Germany . |
| 32 35 774 | 3/1984 | Germany . |
| 36 43 221 A1 | 6/1988 | Germany . |
| 38 12 185 A1 | 10/1988 | Germany . |
| 275 128 A1 | 1/1990 | Germany . |
| 42 19 775 A1 | 11/1993 | Germany . |
| 43 40 947 C1 | 12/1994 | Germany . |
| 44 41 372 A1 | 6/1995 | Germany . |
| 44 08 442 A1 | 9/1995 | Germany . |
| 1 506 033 | 4/1978 | United Kingdom . |

OTHER PUBLICATIONS

Walter Wilke, "Bürstenlose Gleichstrommotoren," [Brushless DC Motors] in *Feinwerktechnik& Messtechnik*, vol. 96, No. 4, 1988, Carl Hansen Verlag, Munich, pp. 163–169.

U. Claussen et al., "Motorregelung mit Mikrorechner," [Motor Control with Microcontrollers] in *Regelungstechnische Praxis*, vol. 12, 1978, pp. 355–359.

Derwent WPI English abstract of Kessler/Siemens DE 30 33 889, publ. Apr. 15, 1982.

Derwent WPI English abstract of Mueller/Papst DE 30 44 027, publ. Aug. 27, 1981.

Derwent WPI English abstract of CAP+ /Papst DE 31 15 243, publ. Mar. 11, 1982.

Derwent WPI English abstract of Ebina+ Ishizaka/Jidosha DE 38 12 185, publ. Oct. 27, 1988.

Derwent WPI English abstract of BOOGK/VEB Starkstrom DD 275,128, publ. Jan. 10, 1990.

Derwent WPI English abstract of Schlegel/M.A.N.–Roland DE 43 40 947, publ. Dec. 22, 1994.

Derwent WPI English abstract of Jeske+ Rappenecker JP 7–0194 170, publ. Jul. 28, 1995.

Derwent WPI English abstract of Hacker+ /Temic DE 44 08 442, publ. Sep. 14, 1995.

"Microchip PIC16C5X EPROM–based 8–bit CMOS Microcontroller Series," copyright 1994 by Microchip, Inc., pp. 1–60.

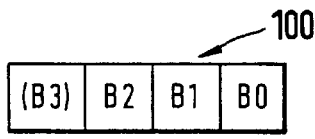
Fig.2
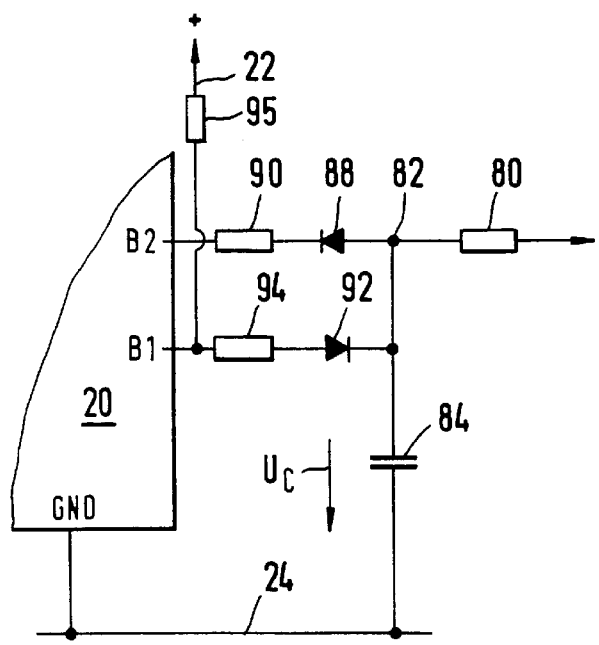
Fig.3
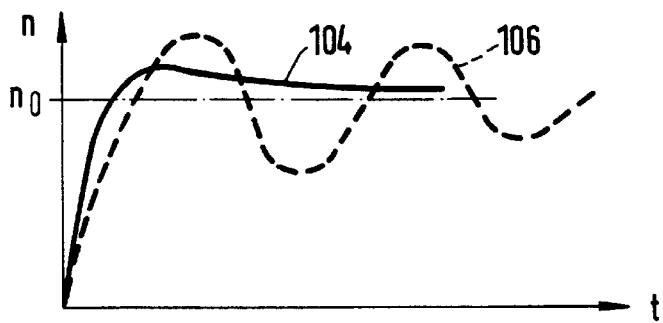
Fig.4
Fig.5

| S356 | S358 | S360 | |
|---|---|---|---|
| 0 | 0 | 0 | n1 |
| 1 | 0 | 0 | n2 |
| 0 | 1 | 0 | n3 |
| 1 | 1 | 0 | n4 |
| 0 | 0 | 1 | n5 |
| 1 | 0 | 1 | n6 |
| 0 | 1 | 1 | n7 |
| 1 | 1 | 1 | n8 |

METHOD AND APPARATUS FOR CONTROLLING A PHYSICAL PARAMETER

FIELD OF THE INVENTION

The invention relates to a method of controlling a physical parameter, in particular the rotation speed of a motor, and an arrangement for carrying out such a method.

1. Background

Such a method and a practically tried arrangement is known from DE 44 41 372 A1, JESKE et al., corresponding to U.S. Ser. No. 08/341,380, now U.S. Pat. No. 5,845,045, issued Dec. 1, 1998.

This known method, however, is difficult to apply to different types of motors, since the program has to be changed in most cases.

2. Summary of the Invention

It is an object of the invention to provide a new method of this type, as well as an arrangement for carrying out such a method.

According to the invention, this object is solved by a method of controlling the actual value of a physical quantity, to a predetermined value, in the following called "target value", comprising the following steps:

a) the difference between the target value and actual value, in the following referred to as "control deviation", and its sign, in the following referred to as "control sign", are determined repetitively at certain time intervals;

b) during or after each measurement, the control deviation is converted into at least one electrical signal, the duration of the electrical signal, in the following referred to as "control deviation duration", being proportional to the absolute value of the control deviation, at least in the range of the target value, and the value of the electrical signal being a function of the control sign;

c) by means of this at least one electrical signal, during the control deviation duration, the charge of an analog electrical memory arrangement is influenced;

d) depending on the value of the charge of the memory arrangement, the physical quantity is directly or indirectly influenced, so as to keep it in the range of the target value.

This allows a precise and rapid control which is easy to implement. Advantageously, a part of this control arrangement can be realized with an inexpensive microprocessor while another part can be realized by using simple analog components. The resulting costs are low and the control process is very fast and accurate and can be adapted to different control tasks by simply changing the analog section.

In another advantageous embodiment of the invention, in step b) the control deviation is converted into an electrical signal in a microprocessor and this signal is outputted at at least one output of the microprocessor in the form of a binary or ternary signal which is generated in the microprocessor, during or after a measurement during the control deviation duration. This can be accomplished by an inexpensive microprocessor with a small word length, for example 4 bits. The microprocessor can also be used with an electronically commutated motor (ECM) to control the commutation.

In another advantageous embodiment of the invention, in step c) a capacitor operating as an analog memory means can be charged or discharged via an arrangement of resistors, with a current flowing through the resistors to or from the capacitor during the control deviation duration when the electrical signal is present. Such an arrangement can be implemented very easily and cost-effectively, and is easily adaptable to different applications.

In another advantageous embodiment of the invention, in step d) the pulse duty cycle of a PWM control device is controlled by the charge quantity of the memory arrangement, wherein the output signal of the PWM control device affects directly or indirectly the physical quantity to be controlled. Alternatively, the amount of charge in the memory arrangement can also directly control a signal, for example a DC signal (for example via an impedance transformer).

Execution of the method is fast if, in a modified embodiment of the invention, the control deviation is converted into the at least one electrical signal at the same time the control deviation is measured.

Alternatively, the control deviation is converted into the at least one electrical signal after the control deviation has been measured. The control deviation can then, before being converted into the electrical signal, advantageously be multiplied by a predetermined factor and the control deviation can be determined more frequently.

Additional details and advantageous embodiments of the invention which are not intended in any way to limit the scope of the invention, are described in the following examples with reference to the drawings.

BRIEF FIGURE DESCRIPTION

In the drawing is shown in:

FIG. 1 a schematic partial circuit diagram of a first embodiment of an arrangement of the invention with a control arrangement operating in digital-analog mode for controlling a rotation speed, FIG. 2 a representation of a 4 bit long data word used in FIG. 1, FIG. 3 a detail of FIG. 1, FIG. 4 a diagram explaining FIGS. 1 and 3, FIG. 5 a diagram explaining FIGS. 1 and 3, FIG. 6 A flow diagram providing an overview over the main elements of an arrangement of the invention for controlling the rotation speed, FIG. 7 details of the portion of FIG. 6 referenced as controller (S114); this portion is implemented as a binary tree to assure fast operation and thus very accurate control, FIGS. 8 to 10 diagrams explaining the mode of operation of the rotation speed control of the first embodiment, FIG. 11 a first modified embodiment of FIG. 3, FIG. 12 a second modified embodiment of FIG. 3, FIG. 13 a preferred embodiment of a PWM control device, FIG. 14 diagrams explaining FIG. 13, FIG. 15 an illustration of an embodiment of the invention in conjunction with an exemplary two-phase electronically commutated motor whose rotation speed is controlled, FIG. 16 an illustration of the connections of the microprocessor 17P103, from the company NEC, used in FIGS. 1 and 15, FIG. 17 a flow diagram explaining the motor commutation controlled by the microprocessor of FIG. 15, FIG. 18 applying the invention to control of the rotation speed of an internal combustion engine, FIG. 19 a diagram explaining an output used with the microprocessor 17P103 which can be switched between LOW and HIGH impedance, FIG. 20 a diagram explaining a so-called tristate output of a microprocessor, FIG. 21 a schematic of a microprocessor with four outputs similar to FIG. 19 and their application for influencing the P- and I-portions of a controller, FIG. 22 a schematic explaining FIG. 21, FIGS. 23 to 28 diagrams explaining FIGS. 21 and 22, FIG. 29 a schematic explaining general aspects of the invention, FIGS. 30 and 31 schematics explaining the invention in general, FIGS. 32 and 33 a schematic explaining the process of digitally presetting a target value, FIG. 34 a schematic explaining another embodiment of the invention in which the target value is preset digitally and in which the P-portion is taken into consideration and separately adjustable during the control process, FIG. 35 a flow diagram providing an overview over the main elements of a program which can be used in the arrangement of FIG. 34, FIG. 36 a flow diagram showing the process of digitally presetting the target value for the rotation speed according to FIG. 34, FIGS. 37A and 37B a flow diagram showing the execution of the control process, FIG. 38 a flow diagram explaining the commutation of the motor according to FIG. 34, as controlled by the microprocessor, FIGS. 39 to 42 diagrams explaining the mode of operation according to FIGS. 32 to 38, FIG. 43 a modified embodiment of FIG. 31, FIG. 44 a modified embodiment of FIG. 29, FIG. 45 a modified embodiment of FIG. 37A, FIG. 46 a modified embodiment of the FIGS. 1, 3 or 18; and FIG. 47 a modified embodiment of the design of the memory means.

DETAILED DESCRIPTION

FIG. 1 shows important elements of the present invention with reference to an embodiment. A microprocessor, for example the microprocessor 17P103 of the company NEC with a word length of four bits, is designated with the reference numeral 20. It is an advantage of the present invention that such a simple microprocessor can be employed. This microprocessor contains a ROM in which the program for controlling the microprocessor is stored. The main portions of this program are subsequently described with reference to flow diagrams. The controller (I-controller) of FIG. 1 is adapted to control the rotation speed of an electric motor 50. However, the controller can also be used to control the rotation speed of an internal combustion engine, as shown in FIG. 18, or for any other control operation where physical quantities have to be controlled.

The microprocessor 20 is connected in a conventional manner to a regulated supply voltage of, for instance, +5 V, which is applied between a positive line 22 and a negative line 24. Between the positive and negative lines, there is disposed a potentiometer 26 whose center tap 28 is connected to the negative input of a comparator 30. The positive input of the comparator 30 is connected via a resistor 32 (e.g. 100 kOhm) to the positive line 22, via a capacitor 34 (e.g. 100 nF) with the negative line 24, and directly (or via a small resistor of e.g. 100 ohms; not shown) to the port B0 of the microprocessor 20.

The port B0 can be controlled by the program so that the port is internally connected with the negative line 24, thereby discharging the capacitor 34. Alternatively, the port B0 can be controlled so as to have a high impedance, so that the capacitor 34 can be charged via the resistor 32.

In the following, it will be described in detail how the program controls the sequence of operations over time. The ports B1 and B2 which are also referenced as controller ports, can be controlled in the same manner, i.e. if B1=0, then the port B1 is connected to the negative line 24, whereas if B1=1, then the port has a high impedance. The same holds for B2. The output 30' of comparator 30 connected via a resistor 36 to the positive line 22 and via a resistor 38 to a port C1 of the microprocessor 20. The potential at port C1 is referred to as DIFF.

The output 30' of comparator 30 has the potential "low", i.e. DIFF=0, as long as the capacitor 34 is discharged, because in this case, the positive input of comparator 30 has a more negative potential than the negative input of comparator 30.

When the output B0 of the microprocessor 28 becomes highly resistive, the capacitor 34 is charged via the resistor 32 so that the voltage across the capacitor 34 increases. At a certain point in time which can be called "measurement point", the positive input of comparator 30 becomes more positive than the negative input of the comparator 30, causing the potential at the output 30' to suddenly jump to a more positive ("high") value (DIFF=1).

The signal DIFF at input C1 then indicates the "measurement point" through this jump in the potential. If the potential at output B0 was initially low (capacitor 34 discharged) and port B0 is then switched to a high impedance, then the signal DIFF will jump to a positive potential after a predetermined time period, wherein this time period depends on the setting of potentiometer 26, i.e. the time period becomes longer, the more positive the potential at the tap 28 of potentiometer 26 becomes.

The potentiometer 26 is intended for adjustment of the target value for the rotation speed. Instead of the potentiometer 26, an arrangement with a fixed resistor 40 and a temperature dependent resistor 42 (e.g. Negative Coefficient of Temperature) may also be used, as is indicated with dashed lines in FIG. 1, to render the target value for the rotation speed dependent upon temperature.

This can also be advantageously used for rotating a fan at low temperatures with a low rotation speed and at high temperatures with a high rotation speed.

The arrangement illustrated in FIG. 1 is used to control the rotation speed of an electric motor 50, for example of a collector motor or an electronically commutated motor (ECM) connected to a positive DC voltage 52 of, for example 12, 24, 48 or 60 V. Alternatively, the same arrangement can also be used to control the rotation speed of an internal combustion engine, as is shown in the example of FIG. 18. A free-wheeling diode 51 is connected in parallel with the motor 50.

The current supplied to the motor 50 is controlled by an npn-Darlington transistor 54 which is antiparallel-connected to a reverse-biased free-wheeling diode 51. The emitter of transistor 54 is connected via a measurement resistor 58 (e.g. 3 ohms) to the common negative line 24.

The current in transistor 54 is controlled with a Pulse Width Modulation (PWM) control device 60 which is described in the following with reference to FIG. 13. The control device 60 switches the current in the transistor 54 ON and OFF with a frequency of, e.g., 25 kHz. If the motor 50 requires a substantial current, then the intervals between the current pulses are made very short; conversely, if the motor 50 requires very little current, then the intervals between the current pulses are made long, while keeping the frequency essentially unchanged.

The pulse duty cycle TV of the current pulses i, i.e. the ratio between the pulse duration $t_p$ and the duration of the period T (FIG. 1, right side) is determined by the potential at input 62 of the PWM control element 60, i.e. if this potential is high, then TV becomes small and potentially= 0%, whereas if the potential at input 62 becomes low, then TV becomes large and potentially=100%, i.e. the current i then flows continuously through transistor 54.

During the start-up of the motor 50 (with a correspondingly high startup current), the potential at input 62 is determined by the voltage at the measurement resistor 58. This voltage is supplied via a resistor 64 to the base of an npn transistor 66 which operates as a changeable resistor (e.g. type BC846). The emitter of the transistor 66 is connected to the negative line 24. A filter capacitor 68 (e.g. 10 nF) is connected between the base of transistor 66 and the negative line 24. The collector of transistor 66 is connected via two resistors 70, 72 (e.g. each 1 kOhm) to the input 62; the junction 74, where the two resistors 70, 72 are connected, is connected to the negative line 24 via a filter capacitor 76 (e.g. 100 nF). The assembly of components 70, 72, 76 forms a first order timing circuit which operates as filter element converting the voltage pulses at the resistor 58 into an essentially smooth DC voltage at input 62.

If, at start-up, a high current flows through the resistor 58 and generates a correspondingly high voltage at the resistor 58, then the transistor 66 conducts more and more, thereby pulling the potential at input 62 increasingly in a negative direction. As a result, the pulse duty cycle of the current i decreases and the current i is limited to a predetermined maximum value. This provides current limitation during start-up of motor 50.

The input 62 is connected to a node 82 via a high-impedance resistor 80 (e.g. 100 kOhm). A relatively large capacitor 84 (e.g. 3.3 $\mu$F) is connected between the node 82 and the negative line 24. It is evident that the voltage $u_C$ across the capacitor 84 determines the potential at input 62 when the transistor 66 is blocked. Since the transistor 66 practically conducts current only during the start-up phase of the motor, the transistor 66 does not influence the control of the rotation speed after start-up, which is controlled by the voltage $u_C$. However, current limitation has always priority over the control of the rotation speed, i.e. when the transistor 66 becomes electrically conducting, then the potential at input 62 is primarily determined by the transistor 66 and not by the control of the rotation speed. The current limitation also ensures that the current i does not exceed a predetermined maximum value.

The anode of a diode 88 is connected to the node 82, with the cathode of the diode 88 connected via a resistor 90 (e.g. 100 kOhm) to the port B2 of the microprocessor 20. The cathode of a diode 92 is connected to node 82. The anode of diode 92 is connected to port B1 of microprocessor 20 via a resistor 94 (e.g. 43 kOhm). This port is also connected to the positive line 22 via a resistor 95 (e.g. 3.3 kOhm).

A tacho-generator 96, which supplies an output voltage "Hall" with a frequency which is proportional to the rotation speed of the motor 50, is coupled to the motor 50. The voltage Hall of a motor 50 can be the output voltage of a Hall generator operating as a rotor position sensor. A suitable output voltage can be of any kind, e.g. an output voltage having pulses with a frequency proportional to the rotation speed, a sine voltage, a square-wave voltage, etc. Since frequently—for cost considerations—a Hall generator is used, in particular with a motor, the signal is referred to as "Hall".

FIG. 2 shows a data word 100 of microprocessor 20 consisting of four bits B3, B2, B1 and B0, e.g. 0111. The bit B3 is not used in the present example.

The bit B0 controls the port B0 of microprocessor 20. If the bit B0 is "0", then this port is connected to the negative line 24; if the bit B0 is "1", then the port B0 has a high impedance. As mentioned before, the same is true for the ports B1 and B2.

FIG. 3 shows in the form of a cutout the section of the circuit which includes the two diodes 88 and 92; and FIG. 4 shows the signals at ports B1 and B2 in different operating states, wherein "1" indicates that the port has a high impedance (open collector), and "0" indicates that the port is connected to the negative line 24.

In state 98, B1=0 and B2=1, i.e. both diodes 88, 92 block, and no current can flow from one of the ports B1, B2 to or from the capacitor 84, so that the charge of the capacitor 84 and thereby the voltage $u_C$ remain unchanged. The pulse duty cycle TV of the PWM control element 60 then remains unchanged which is indicated in FIG. 4 by horizontal arrows. The state 98 is that state which remains effective during at least a portion of the measurement—for determining the difference between the rotation speed target value (position of the potentiometer 28) and the actual rotation speed value (temporal separation $T_H$ between the Hall pulses). The state 98 can be regarded as the neutral position since in this state, the duty cycle TV of the current pulses i for the motor 50 remains unchanged.

If the rotation speed n is too low, i.e. smaller than the target rotation speed $n_0$, then according to column 100 of FIG. 4, B1 is set to 1 and B2 is set to 1. The diode 88 then blocks, whereas the diode 92 becomes conducting, so that a charge current flows via the resistors 95 and 94 to the capacitor 84, increasing its voltage $u_C$. As a result, the duty cycle TV increases, i.e. the current i flowing through the motor 50 increases. This situation is indicated in FIG. 4 by upwardly pointing arrows. This rotation speed n of the motor 50 increases accordingly.

If this rotation speed is too high, then according to column 102 in FIG. 4, B1 is set to 0 and B2 is set to 0. The diode 92 then blocks, since the current flows from the positive line 22 via the resistor 95 and the port B1 to the negative line 24, so that the port B1 assumes approximately the potential 0 V. The diode 88 becomes conducting, so that a current flows from the capacitor 84 via the diode 88, the resistor 90, and an internal connection inside the microprocessor 20 to the negative line 24, thereby reducing the voltage $u_C$ at capacitor 84. Consequently, the pulse duty cycle TV decreases and the current i through the motor 50 also decreases. This is indicated in FIG. 4 by downwardly pointing arrows. The rotation speed n decreases accordingly.

The circuit of FIG. 3 thus simulates a so-called tristate output, i.e. a processor output, which can assume not only the states "0" (FIG. 3, column 102) and "1" (FIG. 4, column 100), but also the state "high impedance" (FIG. 4, column 98).

With the circuit of FIG. 3, different control parameters can advantageously be set through the resistors 90 and 94. The combination of resistors 94 and 95 defines the control parameter for "motor too slow", whereas the resistor 90 defines the control parameter for "motor too fast". The sum of the resistors 94 and 95 is advantageously selected to be smaller (e.g. 46 kOhm) than the resistor 90 (e.g. 100 kOhm), i.e. if the rotation speed n is too low, then the charge of the capacitor 84 is rapidly increased, so that the rotation speed increases rapidly during start-up. Conversely, if the rotation speed n is slightly too high, then the charge of capacitor 84 is reduced rather slowly so that the rotation speed of the motor does not oscillate during start-up.

This is illustrated in FIG. 5, with the curve 104 drawn for the different values of the resistors 90 and 94 mentioned above. The curve 106, on the other hand, is for the case where the resistors 90 and 94 have the same value. In the latter case, it takes longer before the target rotation speed $n_0$ is reached, i.e. the system is less damped. The possibility to use resistors 90 and 94 of different values is an important advantage of the arrangement of FIG. 3. It is a further advantage that the charge of the capacitor 84 can be kept (essentially) constant (column 98 of FIG. 4), increased (column 100), or reduced (column 102), depending on the command from a program. Different embodiments of this circuit are illustrated and described hereinafter.

FIG. 6 shows the fundamental sequence of the control program in the form of a customary flow diagram. The step S110 presents the jump into the program after a reset, e.g. after switching the motor on following a power-up-reset. In step S112, the program is initialized. Here, variables and constants can be loaded which define the values and states required for the program. Step S114 contains the controller, whose design is illustrated in FIG. 7. If the motor 50 is an electronically commutated motor, then step S116 includes commutation. Such an electronically commutated motor as well as the program for commutating the motor will be described later on with reference to FIGS. 15 to 17. If the motor 50 is a collector motor, then step S116 is omitted.

Since a microprocessor can "hang up" due to interference pulses, i.e. the program stops running, there is indicated at S119 a cyclic reset operation which is controlled by the rotation of motor 50 and which can be executed, for example, once per revolution. Reference is made here to the Japanese laid-open patent publication 7-194 170, and corresponding U.S. Pat. No. 5,590,235, which show an arrangement for cyclic reset adapted for an electric motor. The same is also possible with an internal combustion engine. An inventive arrangement of this or a similar kind can advantageously be provided for a motor in order to prevent problems in an environment where interfering electrical pulses occur frequently, so that the motor runs safely at the intended speed. However, not all microprocessors provide this option.

Step S114 (and possibly step S116) form part of a loop S118 which is continuously cycled during operation. The loop is preferably designed so that each loop cycle is executed in the same (constant) time, e.g. 20 μs, so that the elapsed time can be measured by counting the number of loops. The duration can be held constant through NOP-commands in individual shorter program sections, e.g. in the steps S152 and S140 (FIG. 7). The time can then be measured simply by counting the number of executed loops. During the cyclic reset operations, the loop S118 is exited briefly, as indicated in the flow diagram.

FIG. 7 shows in detail the design of the controller portion. The information relating to "RGL-port" relates to the data word according to FIG. 2, which controls the outputs B2, B1 and B0 of the microprocessor 20. For example, RGL-Port=0101 indicates that bit B0, i.e. the lowest bit, is equal to 1, i.e. that the capacitor 34 is being charged; furthermore, that B1=0 and B2=1, i.e. that according to column 98 of FIG. 4 the capacitor 84 is neither charged nor discharged (neutral position).

The control process starts at S120 (FIG. 7). In step S122, the signal "Hall" is queried or polled, i.e. the output signal of the tacho-generator 96. If the signal has the value "1", then in step S124 a control bit (register) is set, and it is stored in memory that the "Hall" signal at this moment is equal to "1". In S126, the signal DIFF at port C1 of the microprocessor 20 is queried. If the signal has the value "1", then the measurement of the rotation speed is concluded, and preparations for a new measurement are made in step S128. For this purpose, a register RGL-Bit is then set to "1" and the data word RGL-port=0100 is generated, thereby discharging the capacitor 34 and keeping the voltage $u_C$ at the capacitor 84 unchanged (neutral position according to FIG. 4, column 98).

If a commutation follows, then the commutation is checked in step S116 and, if necessary, changed. This will be discussed in detail hereinafter with reference to FIGS. 15 to 17.

After completion of loop S118, the program again transitions to step S122. Unless the "Hall" signal has changed (Hall=1), the program goes via the steps S124, S126 to a step S130, since following the discharge of the capacitor 34 the signal DIFF is now "0". The register RGL-bit is "0" from the preceding step S128, i.e. the program branches at S130 to step S132 which is identical to step S128, i.e. no changes take place at ports B0, B1, B2.

Subsequently, the program again cycles through the loop S118. If in the meantime, the "Hall" signal (from tacho-generator 96) has changed from "1" to "0", then the program branches in step S122 to S136. There, the control bit is queried which was previously set in S124. The control bit, if still set, is then reset in S138 to register in the program that Hall=0. Subsequently, the step S132 is again executed for safely discharging the capacitor 34 and for safely resetting the signal DIFF to "0".

The last operation is really required for discharging the capacitor 34 before charging the capacitor 34 again. If the "Hall" signal changes from "1" to "0" during the time the program executes step S140 which will be described below, then the signal DIFF can be equal to "1" or can become equal to "1". This situation occurs in particular if the rotation speed target value (at potentiometer 26) is adjusted rapidly from high rotation speeds to low rotation speeds. Since the capacitor 34 is discharged in step S132 also under these special circumstances, problems are avoided.

During the next program cycle, while still Hall=0, the control bit is no longer set and the program branches to S144. There, the signal DIFF is queried, i.e. the charge state of capacitor 34. If DIFF=0, then the register RGL-bit is set to "1" in step S146, and the dataword (FIG. 2) is set to 0101. Charging of capacitor 34 can then begin, i.e. the measurement of the difference between the target rotation speed and the actual rotation speed has started.

During the next cycle through the program (for Hall=0), the program runs again via the steps S122 and S136 to step S144. If in the meantime capacitor 34 has been charged to a point where DIFF becomes=1, then the measurement of the rotation speed is concluded and the program branches to S148. There the register RGL-bit is queried.

The register RGL-bit still has the value "1" from step S146 so that the program goes to S152. S152 contains a NOP-command or another "inert" command which, as mentioned before, operates so as to make the cycle time through a loop in the present situation exactly as long as in the other situations. The dataword RGL-port (FIG. 2) in S152 then assumes the value 0111, i.e. the capacitor 34 continues to be charged in order to maintain the signal DIFF at the value "1". According to column 100 of FIG. 4, the capacitor 84 is then charged via the resistors 94, 95 and the diode 92, so that the voltage $u_C$ increases since, in the present example, the signal DIFF changed, in the region Hall=0, to "1"; it follows that the rotation speed n of the motor 50 is too low, and the increase of the voltage $u_C$ causes the motor 50 to receive, via the PWM control element 60, a higher current, thereby increasing the motor's rotation speed.

If the rotation speed of the motor is too high, then the signal DIFF retains the value "0" during Hall=0. After the Hall signal changes, i.e. to Hall=1, and as long as DIFF=0, the program then goes via the steps S122, S124, S126 and S130 to the step S140 which has been described above. Step S140 also contains a NOP-command (for the same reasons as step S152). In step S140, the data word RGL-port, according to FIG. 2, assumes the value 0001, i.e. the capacitor 34 is still being charged (B0=1). According to column 102 of FIG. 4, the capacitor 84 is discharged via the resistor 90 and the diode 88 so that the rotation speed is slightly reduced. The capacitor 84 continues to be discharged until either—during Hall=1—the value of DIFF becomes=1, whereafter step S128 is executed, the discharge of capacitor 84 is stopped and the capacitor 34 is discharged, or until the rotation speed signal again becomes Hall=0, wherein the capacitor 34 is then discharged in S132 and the discharge of capacitor 84 is stopped.

If the program passes through S140 when cycling through the loop S118, because the signal DIFF has not yet attained the value "1", and if the "Hall" signal subsequently changes from "1" to "0", then the program goes through the steps S122, S136, S138 and S132. The signal DIFF can here become equal to "1", so that the capacitor 34 would be discharged in step S132 due to B0=0. However, the time available to discharge the capacitor 34 is here very short, so that DIFF may still have the value "1" during the next loop cycle.

In this special situation, i.e. for DIFF=1, during the next loop cycle the program goes via steps S136, S144, S148 to step S150. There, the RGL-bit is set=1 and the dataword RGL-port (FIG. 2) is set to 0100, so that the capacitor 34 is safely discharged due to B0=0, before subsequently—in the next loop—a new charging cycle of the capacitor 34 begins in step S146.

The binary tree structure of FIG. 7 enables a very simple design of an I-controller with few program steps, and—more importantly—a very fast program execution. Moreover, the capacitor 84 is charged or discharged depending on the sign and the magnitude of the difference between the target rotation speed $n_0$ and the actual rotation speed n, i.e. on the so-called control deviation. If the control deviation is equal to 0, then the capacitor 34 receives sporadically alternately a brief charge pulse and during the subsequent control operation a brief discharge pulse, so that the average charge and thereby the voltage $u_C$ do not change. —As seen from the above description, the rotation speed is corrected once during each period $T_H$ (FIG. 1) of the "Hall" signal.

FIG. 8 includes seven graphs (a)–(g), with a common time scale, and illustrates graphically the courses for the case where the rotation speed is too low. In line a) there is shown the "Hall" signal, in line b) the signal $U_{34}$ at capacitor 34.

Capacitor 34 is discharged through step S132 (or step S150) of FIG. 7 when the Hall signal changes from "1" to "0", and begins to be charged again in step S146. Since rotation speed in FIG. 8 is too low, the signal DIFF becomes=1 at time t1, i.e. during Hall=0, whereby the ports B1 and B2 are set to "1" in step S152, so that according to column 100 of FIG. 4, the capacitor 84 is charged via the resistors 94, 95 and the diode 92 and the rotation speed of motor 50 is increased by increasing the pulse duty cycle TV.

After the Hall signal changes from "0" to "1" at time t2, the capacitor 34 is discharged in step S128, whereby DIFF becomes=0, likewise B1 (see explanation in FIG. 2). The capacitor 84 is then no longer charged, i.e. the capacitor 84 is only charged during the time interval from t1 to t2. The lower the actual rotation speed in relation to the target speed, the farther the time t1 in FIG. 8 moves to the left, causing the capacitor 84 to be charged for a longer time, as illustrated in line g) of FIG. 8. According to FIG. 8, line e), the signal B2 then remains at "1" during the entire time, and the register RGL-bit has the value "1" for as long as Hall=0.

FIG. 9 shows the execution for the case where the actual rotation speed n is equal to the target rotation speed $n_0$. Here too, the capacitor 34 starts to be charged when the Hall signal changes from "1" to "0" (step S146; time t3). When the Hall signal changes from "0" to "1", i.e. at the time t4, the signal $u_{34}$ reaches the target value which is set at potentiometer 26, making DIFF=1. The program then goes to step S128, where the capacitor 34 is discharged (through B0=0). Consequently, the charge of capacitor 84 is not changed.

If the time t4 occurs very shortly before the "Hall" signal changes from "0" to "1", then the capacitor 84 is charged slightly and only very briefly in step S152; if the time t4 occurs immediately after the "Hall" signal changes, then the capacitor 84 is discharged slightly and only very briefly in step S140, namely during one cycle through the control loop, i.e. for example during 20 μs.

According to FIG. 9, lines d), e) and f), the signal B1 here remains at "0", the signal B2 remains always at "1", and between t3 and t4, the register RGL-bit remains at "1". According to line g), the charge of capacitor 84 does not change.

As mentioned above, in practice alternately very short pulses are generated which alternately slightly charge and slightly discharge the capacitor 84, so that the charge state of capacitor 84 does not change any longer in practice after the target rotation speed has been reached (I-feature of the controller).

FIG. 10 shows what happens when the rotation speed is too high. At time t5 in step S146, capacitor 34 starts to be charged (B0=1), i.e. when the signal "Hall" changes from "1" to "0". According to S146, it is B1=0 and B2=1, i.e. the charge of capacitor 84 initially does not change. At time t5, the register RGL-bit becomes equal to "1".

At time t6, i.e. during a change of the Hall signal from "0" to "1", DIFF=0 and the register RGL-bit remains at "1", i.e. B0 continues to be held at=1 in step S140, the capacitor 34 continues to be charged, and the values for B1 and B2 are both set to "0" at time t6. Consequently, from t6 on, according to column 102 of FIG. 4, the capacitor 84 is discharged via the diode 88 and the resistor 90 to reduce the speed.

At time t7, $u_{34}$ reaches the target value set at potentiometer 26, generating the signal DIFF=1. The program then goes to step S128, wherein the capacitor 34 is discharged, the discharge of capacitor 84 is stopped, and the register RGL-bit is set to "0". Line g) of FIG. 10 illustrates the decrease of the voltage $u_C$ at capacitor 84 between the times t6 and t7. This situation as well as the increase of $u_C$ in FIG. 8 is exaggerated for sake of clarity.

If the signal DIFF=1 does not occur before time t8 (change of the Hall signal from "1" to "0"), then the capacitor 84 is discharged between t6 and t8, while the capacitor 34 is a automatically discharged at time t8. Subsequently, a new measurement starts, i.e. from this time on the capacitor 34 is charged once again. This situation usually occurs only if the target rotation speed at potentiometer 26 is adjusted to a lower value; the motor 50 then receives a lower current and is slowed down by the driven load, until the desired lower target rotation speed is reached.

The control arrangement described above is very precise and becomes even more accurate when more "Hall" signals are generated per revolution of the motor, since the rotation speed is corrected once during each period $T_H$ (FIGS. 1 and 10) of the signal "Hall". In practical operations, the target rotation speed can be maintained very accurately with the invention.

With respect to FIG. 10, it should be added that each of the times t5, t6 and t8 corresponds to a specific angular position of the motor. For example, the time t5 can correspond to a predetermined angular position $\alpha_1=0°$ mech., the time t6 to the angle $\alpha_2=180°$ mech., and the time t8 to the angle $\alpha_3=360°$ mech. (=0° mech.). The capacitor 34 therefore begins to charge at the predetermined angular position $\alpha_1$, and the measurement is taken after moving a predetermined angular path $\beta$ (FIG. 10a) relative to the angular position $\alpha_1$, i.e. at the rotor a position $\alpha_2$. If the signal DIFF=1 occurs in the angular interval between $\alpha_1$ and $\alpha_2$, then the motor is too slow, whereas if DIFF=1 in the angular interval between $\alpha_2$ and $\alpha_3$, then the motor is too fast. In this example, a measurement and control cycle would always be concluded within 360° mech., i.e. within one rotor revolution.

However, the same measurement and control cycle can occur more frequently during a rotor revolution, e.g. 10 or 100 times, thus making the control more accurate. Importantly though, the time t5 corresponds to a predetermined angular position $\alpha_1$ of the motor, similarly the time t6 to a predetermined subsequent angular position $\alpha_2$, with a predetermined angular path $\beta$ defined between $\alpha_1$ and $\alpha_2$. If $\beta$ were 360° mech., then the angular positions $\alpha_1$ and $\alpha_2$ would coincide spatially, but not time-wise, so that a control cycle would then extend over two revolutions. (The tachogenerator 96 would in this case be driven via a gear transmission.) Also, the angular path $\beta$ does not have to coincide with the angular separation $\alpha_2$ to $\alpha_3$. For example, $\alpha_1$ could be equal to 0° mech., $\alpha_2$ equal to the 10° mech., and $\alpha_3$ equal to 30° mech. In practical applications, frequently a Hall signal is used which is then also used for the commutation. In this case, the angular separations are identical.

If the rotation speed is too low, then the angular separation between the occurrence of the signal DIFF=1 and the angular position $\alpha_2$ represents the magnitude of the (negative) control deviation, whereas if the rotation speed is too high, the angular separation between the angular position $\alpha_2$ and the angle when the signal DIFF=1 occurs, represents the (positive) control deviation. By either charging or discharging the capacitor 84 during these angular separations, the rotation speed n can be easily and inexpensively maintained at a predetermined value.

FIG. 11 shows a modified embodiment with a so-called tristate port which is available with certain microprocessors. The port B can be switched, e.g., between the two potentials +5V, 0 V and a high impedance state, the so-called open collector. Accordingly, the charge of the capacitor 84 which is connected to the port B via a resistor 160, can be changed by changing the state of port B accordingly with the help of the program. Disadvantageously, however, the control parameters for "rotation speed too high" and for "rotation speed too low" are preset by the resistor 160 and are therefore identical.

FIG. 12 shows the simulation of a tristate port with the help of a pnp transistor 162 and an npn transistor 164. The emitter of transistor 162 is connected to the positive line 22, its base—via a resistor 166—to the port B1, and its collector via a node 168 to the collector of transistor 164. The base of transistor 164 is connected via a resistor 170 to the port B2, its emitter to the negative line 24. The capacitor 84 is connected to the node 168 via a resistor 172; the remaining circuit (the same holds for FIG. 11) corresponds to FIG. 1, so that the same reference numerals are used here.

If the two transistors 162 and 164 in FIG. 12 are blocked by connecting the base of transistor 162 to the logical value "1" and the base of transistor 164 to the logical value "0", then the voltage $u_C$ at capacitor 84 remains unchanged.

If transistor 162 is switched on by connecting its base to the logical value "0", then the capacitor 84 is charged via the resistor 172, and the voltage $u_C$ increases. The transistor 164 has to be blocked in this case.

If the transistor 162 is blocked and the transistor 164 is conducting, because the port B2 is set to a high impedance by the signal B2=1, then that transistor 164 receives a base current via the resistors 95 and 170. The capacitor 84 is discharged via the resistor 172 and the transistor 164, so that the voltage $u_C$ decreases accordingly. Of course, other arrangements of this type are also possible.

FIGS. 13 shows the design of a PWM control element 60 of a type which can be advantageously used in the circuit of FIG. 1. An essential component of the control element 60 is a sawtooth (triangle-shaped wave) oscillator 180 oscillating e.g. at 25 kHz; furthermore a comparator 182 providing at an output, in pulse form, a PWM signal 184 which is also illustrated in FIG. 14b and which controls the current through the transistor 54 (FIG. 1). The illustrated PWM control element 60, for which numerical values are also provided, is designed for an operating voltage of 12 V supplied between a positive line 222 and the negative line 24.

The sawtooth oscillator 180 includes a comparator 186 which may be combined with the comparator 182 to form a dual comparator (e.g. LM 2901). Both are connected in a conventional manner to the positive line 222 and the negative line 24 for supplying power. A positive feedback resistor 190 is connected between the output 188 and the positive input 192 of the comparator 186; a negative feedback resistor 194 is connected between the output 188 and the negative input 196 of the comparator 186. A capacitor 198 is connected between the negative input 196 and the negative line 24. The output 188 is also connected to the positive line 222 via a resistor 200. The positive input 192 is connected via two identical resistors 202, 204 with the positive line 222 and the negative line 24, respectively.

A sawtooth oscillator 180 designed in this fashion oscillates with a frequency of e.g. 25 kHz, wherein the sawtooth voltage 208 generated by the oscillator is approximately symmetric relative to half the voltage between the lines 222 and 24. For example, at an operating voltage of 12 V, the voltage at the lower peak 201 (FIG. 14a) of the sawtooth signal is approximately 2 V, and at the upper peak 203 approximately 9 V. The sawtooth signal 208 thus has an offset 206 relative to the voltage 0 V, i.e. relative to the potential of the negative line 24. This offset can e.g. be approximately 2 V, but may also be larger or smaller.

The sawtooth signal 208 at the negative input 196 is supplied to the negative input 210 of the comparator 182. The positive input 212 of the comparator 182 corresponds to the input 62 of FIG. 1. A first control signal in form of the voltage $u_C$ at the capacitor 84 is supplied to this input 212 via the high-impedance resistor 80 (FIG. 1), as described with reference to FIG. 1. Also supplied to this positive input 212 is the output signal of the T-filter formed by the components 70, 72, 76. This output signal is determined by the amount of current i flowing in the motor 50, i.e. when the current through the motor 50 increases, the conductivity of the transistor 66 also increases—starting a predetermined threshold value—, thereby pulling the potential at the positive input 212 down. This reduces the pulse duty cycle TV, the more, the higher the motor current becomes.

The output 216 of comparator 182 is connected to the positive line 222 via a resistor 218 and represents the output 63 of the PWM control device 60, see FIG. 1, and controls the transistor 54 (FIG. 1) so that the transistor 54 is continuously switched on and off with the present pulse duty cycle TV.

The operation of the sawtooth generator 180 will now be explained with reference to FIG. 13. Shown in FIG. 13 are three potentials, namely P1 at the negative input 196 of the comparator 186, P2 at the positive input 192 of the comparator 186, and P3 at the output 188 of comparator 186.

After the arrangement is switched on, the value P1 is initially maintained at the potential of the negative line 24 by the (discharged) capacitor 198. Consequently, P3 assumes the value of the positive line 222, since in this case the potential of the positive input 192 of the comparator 186 is higher than the potential P1 of the negative input 196. The capacitor 198 therefore starts to charge via the resistors 200 and 194. In FIG. 14, this is represented by the positively sloping portion 207 of the sawtooth signal 208 which corresponds to the potential P1, i.e. the voltage at capacitor 198.

The value P2 is derived from
a) the resistors 202, 200 and 190 connected in parallel, and
b) the size of the lower voltage divider resistor 204.

The resistors 202 and 204 preferably have the same size, e.g. each 10 kOhm, the resistor 190 is, for example, 4.3 kOhm and the resistor 200 e.g. 2.2 kOhm. The resistor 194 is, for example, 15 kOhm. The resistor 200 is e.g. 2.2 kOhm, the resistor 218 is 33 kOhm and the capacitor 198 is 1 nF. At an operating voltage of 12 V between the lines 222 and 24, the potential P2 in this case is about 9 V.

When the capacitor 198 is charged, P1 eventually becomes greater than P2. The output 188 is thereby switched to the potential of the negative line 24, i.e. the potential P3 jumps in the negative direction. As a result, the capacitor 198 then begins to discharge via the resistor 194 and the comparator 186, as represented in FIG. 14a by the negatively sloping portion 209 of the sawtooth signal 208. P2, i.e. the threshold value of the comparator 186, then also changes and is obtained from
a) the parallel connection of resistors 204 and 190, and
b) the voltage divider resistor 200.

This new potential P2 is approximately 2V.

If P1 drops below P2 because the capacitor 198 is discharging, then the comparator 186 switches again to "on", i.e. the potential P3 at the output of the comparator 186 goes high again.

The above-described process repeats periodically, so that P1 increases again to the potential P2, which is determined by the resistors 200, 190 and 202. Thereafter P3 (at output 188 of the comparator 186) jumps again to the potential of the negative line 24, etc., generating the sawtooth signal 208 at a frequency of e.g. 25 kHz.

The charging time of capacitor 198 is determined by the value of the series connection of the resistors 200 and 194. The discharge time of capacitor 198 is determined by the resistor 194. With the values listed above, the potential P2 at the positive input 192 varies approximately between +9 V and +2 V and is approximately symmetric relative to an average voltage of, e.g., +5.5 V, which is about half the voltage between the lines 222 and 24. A small asymmetry of the signal 208 is introduced by the resistor 200.

Important is here that a PWM ratio of 0% is reached at a voltage $u_C$ of only +2 V and below, so that the motor current i is maintained at zero in the voltage range between 0 and 2 V. This is important for current limitation of the type described above, since even when a large signal is present at the measurement resistor 58 (FIG. 1), i.e. a high motor current i, the signal at resistor 72 which is supplied to the positive input 212 of the comparator 182, does not drop completely to the potential of the negative line 24, but rather remains slightly positive. This small residual voltage is in the range between 0 and 2 V (offset 206 in FIG. 14a), where the PWM ratio is adjusted to 0%, so that current limitation operates safely in spite of these small residual voltages. During operation, the potential P1 (at the negative input 210 of the comparator 182) therefore does not drop below +2 V, so that any potential at the positive input 212 of comparator 182 of less than 2 V causes the pulse duty cycle of the PWM signal to be 0%. During normal operation, current limitation only reduces the motor current, i.e. the potential at input 212 is then in the range above 2 V, corresponding to a pulse duty cycle TV of greater than 0%; however, the duty cycle is shifted towards a lower value when current limitation begins.

The offset range 206 also prevents transistors 66 (FIG. 1) with larger tolerance deviations from introducing an erroneous current limitation.

During operation, the sawtooth oscillator 180 generates the triangular or sawtooth voltage 208 illustrated in FIG. 14a. Depending on the magnitude of the potential at the positive input 212 of comparator 182, which is referenced as $u_C$ in FIG. 14a, square-wave pulses 184 are obtained at the output of the comparator 182 with a frequency of e.g. 25 kHz, which become shorter when the potential at the positive input 212 decreases. The magnitude of this potential therefore determines the duty cycle of pulses 184. If the potential at input 212 becomes more positive, then the pulse duty cycle and thereby the motor current i increase; if this signal becomes more negative, then the pulse duty cycle and the motor current i decrease.

During normal operation, the positive input 212 receives a positive first control signal via the high-impedance resistor 80 which then determines the pulse duty cycle of the PWM signal 184. If, however, the current through the motor 50 increases above a predetermined limit value, then the transistor 66 becomes conductive, thereby reducing the potential at the positive input 212, i.e. the potential moves in the negative direction because a current flows from input 62 via the transistor 66 to the negative line 24. The duty cycle TV of the PWM pulses 184 decreases as a result, wherein a higher motor current causes a larger decrease. In this way, a soft current limitation is obtained which practically operates in an analog mode and does not cause additional motor noises or additional EMI interference.

FIG. 15 shows an embodiment of the invention with an electronically commutated motor 230 with a permanent magnetic rotor 232 illustrated schematically. The magnetic field of the rotor 232 controls a Hall IC 234 which is again shown on the left side of FIG. 15. The motor 230 is illustrated as a so-called two phase motor with two winding strands 236, 238. Of course, the invention can be applied to any type of electronically commutated motor, e.g. a motor with three or four winding strands. During operation, the strands 236, 238 receive current alternately, cf. e.g. DE 23 46 380 C2, and corresponding U.S. Pat. No. 3,873,897, MUELLER/PAPST, which shows a two-phase, two-pulse motor. (Two-pulse means that when the rotor 232 is turned by about 360° el., then during the first half of the revolution strand 236 receives current, whereas during the other half of the revolution strand 238 receives current, i.e. two current pulses per 360° el., wherein these two current pulses can be subdivided by a PWM rotation speed control into a plurality of individual pulses.)

For controlling the current i, in strand 236, there is provided an npn Darlington transistor 240 with a free-wheeling diode 242, whereas an npn Darlington transistor 244 with a free-wheeling diode 246 is provided for controlling the current $i_2$ in strand 238. The emitters of transistors 240, 244 are connected with each other and via the current measurement resistor 58 (known from FIG. 1) to the negative line 24.

In FIG. 15, identical components or components functioning in the same manner as those of FIG. 1 are given identical reference numbers and are generally not described again. A preferred embodiment of the PWM control device 60 is illustrated in detail in FIG. 13. The transistor 240 is controlled by a port D1 (see FIG. 16) of microprocessor 20 via an AND element 250, to whose other input is fed the output signal 184 from the PWM control device 60. The form of this output signal 184 is shown schematically in FIG. 15. These are square-wave pulses of e.g. 25 kHz. The pulse width is determined by the magnitude of the voltage at input 62 of the PWM control device 60. The transistor 240 is controlled so as to be conducting only if the logical signal "1" is present both at the output 63 of the PWM control device 60 and at the output D1 of microprocessor 20.

The transistor 244 is similarly controlled by a port D0 (FIG. 16) of microprocessor 20 via an AND element 252, wherein the other input of the AND element 252 receives the output signal 184 from the PWM control device 60. The transistor 240 is thus only controlled so as to be conducting only if the logical signal "1" is present at both the output 63 of the PWM control device 60 and at the output D0 of the microprocessor 20.

A resistor 254 is connected between the output of the AND element 250 and the base of transistor 240; a resistor 256 is similarly connected to transistor 244.

The voltage from the positive line 22 (e.g. 5 V) is supplied to the input $V_{DD}$ (FIG. 16) of microprocessor 20. A small capacitor 260 is connected between input $V_{DD}$ and the input GND to prevent interference signals from reaching the microprocessor 20. The unused outputs D2, C0, C2 and C3 of the microprocessor 20 are connected the positive line 22 via a resistor R, see FIG. 16.

The Hall IC 234 receives power via respective connections to the positive line 22 and to the negative line 24. The output signal "Hall" of IC 234 is supplied to the port D3 of the microprocessor 20. The output of IC 234 is also connected to the positive line 22 via a so-called pull-up resistor 262.

For the so-called power-up-reset when the motor is switched on, there is provided a capacitor 264, with one terminal of the capacitor 264 connected to the negative line 24 and the other terminal connected to the positive line 22 via a node 266 and a resistor 268. The node 266 is connected to the input RESET/ of the microprocessor 20. Since the capacitor 264 is discharged when the motor 230 is switched on, this input receives the logical signal "0" when the motor is switched on and then causes a reset operation. The capacitor 264 is subsequently charged during operation so that the input RESET/ then receives the logical signal "1".

An 8 MHz ceramic resonator 270 is connected to the inputs X IN and X OUT of the microprocessor 20 as a timing generator.

Operation of FIG. 15

The Hall IC 234 supplies the signal "Hall", which has been described in detail in the flow diagram of FIG. 7 and the FIGS. 8 to 10. According to FIG. 17 which depicts the program section S116 of FIGS. 6 and 7, commutation starts at step S272, i.e. following the control of the rotation speed (in step S114 of FIG. 6).

In step S274 is queried, if the port D3 of the microprocessor 20 has the logical value "0" or "1". If the logical value is "0", then the program branches to the left to step S276. The logical signal "1" is generated at port D1, i.e. the transistor 240 is blocked, whereas the signal "1" is generated at port D0, so that the transistor 244 is controlled so as to be conducting, i.e. the transistor 244 is switched OFF and ON by the signal 184 from the PWM control device 60 approximately 25,000 times per second with the duty cycle TV of signal 184, i.e. if the motor 230 is too fast, then TV decreases, whereas TV increases if the motor 230 is too slow. This is referred to as PWM control since the width of the pulses 184 changes.

If it is detected in S274 that the signal at port D3 has the logical value "1", then the port D1 receives in 278 the value "1" and the port D0 the value "0", thereby blocking the transistor 244, and controlling transistor 240 to be conducting. The transistor 240 is likewise continuously switched off and on by the PWM signal 184, wherein the pulse duty cycle TV is controlled by the rotation speed control, which is identical to that of FIG. 1 and is therefore not described again.

Following the steps S276 or S278, the program executes, if necessary, a step S280 for controlling additional processes in motor 230, whereafter the program returns via the loop S118 (see FIGS. 6 and 7) to S122.

By including the commutation in loop S118, the time required to cycle through one loop becomes slightly longer, e.g. between 20 and 30 µs. Since the loop S118 is also cycled through approximately every 20 µs, a change in the Hall signal is observed no later than this time, causing the commutation to be effected.

The connections of microprocessor 20 and their designations are illustrated in FIG. 16. Advantageously, the invention can provide a very accurate control of the rotation speed by using a simple microprocessor 20 with a word length of only four bits, if desired in conjunction with current limitation. The parts count is sufficiently small as to fit directly inside motor 230, e.g. inside a fan which can be advantageously driven by a motor of the invention.

FIG. 18 illustrates how the invention is applied to control the rotation speed of an internal combustion engine 290. More particularly, the invention can be adapted to a diesel engine because the top rotation speed has to be limited and because an additional signal ZS can be introduced at point 62, e.g. to drive the motor 290 below the so-called smoke limit during strong acceleration, so that no black diesel smoke will appear in the exhaust.

The signal at point 62 is supplied to an actuator 292, e.g. as indicated, to an actuator actuating the throttle 294 of motor 290 in the case of an Otto engine, or to the actuator of a diesel injection pump. A conventional rotation speed sensor 296 is attached to motor 290, e.g. to its fly wheel, to provide an actual rotation speed signal 298 to the input C1 of microprocessor 20. A variety of such sensors 296 adapted for internal combustion engines are known in the art. The signal 298 corresponds to the signals which in the previous diagrams were referenced as "Hall".

The operating mode is the same as in the previous examples, i.e. if the engine 290 is too slow, then the voltage at capacitor 84 increases, and the actuator 292 adjusts the fuel supply to engine 290, thereby increasing its speed. Conversely, if the motor 290 is too fast, then the capacitor 84 is discharged slightly, and the actuator 292 decreases the fuel supply to slow the motor 290.

The signal at point 62 can also be supplied directly to an electronically controlled fuel injection system to control the time during which the fuel is injected into the cylinders.

FIG. 19 illustrates, similar to FIG. 12, the processes in microprocessor 20, e.g. for the processor type NEC 17P103. The port B is here connected to the collector of an internal npn transistor 300, with the emitter of transistor 300 connected to GND, i.e. to the negative line 24. The base of transistor 300 is controlled by a digital signal A. As shown in the right hand table of FIG. 19, the transistor 300 conducts when A=1, so that the output B then has the logical value "0". Consequently, current flows from the positive line 22 via the resistor 95 and the transistor 300 to the negative line 24. When A=0, then the transistor 300 is not conducting, i.e. has a high impedance, which is indicated by the symbol R∞. In this case, the port B receives the value "1" via the pull-up resistor 95, i.e. for example +5 V.

FIG. 20 shows the internal design of microprocessor 20 for the case of FIG. 11, i.e. in the so-called tristate embodiment where the port B' can assume three different states.

In microprocessor 20 (e.g. of the type Pi16C57), a pnp transistor 302 and an npn transistor 304 are associated with the port B', wherein the collectors of transistors 302 and 304 are connected with each other and with the port B'. The emitter of transistor 302 is connected to a positive voltage in microprocessor 20; a signal A' is supplied to the base of transistor 302. The emitter of transistor 304 is connected to the negative line 24. A signal A" is supplied to the base of transistor 304.

The right hand table in FIG. 20 shows that the port B' has the logical value "0" for A'=A"=1, i.e. Low, since in this case the transistor 302 blocks and the transistor 304 conducts. Likewise, this table shows that, for A'=A"=0, the port B' has the logical value "1" (High) since, in this case, transistor 302 conducts and transistor 304 blocks. The table also shows that for A'=1 and A"=0 the port B' has a high impedance as indicated by the symbol R∞. This state is also called "tristate", meaning a third state of this port.

FIG. 21 shows a microprocessor 20 with a larger number of ports B1, B2, B3, B4 which are controlled similar to FIG. 19 through internal transistors 306 (port B1), 308 (port B2), 310 (port B3), and 312 (port B4). The explanations relating to FIG. 19 apply also in the present case and are therefore not repeated. It should, however, be noted that the microprocessor 17P103 is here less advantageous because it has only three ports B1, B2 and B3; better suited is, for example, the microprocessor Pi16C57. Alternatively, outputs of other ports, if available, could also be used, e.g. one or two outputs of port C.

The control deviation ϵ which was measured last during operation, is supplied to the transistors 306, 308 in digitized form; similarly, the control deviation ϵ' which was measured during the previous measurement cycle, is supplied to transistors 310, 312.

The circuitry for ports B1 and B2 is identical to that of FIG. 3, with the only difference that instead of the fixed resistors 90, 92 of FIG. 3, fixed resistors 90', 94' in series with variable resistors 90", 94" are provided in FIG. 21 for the purpose of adjusting the respective control parameters for different applications, as mentioned above with reference to FIGS. 1 and 3.

The following values are given as examples:

Resistor 95 3.3 kOhm (subsequently also abbreviated as "k").

Resistors 90' and 94' 10 kOhm

Potentiometers 90" and 94" each 250 kOhm, wherein the resistors 94'+94" are adjusted e.g. to 50 kOhm and the resistors 90'+90" are adjusted e.g. to 70 kOhm.

The port B3 is connected to the positive line 22 via a resistor 316 (e.g. 3.3 kOhm) and via a potentiometer 318" connected in series with a fixed resistor 318' to the anode of a diode 320, wherein the cathode of diode 320 is connected to the point 82 (see FIG. 1, FIG. 3 or FIG. 15).

Likewise, the port B4 is connected via a potentiometer 322" and a fixed resistor 322' to the cathode of a diode 324, wherein the anode of diode 324 is connected to the point 82.

The resistor 316 may have the value 3.3 kOhm, the fixed resistors 318' and 322' may have the value 10 kOhm, and the potentiometers 318" and 322" may have the value 250 kOhm. The resistors 318'+318", e.g. have the value 80 kOhm, and the resistors 322'+322" have the value 60 kOhm. The potentiometer 80, e.g., may have the value 100 kOhm, and the capacitor 84 the value 3.3 $\mu$F.

FIG. 22 shows symbolically the operation of the digital-analog controller. The controller receives at the input 328 the control deviation ϵ and the sign VZ of the control deviation.

The point 82, 84 is the summing junction at which in the analog memory arrangement, i.e. the capacitor 84, the charge is increased or decreased, i.e. a sum is generated, depending on the value of the control deviation. The feedback arrow (from right) symbolizes the memory characteristics of the summing junction.

The most recent value ϵ (in the following also referenced as "e") of the control deviation and the sign VZ are used. These values can be either supplied externally or can be calculated in microprocessor 20, as previously described. Also used is a value for ϵ and VZ from a previous measurements cycle, e.g. the immediately preceding value ϵ' and its sign VZ'. These values which were measured at the previous rotation speed n', are temporarily stored in a memory arrangement 330 and are continually updated. The following FIG. 37 illustrates and describes how this can be advantageously accomplished.

The sign VZ of ϵ determines whether the control deviation ϵ is considered as a positive number with the control parameter C0 or as a negative number with the control parameter C0'. A positive number (VZ=+) means that the rotation speed n is too low and that, in FIG. 21, a charge current flows via the resistors 95, 94", 94' to capacitor 84. These resistors therefore determine the control parameter C0. A negative number (VZ=−) means that the rotation speed n is too high and that, in FIG. 21, a discharge current flows via the resistors 90', 90" from capacitor 84 to the negative line 24. Consequently, the resistors 90', 90" determine the control parameter C0'.

The sign VZ' of ϵ determines whether this "antique" value of the control deviation is considered as a positive factor with the control parameter C1', or as a negative factor with the control parameter C1. A negative sign VZ' of the "antique" value ε', i.e. VZ'=−, means that the rotation speed n' was too high at the time of measurement. In this case, according to FIG. 21, a charge current flows via the resistors 318', 318" to the capacitor 84. These two resistors therefore determine the control parameter C1.

A positive sign VZ' of the "antique" value ε', i.e. VZ'=+, means that the rotation speed n' was too low at the time of measurement. In this case, according to FIG. 21, a discharge current flows via the resistors 322', 322" from the capacitor 84 to the negative line 24. These two resistors 322', 322" therefore determine the control parameter C1'.

One recognizes the great advantage of such an arrangement, namely that the control parameters can be adapted to specific applications, by simply adjusting the potentiometers 94", 90", 318" and 322" without the need to change the program in microprocessor 20, i.e. a large number of applications can be covered with a single particularly programmed microprocessor 20. The accuracy and rotation speed of a digital control are thereby achieved, although analog components are used.

The resistors 94', 94" determine the control parameter for P+I if the rotation speed is too low, whereas the resistors 90' and 90" determine the control parameter if the rotation speed is too high. Likewise, the resistors 318' and 318" determine the parameter for P if the rotation speed is too high, and the resistors 322' and 322" determine the parameter for P if the rotation speed is too low.

In FIG. 23, there is illustrated a sequence of events for the case where the rotation speed n is too low, but increasing. This is indicated by the fact that in line a) the time periods $T_H$ of the Hall signal become shorter, i.e. $T_2$ is smaller than $T_1$.

Because the rotation speed n is too low, signals DIFF are generated in line c) which correspond to a control deviation ε with a positive sign, i.e. VZ=+, and these signals DIFF become shorter because the rotation speed increases. One therefore obtains (left side outside the drawing) the signal +ε0, and subsequently the signals +ε1, +ε2, +ε3, etc.

These signals directly control the port B1, rendering the port highly resistive as long as these signals are present, so that a charge current flows to the capacitor 84 via the resistors 95, 94", 94', as long as B1=1.

At the same time when B1 starts to be=1, i.e. for example at the time t10 (FIG. 23h), the—previously high—signal B4 is set low, i.e. always during the time of ε' and as long as the sign of ε' is positive.

The high signal B1 exists from t10 to t11, i.e. during the time interval ε1. However, since the rotation speed increases, the previous value ε0 is longer and persists to time t12. During the time interval t10 to t11, the capacitor 84 is therefore charged via the resistors 95, 94" and 94' and discharged via the resistors 322', 322", so that during this time—according to FIG. 23h—the voltage $u_C$ at capacitor 84 increases because B1 dominates B4.

During the time interval t11 to t12, B1=0, and B4 remains=0, so that now only a discharge current flows from capacitor 84 via the resistors 322' and 322" to the negative line 24, lowering the voltage $u_C$ slightly during this time. Altogether, the voltage $u_C$ increases slightly between the times t10 and t12 (see FIG. 23), i.e. the (too low) rotation speed n is increased by the controller.

For an explanation of FIG. 23, lines a) to e), reference is made to the discussions of the corresponding lines of FIG. 8, which will not be repeated here.

The control of port B4 (at too low a speed, B3=0) is illustrated in FIG. 23, i.e. in a control cycle B4 is controlled by the respective value preceding ε, i.e. by ε', as symbolically indicated by the arrows 334.

FIGS. 24 and 25 again show the sequences of events when the rotation speed is too low. In FIG. 24, the rotation speed n increases, i.e. this situation corresponds to that of FIG. 23, whereas in FIG. 25, the rotation speed n decreases, e.g. due to an additional load applied to the motor 50 (FIG. 1) or the motor 230 (FIG. 15).

FIG. 24 shows once more in an enlarged scale the increase in the voltage $u_C$ between the points t10 and t11 and the subsequent slight decrease between t11 and t12.

FIG. 25 illustrates the case where the rotational speed decreases, i.e. in this case ε0 is shorter than ε1, and ε1 is shorter than ε2, because the duration TH (FIG. 23) of the Hall signal increases. In this case, ε1 persists from t13 to t15, whereas ε0 only persists from t13 to t14. As a result, both signals have an effect only during the time interval t13 to t14, i.e. only from t13 to t14 are B1=1 and the B4=0, so that during this time a charge current flows to the capacitor 84 via the resistors 95, 94", 94', and a discharge current to the negative line 24 via the resistors 322', 322". According to FIG. 25h, the voltage $u_C$ increases with a small slope during this time interval.

From time t14 on, B4=1, i.e. the discharge current via the resistors 322', 322" stops and only the charge current flows from t14 to t15 via the resistors 95, 94", 94' to the capacitor 84, causing the voltage $u_C$ to increase with a greater slope. The voltage $u_C$ therefore increases faster, as is evidenced by comparing FIG. 24h with FIG. 25h, because the P-portion has a stronger effect.

FIG. 26 shows a control process for the case where the rotation speed n is too high, but is decreasing. The duration $T_H$ of the Hall signals increases. Because the rotation speed n is too high, signals DIFF are obtained in line c) which correspond to a control deviation ε with a negative sign, i.e. VZ=−, and the duration of these signals DIFF decreases because the rotation speed n approaches the target rotation speed $n_0$. Consequently (left side outside the drawing), the signal −ε4, and subsequently the signals −ε5, −ε6, and −ε7, etc., are obtained.

These signals control the port B2 in the manner described with reference to FIG. 10, so that the port B2 has a low impedance as long as these signals DIFF are present. A discharge current flows then from capacitor 84 to the negative line 24 via the resistors 90', 90", as long as B2=0.

Concurrently with the start of DIFF, i.e. for example at time t20 (FIG. 26h), the previously low signal B3 is set to high, always during ε', as long as the sign VZ of ε' is negative.

The low signal B2 persists from t20 to t21, i.e. during the time interval ε5; however, because the rotation speed decreases, the previous value ε4 is longer and persists to time t22.

During the time interval t20 to t21, the capacitor 84 is therefore charged via the resistors 316, 318" and 318' and discharged via the resistors 90' and 90", so that the voltage $u_C$ at capacitor 84 decreases during this time, since the influence of B2 dominates that of B3 (through the appropriate selection of the above mentioned resistors which define the respective control parameters; the exact value of these resistors is usually determined through experimentation and also depends on the type of the motor to be controlled).

During the time from t21 to t22, B2=1, so that the diode 88 blocks, and B3 continues to retain the value 1. Consequently, now a charge current flows only via the resistors 316, 318", 318' to the capacitor 84, causing the voltage $u_C$, as illustrated, to increase again slightly (influence of P). Altogether, the voltage $u_C$ slightly decreases between the times t20 and t22, as illustrated in FIG. 26, i.e. the current to the motor 50 is reduced (by changing the pulse duty cycle TV of the PWM control device 60), so that rotation speed n decreases and approaches the desired target value $n_0$.

For a description of FIG. 26, lines a) to e), reference is made to the description of the corresponding lines of FIG. 10 which will not be repeated here.

The control of port B3 (at too high a rotation speed, B4 is always=1) is evident from FIG. 26, i.e. in a control cycle B3 is controlled by the previous value of $\epsilon$, as indicated symbolically by the arrows 336.

FIGS. 27 and 28 once more show the executions if the rotation speed is too high. In FIG. 27, the speed decreases, i.e. this situation corresponds to the illustration of FIG. 26, whereas in FIG. 28 the (too high) rotation speed increases even further, e.g., because the motor 50 is driven by its load.

FIG. 27 again shows in an enlarged scale the decrease of the voltage $u_C$ between the times t20 and t21 and the subsequent slight increase between t21 and t22, as has already been described above.

FIG. 28 shows the case of an increasing speed, i.e. $\epsilon 4$ is here shorter than $\epsilon 5$, $\epsilon 5$ is shorter than $\epsilon 6$, etc., because the duration $T_H$ (FIG. 23) of the Hall signal decreases. $\epsilon 5$ here persists from t23 to t25, whereas $\epsilon 4$ only persists from t23 to t24. Consequently, the two signals B2=0 and B3=1 are effective only during the time interval t23 to t24, so that during this time, a charge current flows via the resistors 316,318", 318' to the capacitor 84, while a discharge current flows to the negative line 24 via the resistors 90', 90". According to FIG. 28h, the voltage $u_C$ decreases during this time with a small slope.

From time t24 on, B3=0, i.e. the diode 320 blocks and the charge current from B3 to the capacitor 84 stops. Consequently, only the discharge current flows from t24 to t25 from capacitor 84 via the resistors 90', 90" to ground, so that the voltage $u_C$ now decreases with a steeper slope, as is evident from a comparison between FIG. 27h and FIG. 28h.

The basic principle of such a digital-analog controller can be expanded to a PID controller. The basic design of such a controller is illustrated in FIG. 29. As shown in FIG. 29, if in a memory arrangement 330 the value $\epsilon'$ for the control deviation from the previous measurements is continuously stored, and if in memory arrangement 331 the value $\epsilon''$ for the control deviation from the measurement prior to the previous measurements is continuously stored, then additionally, a D-type control is possible using a control parameter C2. (The signs of the control deviations are stored in memory arrangements 330 and 331 together with the respective values).

FIG. 29 shows, at 334, the difference equation which forms the basis for such a digital controller and, at 336, the influences of the control parameters C0, C1 and C2. The parameters for a completely digital controller are defined in the digital program and are therefore difficult to change, in particular when a microprocessor is used where the program is stored in ROM.—The summing junction in FIG. 29 has the reference numeral 332.

In the example illustrated in FIG. 30, the control parameters are moved from the microprocessor 20 to the outside, i.e. to the analog portion of the controller. FIGS. 31 shows how this is accomplished in a microprocessor with three tristate control outputs B31, B32, B33 with the help of three resistors R0, R1 and R2 defining the control parameters. Basically, C0 corresponds to the resistor R0, C1 to the resistor R1, and C2 to the resistor R2. The summing junction is formed by the capacitor 84. A large resistance value equals a small control amplification and conversely, a small resistance value equals a large control amplification. This aspect has already been described above in detail with reference to examples. Different controller types can thus be defined by selecting suitable resistance values.

P-controller

In this case, C0=C1 and C2=0, the i.e. the resistors R0 and R1 have identical values, e.g. 40 kOhm each, whereas the resistor R2 has the value $\infty$.

I-controller

In this case, C0=I, i.e. only the resistor R0 with a resistance of e.g. 100 kOhm is used. This case is identical to the first embodiment described in FIGS. 1 to 17 and representing a pure I-controller. The other parameters are C1=C2=0, i.e. each of the resistors R1 and R2 have the value $\infty$.

PI-controller

In this case, C2=0, i.e. the resistor R2 has the value $\infty$, and C0 is larger than C1, i.e. the resistor R1 is larger (e.g. 120 kOhm) than the resistor R0 (e.g. 100 kOhm). This situation has been described previously with reference to the FIGS. 21 to 28.

PD-controller

In this case, C0=P+D, so that the resistor R0 is e.g. 100 kOhm. It is C1=(–P+2D), so that R1 is equal to e.g. 85 kOhm. Moreover, C2=D-portion, resulting in a resistance value for R2 of e.g. 120 kOhm.

ID-controller

In this case, C0=I+D, so that the resistor R0 is e.g. 50 kOhm. C1 is then C=2×C2, so that R1=50 kOhm. C2=D-portion, so that R2=100 kOhm.

PID-controller

In this case, the equations listed in FIG. 29 at 336 apply, so that e.g.R0=50 kOhm, R1=50 kOhm and R2=150 kOhm.

The listed resistance values are merely intended to illustrate the resistance ratios and the order of magnitude of these resistors; these values are given for a microprocessor with tristate outputs. These exemplary values are based on experience with the illustrated embodiments.

In the following, there is described an embodiment for a control arrangement of the invention with a microprocessor with tristate outputs, more particularly for a PI-controller. Also provided are flow diagrams to illustrate the design and functionality with reference to a practical example.

As described above, in this case C2=0, i.e. the value of $\epsilon''$ before the previous value for the control deviations does not have to be stored, thereby eliminating both the memory arrangement 331 (FIG. 29) and the resistor R2 in FIG. 31, leaving only the tristate outputs B0 and B1 and the resistors R0 (e.g. 100 kOhm) and R1 (e.g. 120 kOhm). In FIG. 31 and in the flow diagram, one output of the microprocessor 20 has the reference numeral B31; a second output (FIG. 31) has the reference numeral B32 to emphasize the special ternary character of these two controller outputs as well as the difference with respect to the previous embodiments.

FIG. 32 illustrates how in this embodiment the rotation speed can be preset in the form of a digital value supplied to the inputs C0, C1 and C2 of microprocessor 20. This function is provided in this exemplary illustration by the resistors 350, 352, 354 and the three switches 356, 358, 360 which are used to switch the inputs C0, C1 and C2 selectively to the potential of the positive line 22, i.e. to "1", or to the potential of the negative line 24, i.e. to "0". These switches are shown as mechanical switches, but can also be implemented as contactless switches, to supply respective signals to the inputs C0, C1 and C2.

FIG. 33 illustrates the relationship between the switch position and the rotation speed: the (low) switch position "0" of all three switches corresponds to a rotation speed $n_1$, and the (upper) switch positions 111 to the rotation speed $n_8$. Eight different speeds can be digitally encoded with this embodiment. A larger number of speeds can be digitally preset by using additional switches and additional ports. The switches 356 etc. can be conventional DIP-switches, like those used with computers, or e.g. transistors. Logical signals can also be provided to the inputs C0, C1 and C2 by a digital controller.

FIG. 34 shows the associated circuit for controlling and commutating a two-phase motor 230. (Of course, any other type of motor can be used, but the description for a two-phase motor is particularly simple.) This circuit is in many aspects identical to that of FIG. 15, so that identical or parts with identical function are not described again, and reference is made to the description of FIG. 15.

This applies, e.g., to the PWM control device 60 (see FIGS. 13 and 14), to the current limiting circuit (resistor 58 and subsequent components), and to the control for commutating motor 230 via the outputs D0 and D1 of microprocessor 20'. Microprocessor 20' has two tristate outputs B31 and B32, with output B31 connected to node 82 via resistor R0 (see FIG. 31) and output B32 connected to node 82 via resistor R1. As mentioned above, R0 can have the value 100 kOhm and R1 the value 120 kOhm. These resistance values are for a capacitor 84 of e.g. 3.3 $\mu F$ which during operation generates the voltage $u_C$ which controls the pulse duty cycle of the PWM control device 60 when the current limiting circuit for the motor 230 is not active. (If the current limiting circuit is active, then the pulse duty cycle is controlled by the current limiting circuit, as described above in detail.)

As already described with reference to FIGS. 32 and 33, the rotation speed is digitally preset via the switches 356, 358 and 360, i.e. a predetermined numerical value of the rotation speed is assigned to each signal combination at the inputs C0, C1 and C2 of microprocessor 20', usually in the form of a half period duration T/2, e.g. at 50 revolutions per second and a two-pole motor, a half period of 10 ms. This half period is then compared with the half period T/2 (see FIG. 26A) of the Hall signal which measures the actual value of the rotation speed n. As illustrated in FIGS. 33, numerical values can be preset for eight different speeds. This represents a modification of the previous embodiments where an analog circuit was used to obtain the difference between target rotation speed and actual rotation speed. Alternately, any value of T/2 can be used in microprocessor 20' so that any desired rotation speed can be controlled. A respective memory arrangement has to be provided for storing this value.

FIGS. 35 shows the basic structure of the program. The program is started in step S370 and initialized in step S372. Step S374 includes the controller which consists of a number of program steps and is described with reference to the subsequent FIGS. 37A and 37B. Commutation (for an electronically commutated motor) can take place in step S376. The steps S374 and S376 form part of a loop S378 which is cycled continuously during operation. S376 is omitted for a collector motor.

FIG. 36 illustrates setting of the rotation speed target value. In step S382, the digital signal at the input ports C0, C1 and C2 is loaded into the working register W-REG, and in step S384 this information is combined with the constant 00000111 through a logical AND operation. Only the last three bits are then relevant, i.e. this number which consists only of the last three bits, is added to the program counter in step S386. The program counter (in microprocessor 20') then jumps in step S388 to one of the following eight addresses and transfers the target value for the rotation speed $n_0$ stored therein into the working register W-REG. In step S390 this information is imported into the main program as the target value. For the case of an electronically commutated motor, the next step is S376, i.e. the commutation, and the controller continuously cycles through the loop S378.

Since this loop S378 is cycled continuously, the looping time is relatively long and it may be advantageous to call up the right part of the flow diagram of FIG. 36 only in the event—in form of a subprogram—that the Hall signal changes. This would lead to a shorter looping time in normal situations, with the exception of those loops where the Hall signal changes. As described below, the time for cycling through the loop once is used for measuring time. It is here unimportant if one of the loops occasionally has a slightly longer duration, as long as the majority of the loops has a precisely defined duration.

FIGS. 37A and 37B show the flow of program section S374 of FIGS. 35 and 36, i.e. the digital portion of the rotation speed control.

Rotation speed control begins in step S400 and is part of the loop S378 (FIGS. 35 and 36) which is executed continuously during operation, requiring e.g. 30 $\mu s$ per loop. At 3000 rpm and for a two-pole motor, the interval T/2 between two commutation points is 10 ms=10,000 $\mu s$, i.e. the loop S378 is executed more than 300 times between two commutation points.

The number of cycles is counted and represents the actual value of the speed, namely an actual time duration, which is compared with the digitally preset target time duration which is set as described in FIG. 36.

During each pass, it is tested in steps S402, 404 and 406 whether the Hall signal has changed. If, for example, in the steps S402 and 404 Hall=0 and Hall-Old is also equal to 0, then the Hall signal has not changed. If, however, Hall=0 and Hall-Old=1, then the signal has changed so that Hall-Old is cleared in step S408, i.e. set to "0", i.e. the new Hall value is stored in register Hall-Old.

If in steps S402 and 406 Hall=1 and the Hall-Old=1, then the Hall signal has not changed either. If, however, Hall=1 and Hall-Old=0, then the Hall signal did change, so that the register Hall-Old is set to "1" in step S410. In this way, the change in the Hall signal can be reliably recognized again at the subsequent change of the Hall signal.

At each change in the Hall signal, the program goes to step S412 where both ports B31 and B32 are set to tristate, i.e. to a high impedance (see FIG. 20 and the respective description where this state is described). Since both ports B31 and B32 then have a high impedance, no current flows through the resistors R0 and R1 in FIG. 34, i.e. the charge of the capacitor 84 and consequently also the current in the motor do not change. This position can also be called a neutral position of the controller. Switching to tristate occurs regardless if the ports B31 and B32 are still active or have already been switched to tristate.

In S414, the control difference, i.e. the value RGL-DIFF which was determined during the previous cycle through the loop S378 and was reached before the change in the Hall signal, is moved as old value into the register RGL-DIFF-Old. This signal has the same function as the signal $\epsilon'$ described in the previous example, i.e. it represents the old value of the control deviation.

In S416, the control difference RGL-DIFF is determined from the target value (i.e. the value which was digitally preset e.g. via the switches 356, 358, 360 and which is available as a numerical value) and the actual counter position (which will be described below). As mentioned above, the control difference has a positive sign +Vz if the rotation speed n is too low, and a negative sign –VZ if n is too high. The sign is determined in S418 from the carry-flag for the signal RGL-DIFF.

If the carry-flag is set in S418, i.e. equal to "1"', indicating that carryover has taken place, then VZ is also set in step S420. The signal RGL-DIFF is then negative. If the result in step S418 is zero, then the register VZ is cleared (VZ=0) in step S422, meaning that RGL-DIFF is positive.

Prior to steps S420 and S422, the old signal VZ (from the previous measurement of the rotation speed) has to be moved to a register VZ-S, which occurs in steps S424 and S426. The sign of the old control difference RGL-DIFF-Old (see step S414) is thereby also stored. This sign is subsequently required for controlling the tristate port B32, see step S456.

In S428, the new control difference RGL-DIFF which was attained in S416, is transferred and stored as variable "PI-PORTION". This variable corresponds to the value $\epsilon$ in the previous embodiment.

Likewise, in step S430, the old control difference (step S414) RGL-DIFF-Old is transferred and stored as variable "ONLY-P-PORTION". This variable corresponds to the old value $\epsilon'$ in the previous embodiment.

In step S432, the actual value counter is cleared, since the result of the actual value counter was evaluated in step S416. A new measurement in this counter starts the next time the loop S378 is cycled through.

In this case (change of the Hall signal), the execution of the control process is terminated in step S434. According to FIGS. 35, the next step is S376, i.e. checking and controlling the commutation, before the loop S378 is executed again. Step S376 is necessary only if an electronically commutated motor is used. As in FIG. 1, this step is omitted for a collector motor.

A new pass through the controller portion starts at step S400. If no change in the Hall signal is detected in steps S402, 404, 406, then the program goes to step S436, where the actual value counter (in microprocessor 20') is incremented by 1 during each cycle through the loop S378, i.e. when the Hall signal changes, the contents of this counter will correspond to the time T/2 for the half period of the actual rotation speed. The actual value of T/2 (see FIGS. 39) is thus determined in step S436 by counting the number of loops S378 (which have a constant duration).

In step S438, the value 1 is subtracted from the variable PI-Portion (see S428), i.e. from the most current value of the control difference. In step S440, it is queried if the variable PI-Portion was changed to 0 during step S438. If this is not the case, then the program goes via step S442 in which the sign VZ is queried, either to step S444 in which the port B31 is switched to HIGH, i.e. the capacitor 84 is charged via the resistor R0 (rotation speed too low), or to step S446 in which the port B31 is switched to LOW, i.e. the capacitor 84 is discharged via the resistor R0 (rotation speed too high). The capacitor 84 is either charged or discharged via the resistor R0, depending on the signal VZ (see steps S420, 422), as long as the variable PI-PORTION has not changed to 0. Unlike in the previous embodiments, this occurs in the present example always following a change in the Hall signal. Whereas in the previous embodiments only a single controller operation takes place during each revolution of the rotor of 360° el., in the present example two control operations take place during each revolution of the rotor of 360° el., so that the controller becomes faster and more accurate.

Figuratively speaking, the control difference RGL-DIFF as determined in S416 is "mirrored" directly at port B31 after each change in the Hall signal, causing an immediate and effective response to the measured change in rotation speed. This is due to the fact that in the present example, only 180° el. are needed for measuring RGL-DIFF, and not 360° el., as in the previous examples.

If in S440 the variable PI-PORTION becomes 0 before the Hall signal changes, then the port B31 is set to tristate in S448, i.e. to a high impedance. Port B31 then does no longer influence the charge of capacitor 84. This is, for example, also true if the motor 230 rotates exactly with the desired speed, since then the variable PI-PORTION determined in step S416 is PI-PORTION=0, i.e. the charge of capacitor 84 is not changed at all in this case.

After execution of S448, the port B31 remains at a high impedance at least through the next change of the Hall signal. The variable PI-PORTION is again set to 1 in step S450, so that it can again become 0 in step S438 when the of loop S378 is executed next (and does not assume the value 255 which would be the next value following 0 in this case).

In S452, the value 1 is likewise subtracted from the variable ONLY-P-Portion (see S430), i.e. from the old value ($\epsilon'$) of the control difference, during each cycle through the loop S378. If this value subsequently becomes positive which is checked in S454, then the sign of the valuable ONLY-P-Portion is checked in S456. If the answer in the S456 is NO, then the port B32 is set to LOW in S458 (this should be compared with S444, where the port B31 in the analog case is switched to HIGH, i.e. in S458 the negative (reversed) sign VZ' of $\epsilon'$ is evaluated, as described in detail in the FIGS. 22 ff. The sign is reversed by software, as described).

If the answer in step S456 is YES, then port B32 is switched to HIGH in step S460, again unlike the analog step S446. As already described in detail with reference to the FIGS. 23 to 28, this type of control of the ports B31 and B32 provides a PI-operation of the controller.

If the variable ONLY-P-Portion in step S454 has a value 0, then port B32 is switched to a high impedance in step S462, i.e. switched into its neutral position, so that the port B32 does no longer influence the charge of capacitor 84. In the subsequent step S464, similar to the step S450 and for the same reasons, the variable ONLY-P-Portion is again incremented by 1.

The control segment terminates following steps S458, S460 or S464, whereafter the program goes to step S436 and thereafter to controlling the commutation, finally cycling again through loop S378.

The variable ONLY-P-Portion is likewise "mirrored" at port B32 directly following a change of the Hall signal.

The commutation program (FIG. 38) starts at step S470. In step 472 the Hall signal is queried. If Hall=0, then the output D1 of the microprocessor 20' (FIG. 34) is set to 1 and the output D0 is set to 0 in step S474, i.e. the winding strand 236 receives a current $i_1$ in the form of short pulses with a frequency of e.g. 25 kHz, with the duty cycle of the pulses controlled by the PWM control element 60.

If in step S472 Hall=1, then in step S475 D1=0 and D0=1, i.e. the strand 238 receives a current $i_2$, also in form of the above-described pulses. The signals D0 and D1 remain stored until they are switched by the program. This is also the case for the previous examples. The commutation program terminates in step S480 and continues from there to loop S378, see FIGS. 35 and 36.

FIGS. 39 shows the situation where the rotation speed n is too low, but is increased by the control process. Shown in a) is the Hall signal as a function of time during a revolution of the rotor by 360° el. Shown in b) is the counter position of the actual value counter (in microprocessor 20') which numerically counts the number of loops S378 between 0° el. and 180° el., and between 180° el. and 360° el. SW is here the numeric target value for the speed; IW is the counter state of the actual value counter. At 490, there is shown that the (enlarged) curve IW consists of small staircase steps because the value IW is incremented by 1 at each step S436.

The value RGL-DIFF is measured at 0° el., 180° el., 360° el., etc., (step S416), producing the values $\epsilon_1$, $\epsilon_2$, $\epsilon_3$, etc., which are assumed to be positive since the rotation speed is too low.

The port B31 (FIG. 39c) is in tristate (FIG. 39: TS) until the rotor reaches the position 0° el., thereafter changing at 0° el. during the time $\epsilon_1$ to "1", which is effected by the steps S438, 442 and 444. At the end of $\epsilon_1$ (=PI-PORTION), the port B31 is again switched to TS in step S448.

Likewise, the port B32 (FIG. 39d) is at TS until the rotor reaches the position 0° el., and switches then to "0" for the duration RGL-DIFF-Old (step S430). This duration is here denoted with $\epsilon_0$. At the end of $\epsilon_0$, the port B32 is again switched to TS in step S462.

As indicated by the arrows 492, the opposite sign of the "old" value of $\epsilon$ is always used in a subsequent control cycle for controlling the port B32. This is the result of step S430.

FIG. 40 shows—somewhat exaggerated—the corresponding curve form of the voltage $u_C$ at capacitor 84. As long as B31 is "1" and simultaneously B32 is "0", i.e. during the time $\epsilon_1$, the voltage $u_C$ increases. At the and of $\epsilon_1$, B31 is at TS, while only B32 is still at "0" so that the voltage $u_C$ decreases slightly until the end of $\epsilon_0$. This curve form is evidently identical to that of FIG. 24h. With the difference, however, that in FIG. 24 only a single control process takes place during a revolution of the rotor of 360° el., whereas in FIGS. 39 two control processes take place so that this controller operates faster and more accurately. The principle of operation, however, is identical.

FIG. 41 illustrates the situation where the rotation speed n is too high, but is decreased by the control process. FIG. 41a essentially corresponds to FIG. 39a, i.e. showing the curves as a function of time and not as a function of angle; the angle is indicated in parentheses.

In FIG. 41b, there is again illustrated the counter position IW of the actual value counter (in microprocessor 20') which at the enlarged scale of 490 has a staircase curve form. The value RGL-DIFF is obtained at a rotor position 0° el. which is assumed to be negative and is referred to as $-\epsilon_5$; similarly at 180° el. $-\epsilon_6$; at 360° el. $-\epsilon_7$; etc. The control process causes these values to decrease which is illustrated in somewhat exaggerated form, since otherwise the principle would be difficult to understand.

Beginning at 0° el., the port B31 is switched to LOW during the duration $\epsilon_5$. This is effected in steps S440, 442 and 446. At the and of $\epsilon_5$, B31 is again switched to TS in step S448.

Likewise, beginning at 0° el., the port B32 (FIG. 41d) is switched to "1" during the duration of RGL-DIFF-Old (step S430) which is here referred to as $\epsilon_4$. This is effected in steps S452, 456 and 460. At the and of $\epsilon_4$, B32 is again switched to TS in step S462.

The arrows 498 illustrate that the previous $\epsilon$-value with reversed sign is always used for the port B32, which is effected in step S430.

FIG. 42 shows the course of voltage $u_C$, starting from 0° el. at an enlarged time scale as compared to FIG. 41. During the duration of $\epsilon_5$, B31=0 and B32=1, so that the voltage $u_C$ decreases. At the end of $\epsilon_5$, B31 becomes=TS and only B32 remains HIGH ("1") until the end of $\epsilon_4$; during this residual time $u_C$ increases again slightly. This corresponds to the diagram of FIG. 27.

If the resistance R1 has the value ∞ in FIGS. 34, then the controller is also operational, but somewhat less perfect. Such a simple design is sufficient for many applications, and the corresponding programs steps S454 to S464 can then be eliminated or skipped.

As demonstrated by the large number of illustrated and described examples, the described control principle can be varied in many ways, allowing numerous additional modifications. If it is, for example, the object to control a temperature, then the temperature values have to be sampled repeatedly, for example once every millisecond, before the temperature can be subsequently controlled. This could also be done for controlling the speed of a motor; however, it is usually much more advantageous in this case, if the actual rotation speed is determined at the time when a corresponding signal is generated at a predetermined rotational position of the motor, e.g. a Hall signal, as described above. The control deviation, including the sign of the control deviation, can then be determined rather easily.

In many situations, it can be advantageous to adjust the control parameters (P, I, D) together. If, for example, such a rotation speed controller has to be adapted to a different motor type, then the values of the control parameters may change, but usually not their ratio to each other, since the ratio for most of the electric motors is rather similar.

FIG. 44 also illustrates how the contribution $Y_{(k-1)}$ to the summing junction 332 is generated in 496.

Figure 37A:
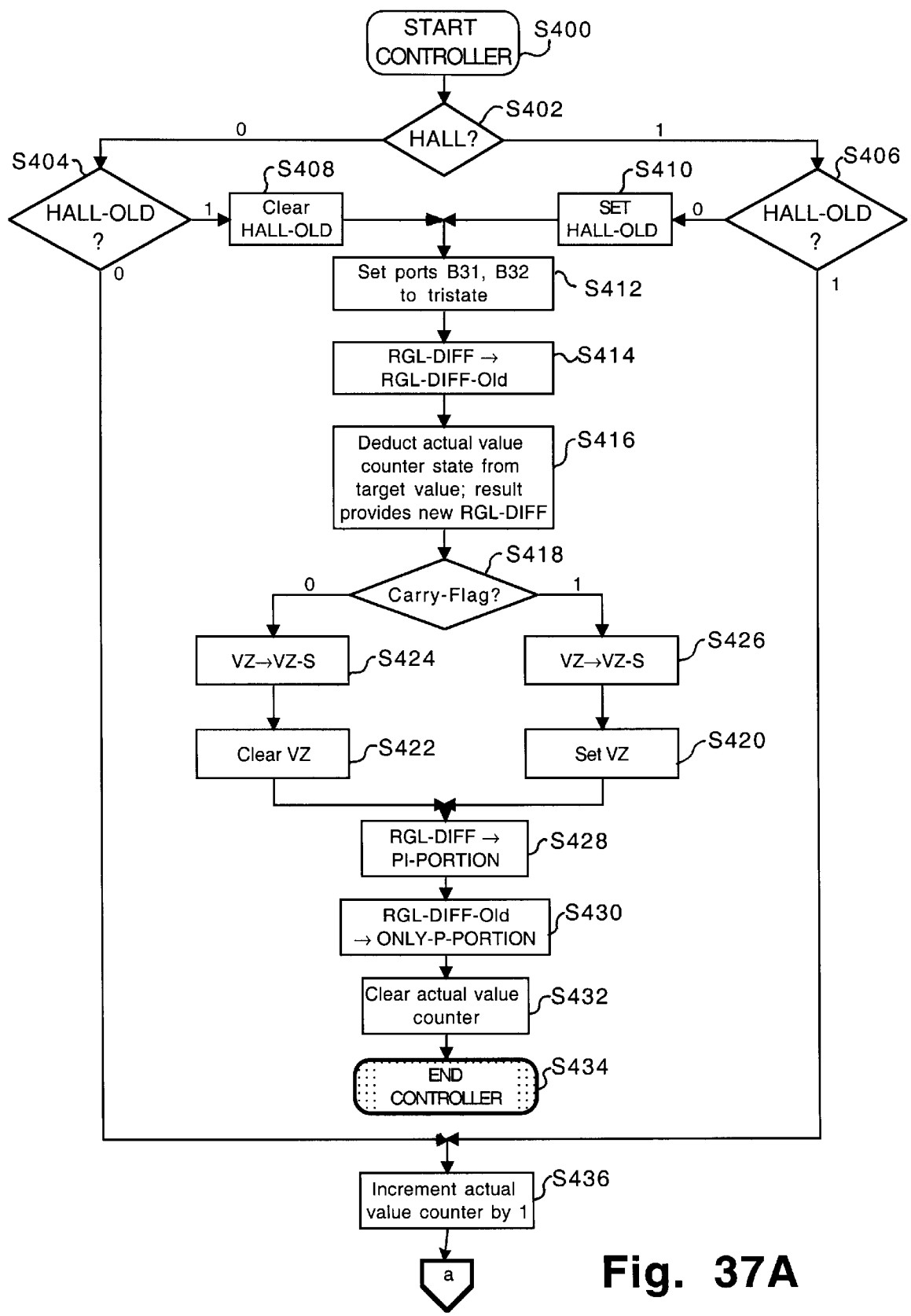
Figure 37B:
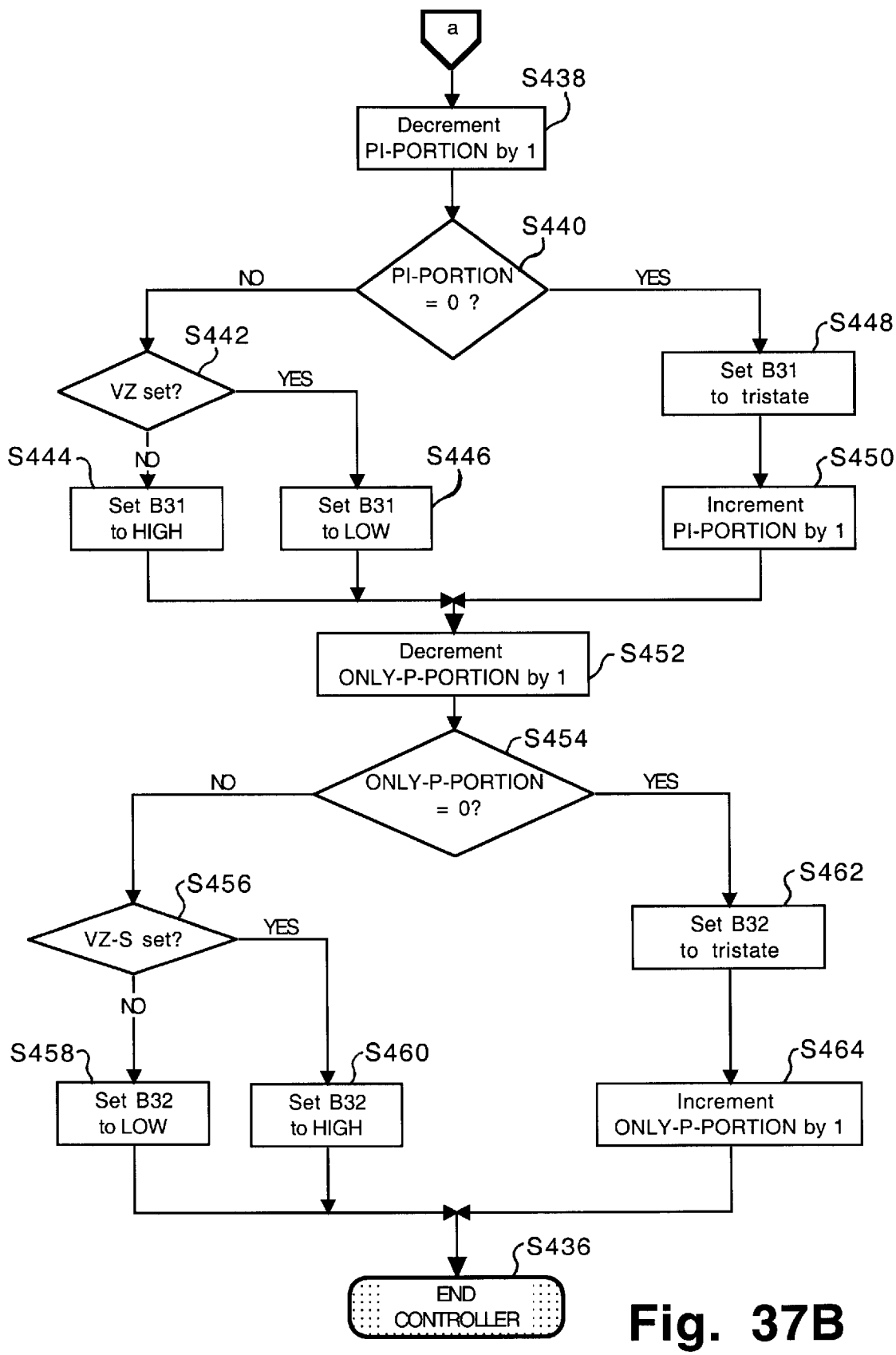
Figure 38:
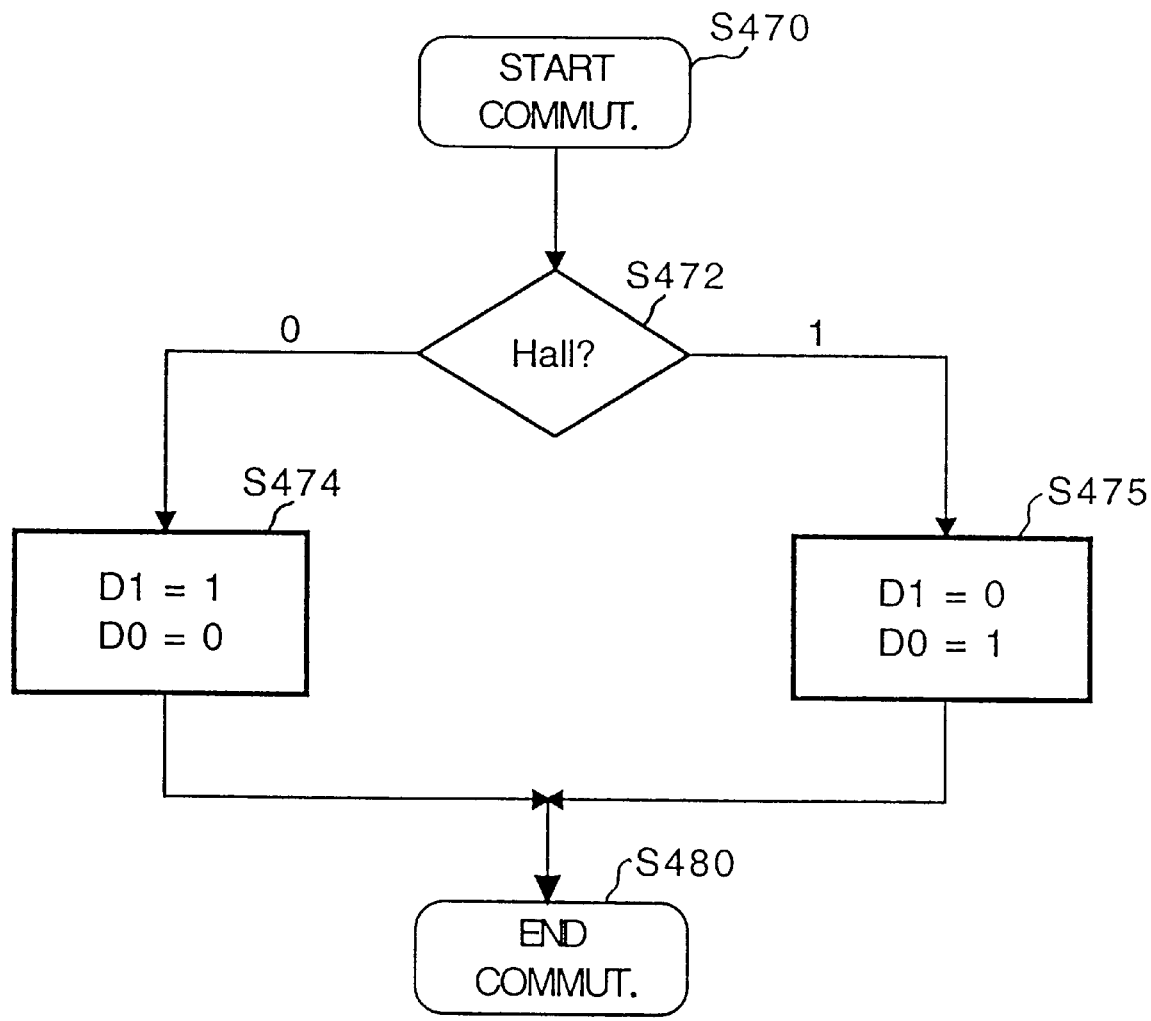
Figure 39:
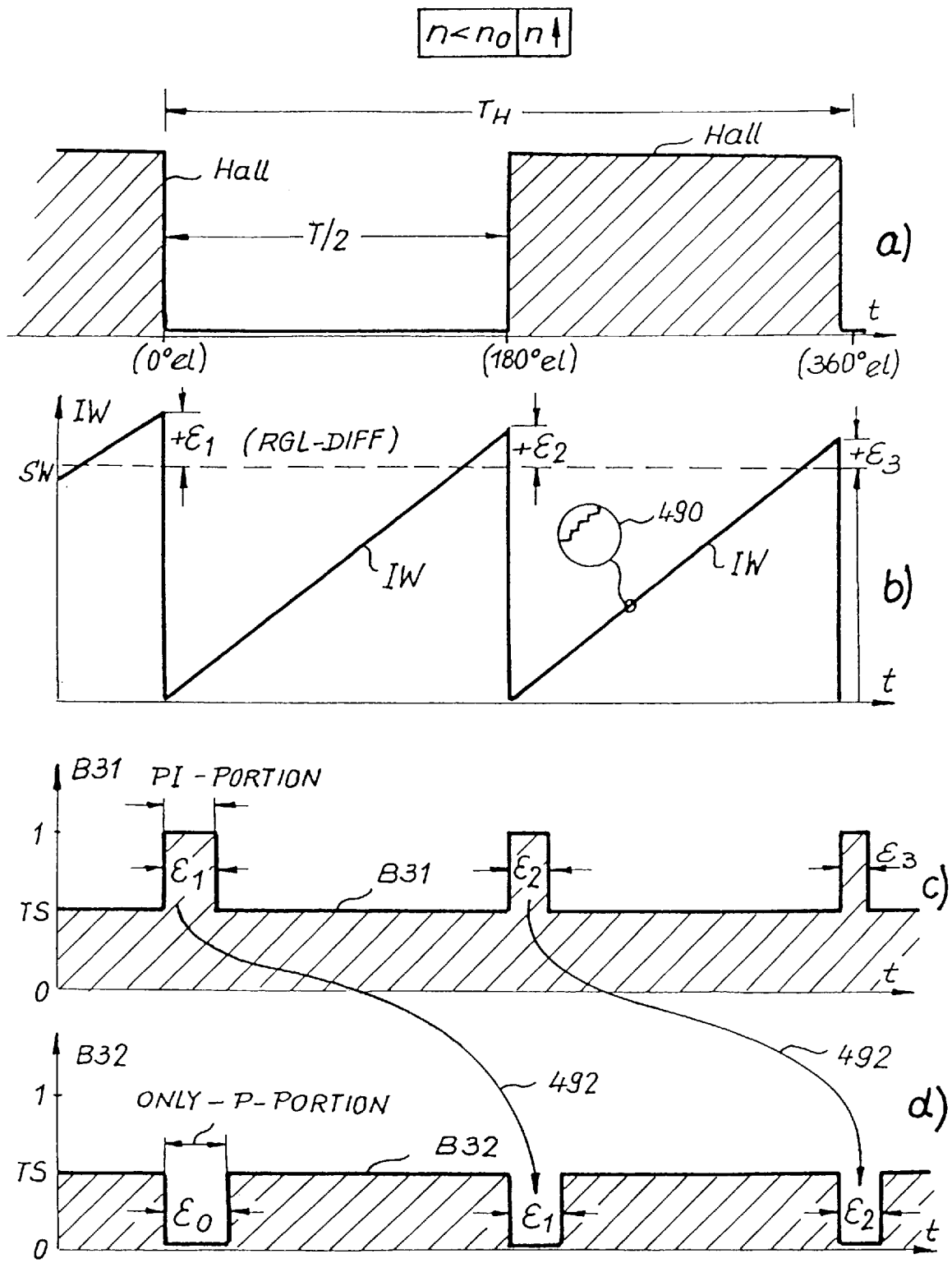
Figure 40:
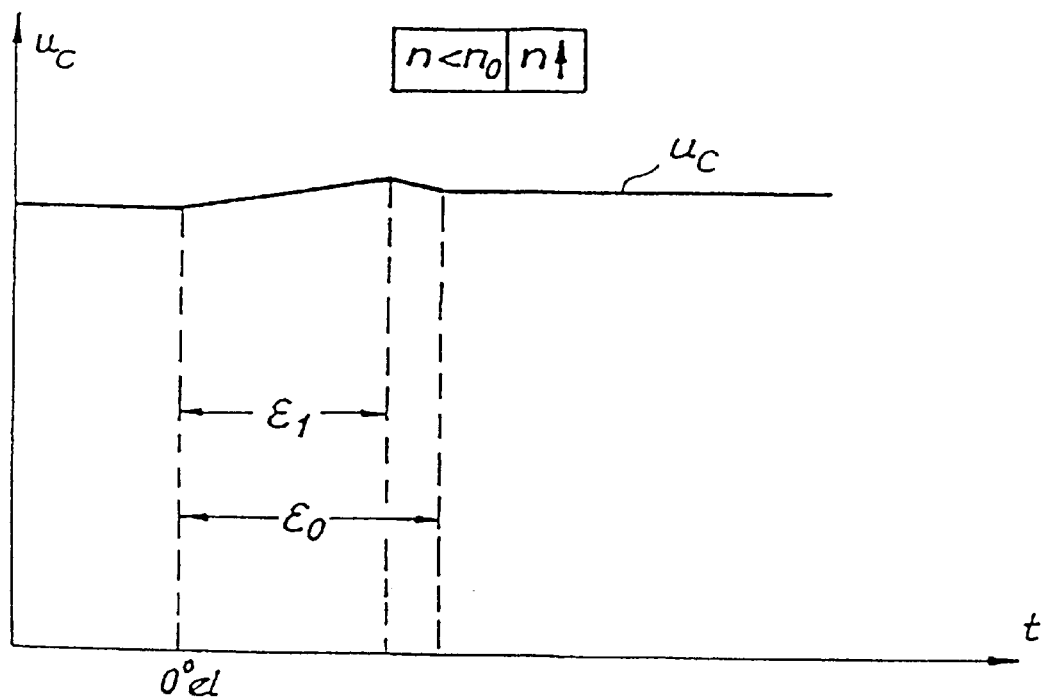
Figure 42:
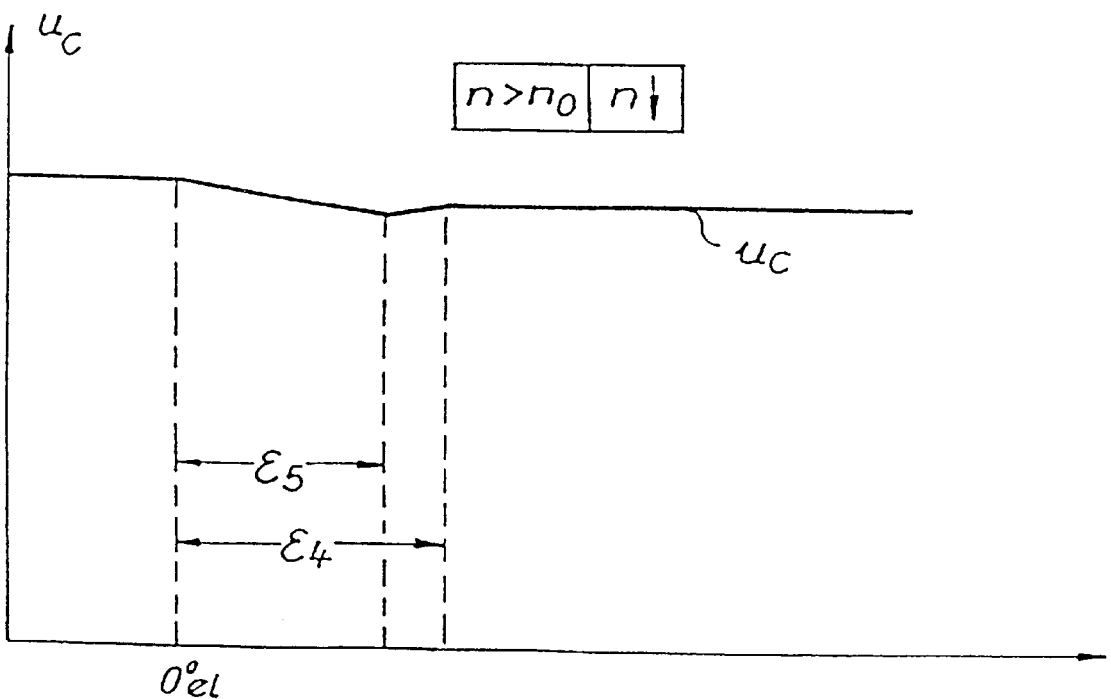
Figure 41:
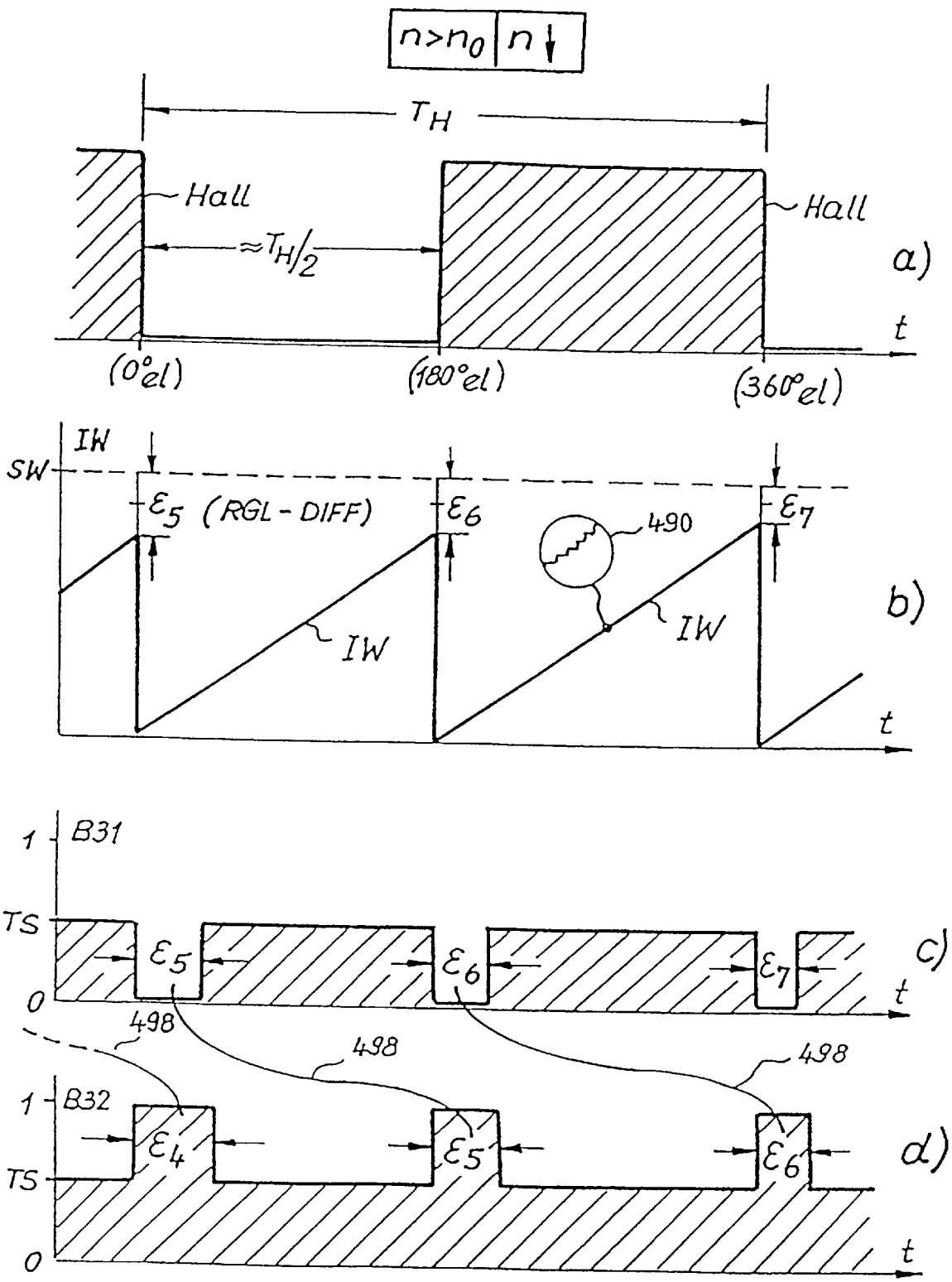
Figure 44:
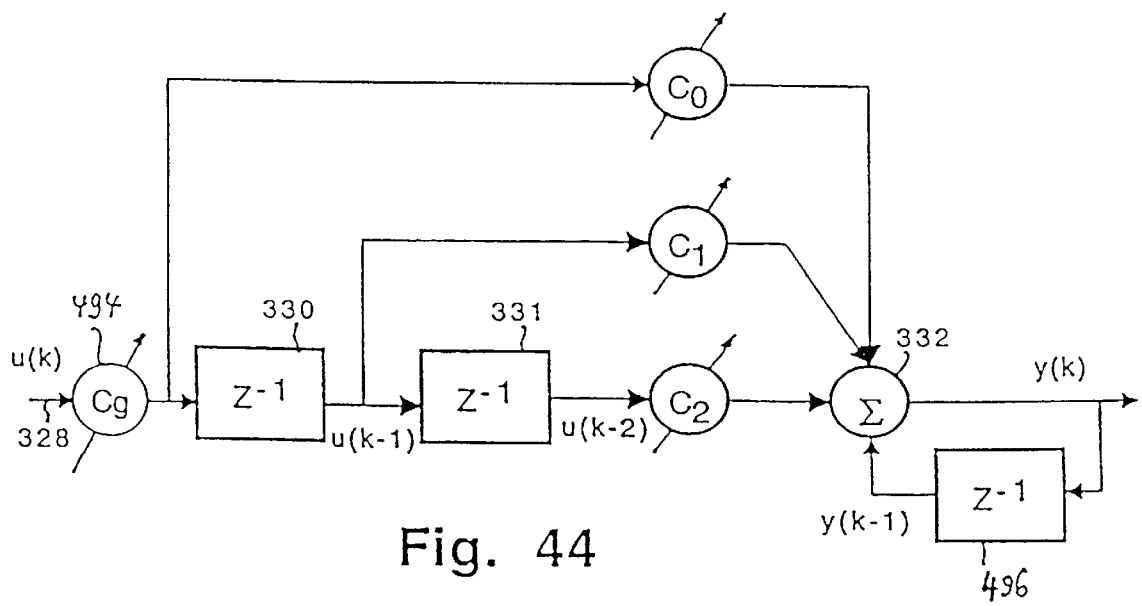
FIG. 44 shows the same principle at the input of a controller in which the total amplification $C_g$ can be changed in amplifier 494.
Figure 45:
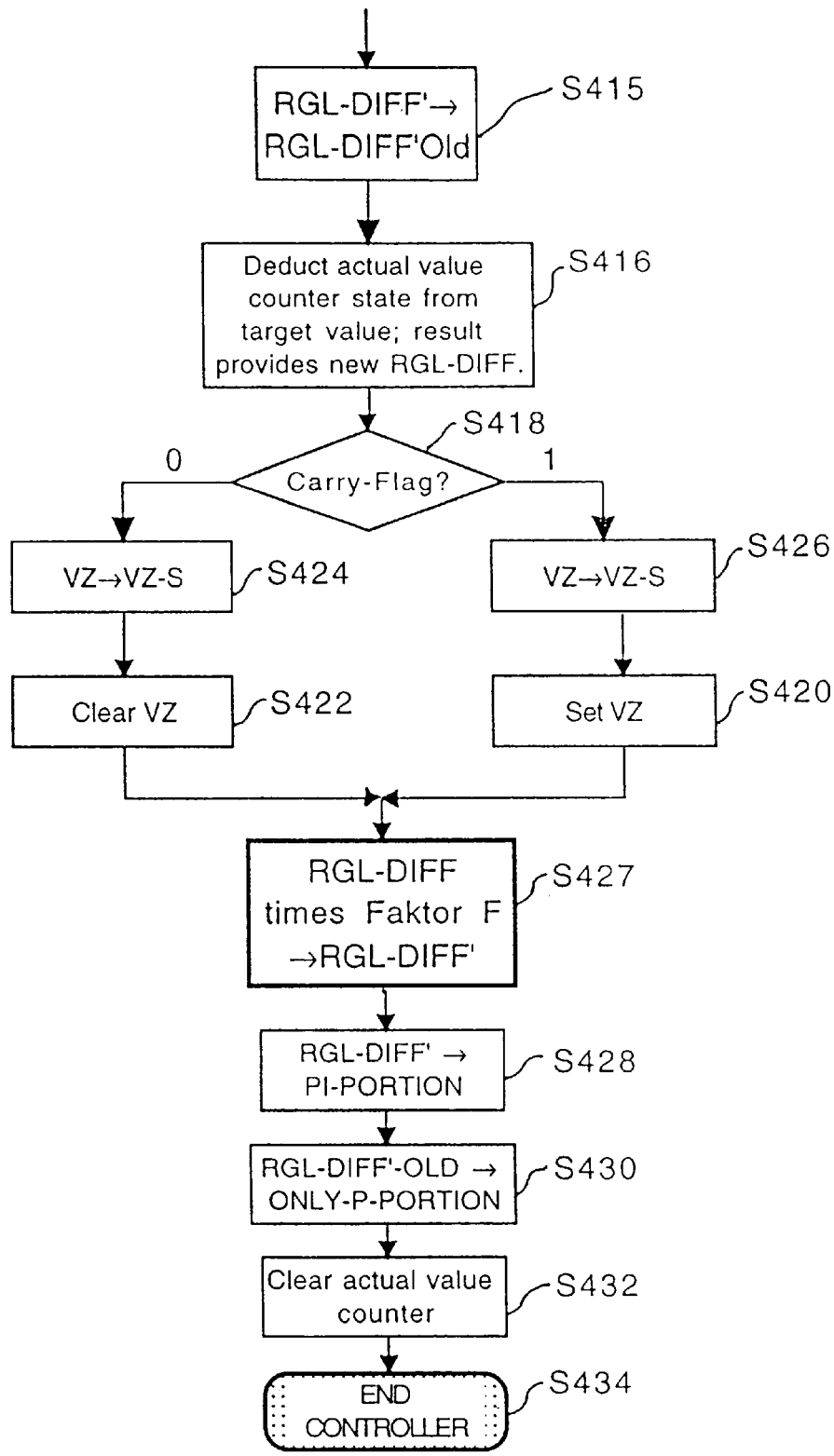

FIG. 45 shows with reference to a modified section of FIGS. 37 how an amplification factor F (corresponding to $C_g$ in FIG. 44) can be implemented with an enhanced flow diagram. For this purpose, the quantity RGL-DIFF which was determined in step S416, is multiplied in step S427 by the factor F, e.g. doubled, generating the quantity RGL-DIFF' which is then used in step S428 as PI-PORTION $\epsilon$. The same quantity is also stored in step S415 as RGL-DIFF'-Old and is then used in step S430 as P-portion, i.e. as $\epsilon'$. This provides, for example, a larger control amplification. The potentiometer $R_g$ can subsequently be more finely adjusted according to FIG. 43, without the need to change the program.

Figure 43:
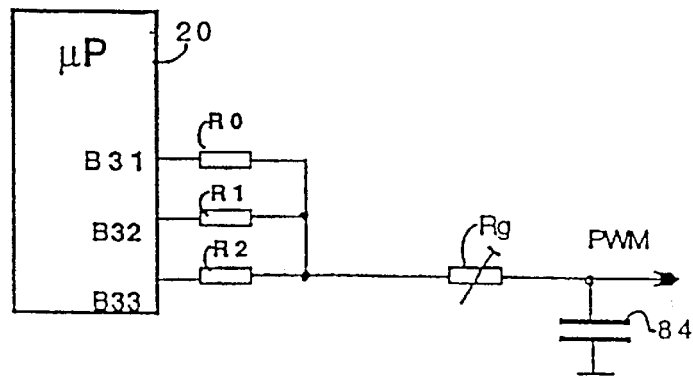
FIG. 43 shows how such an adjustment can be made conveniently with the help of a common resistor $R_g$ (e.g. a potentiometer 0 . . . 45 kOhm). The resistors R0, R1 and R2 then do not have to be changed; only the potentiometer $R_g$ has to be readjusted to adapt the controller to a different motor.

The modification depicted in FIG. 43 is also possible with the FIGS. 1, 3, 11, 12, 18, 21 and 34.

A modification similar to FIG. 45 is not possible with FIGS. 1 to 28, since there the charge of the capacitor 84 changes during the determination of the control deviation DIFF. Conversely, in the embodiment of FIGS. 32 to 42, the control deviation RGL-DIFF is determined first (step S416), before subsequently the charge of capacitor 84 is changed (steps S438 to S464), so that in this case the value (RGL-DIFF*Factor F; S427) can be used for changing the charge of capacitor 84. If necessary, the factor F can be supplied to the motor externally for changing its control characteristics.

Figure 1:
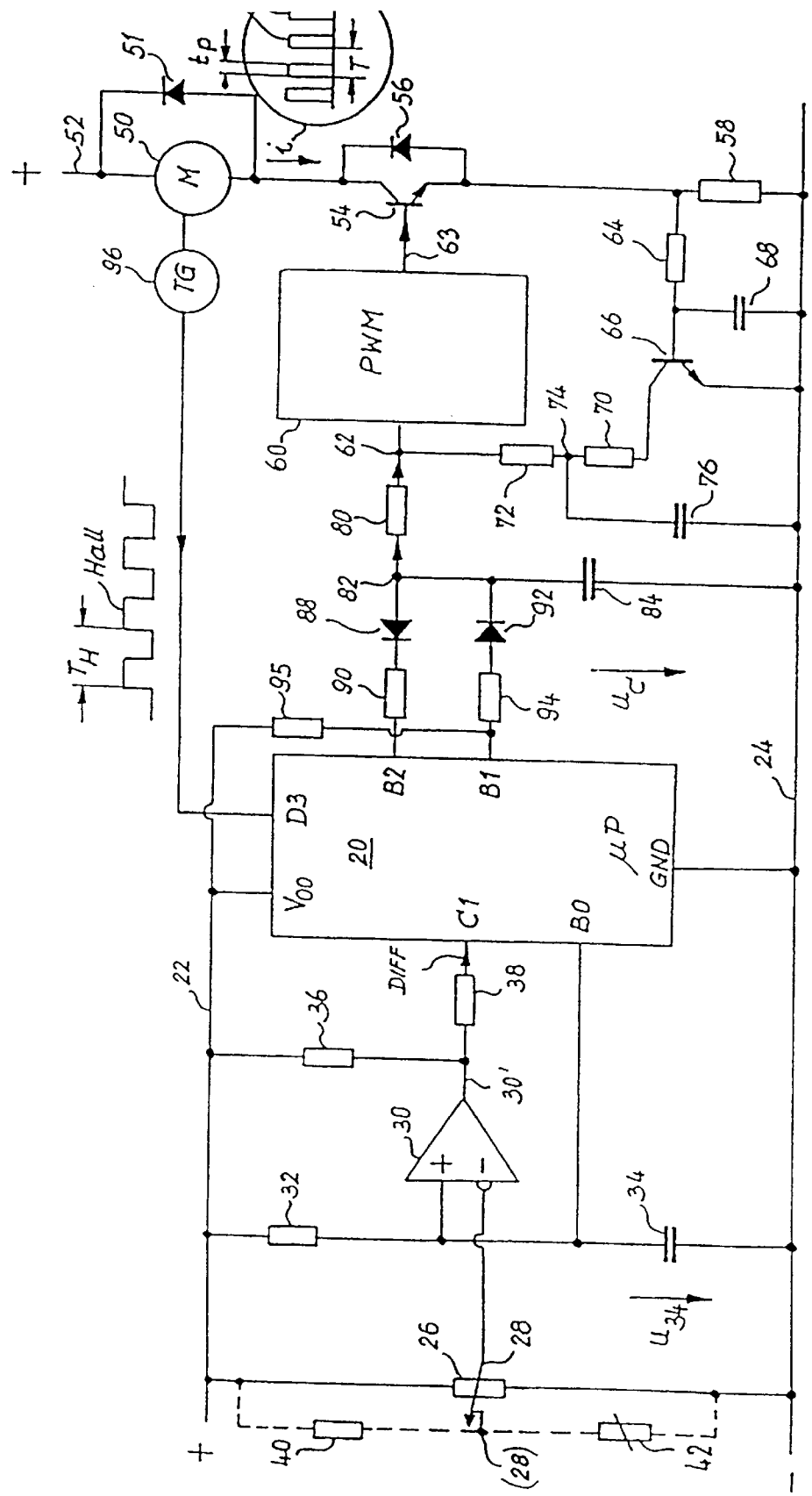
Figure 6:
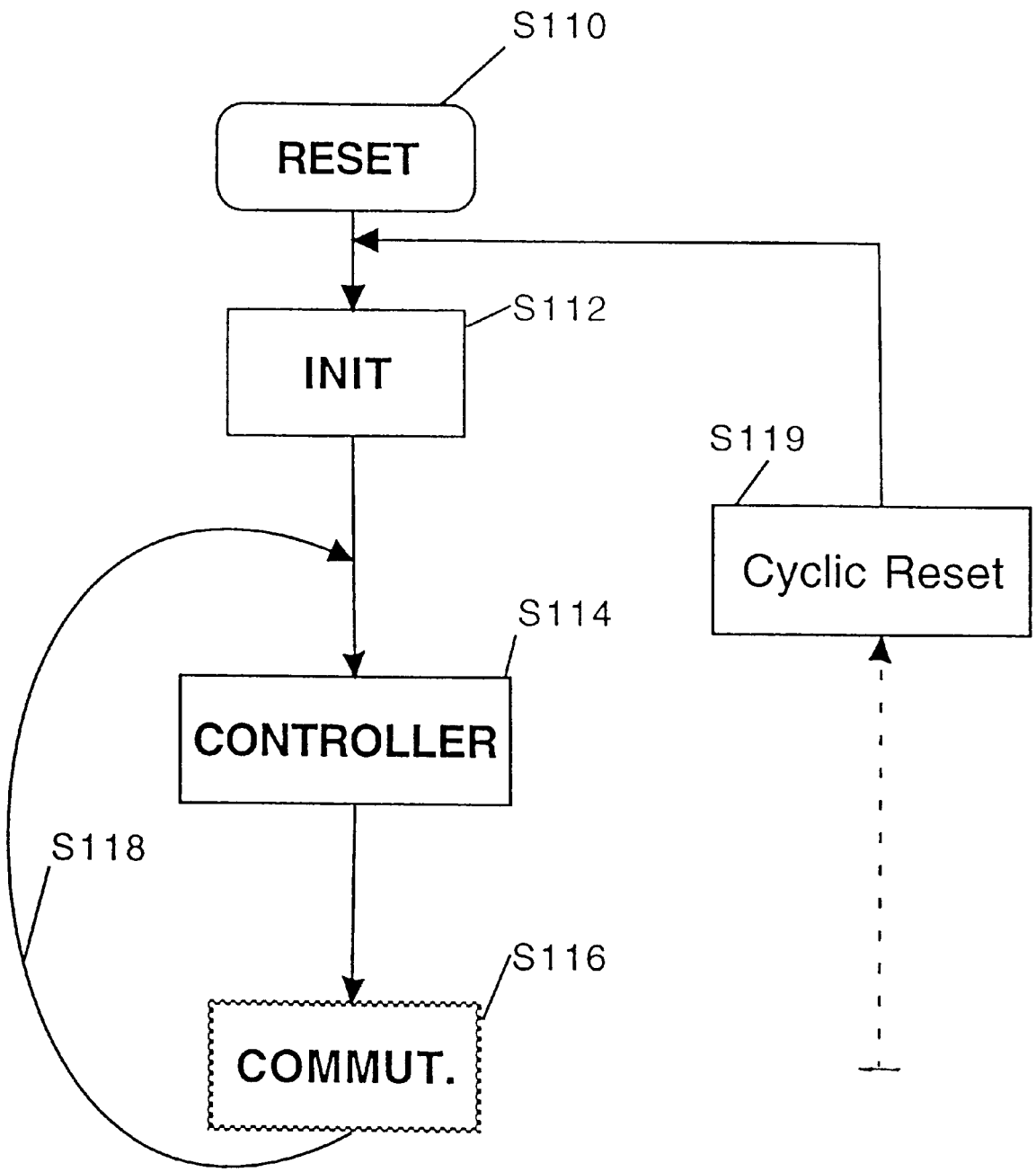
Figure 7:
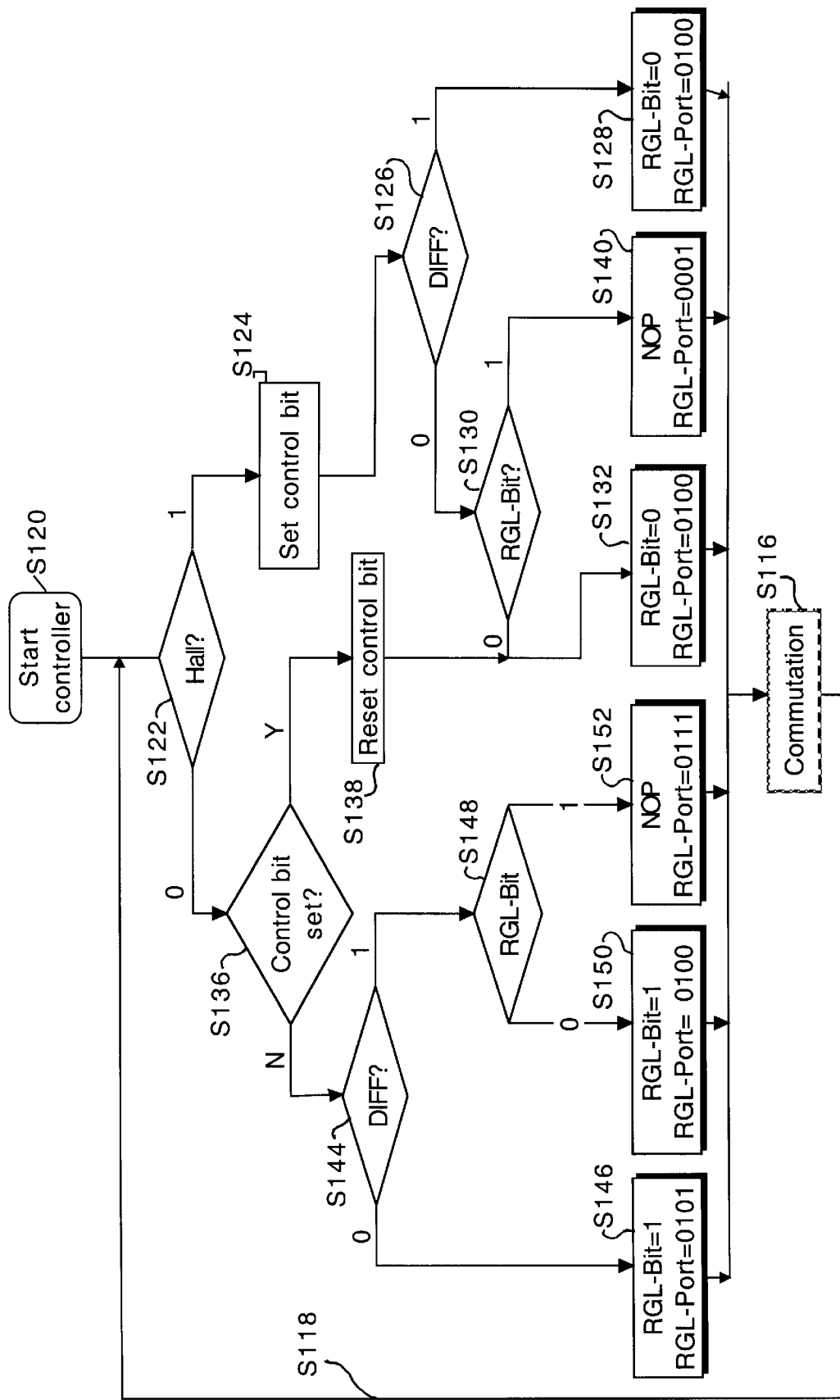
Figure 8:
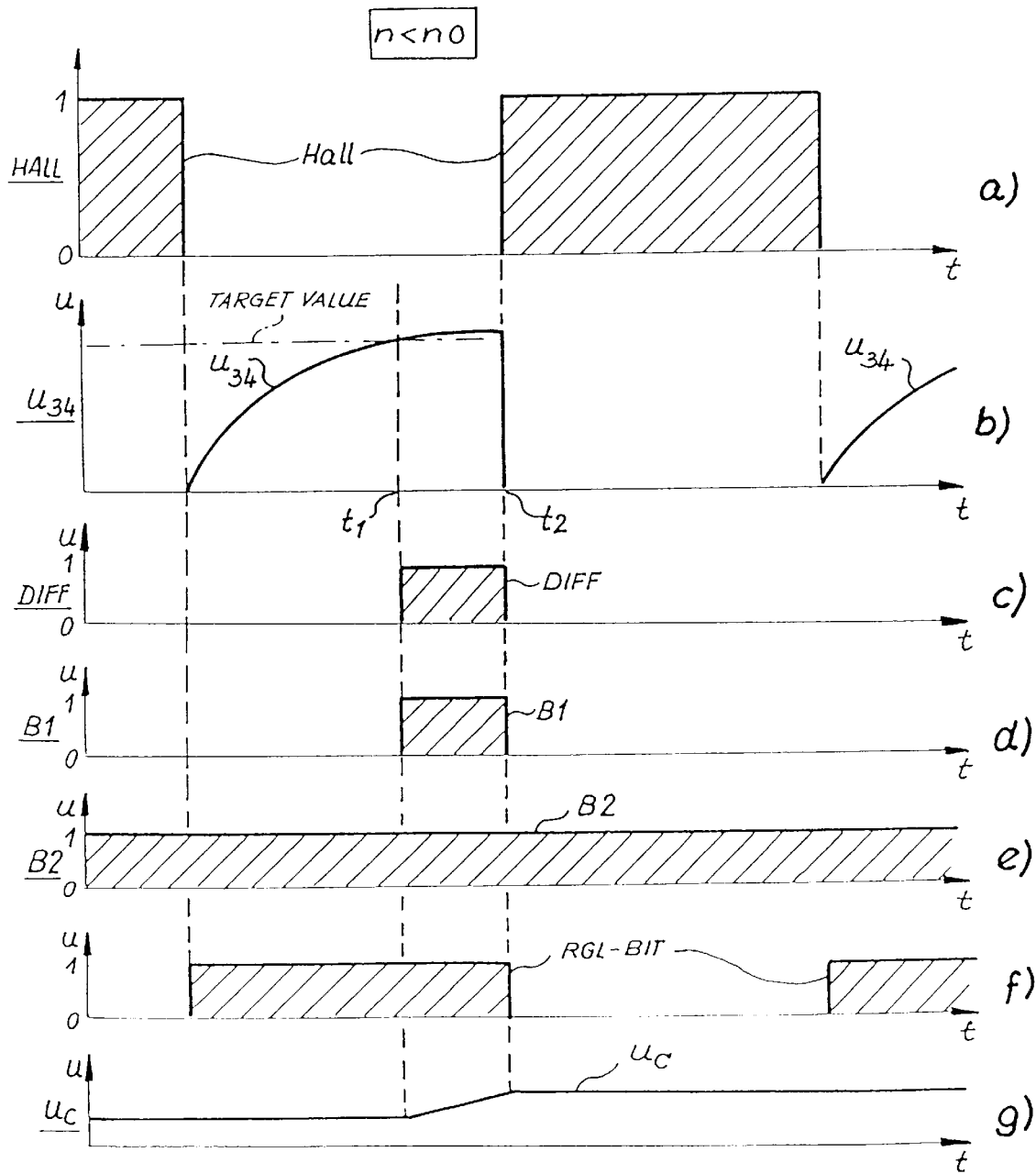
Figure 9:
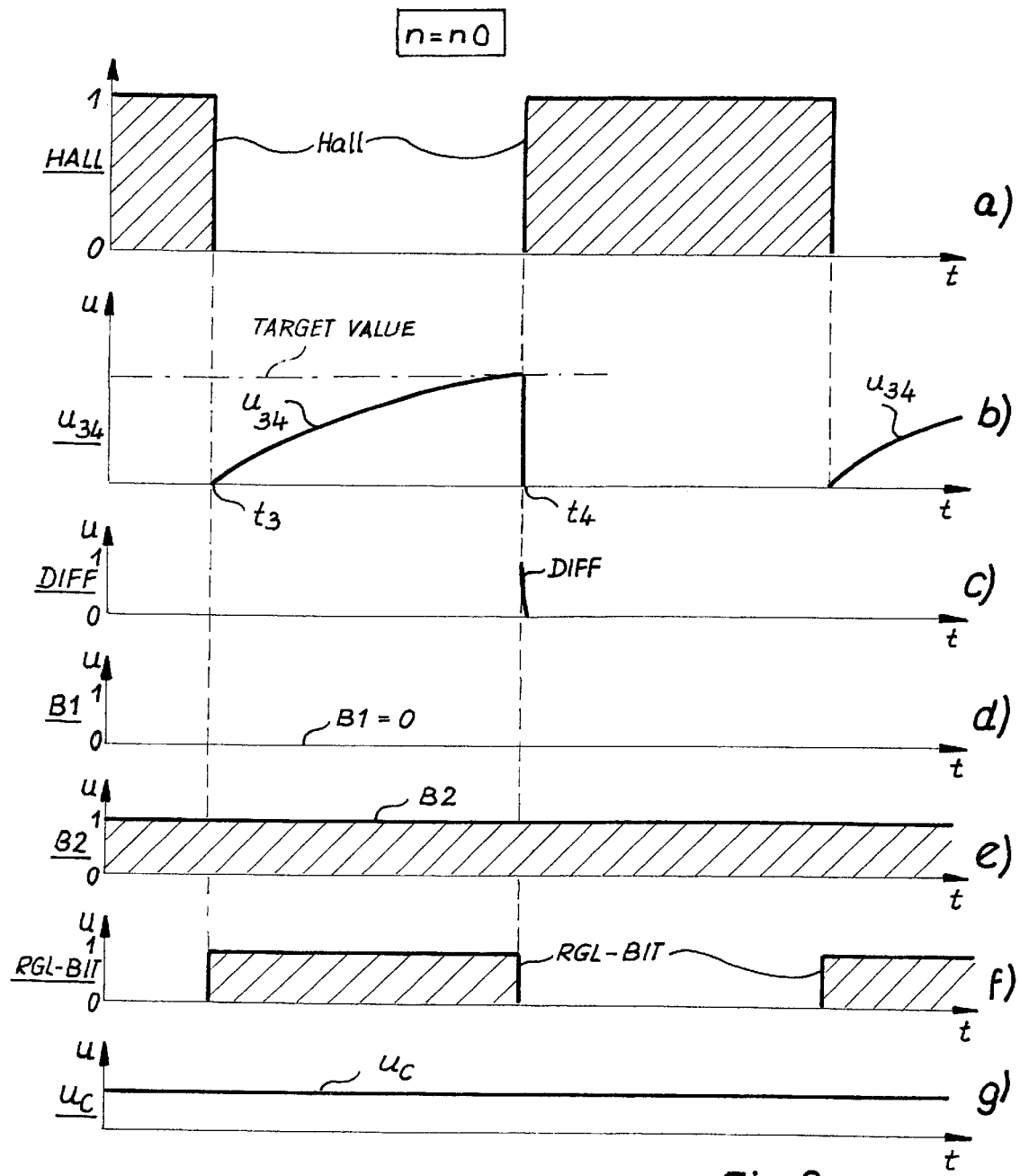
Figure 18:
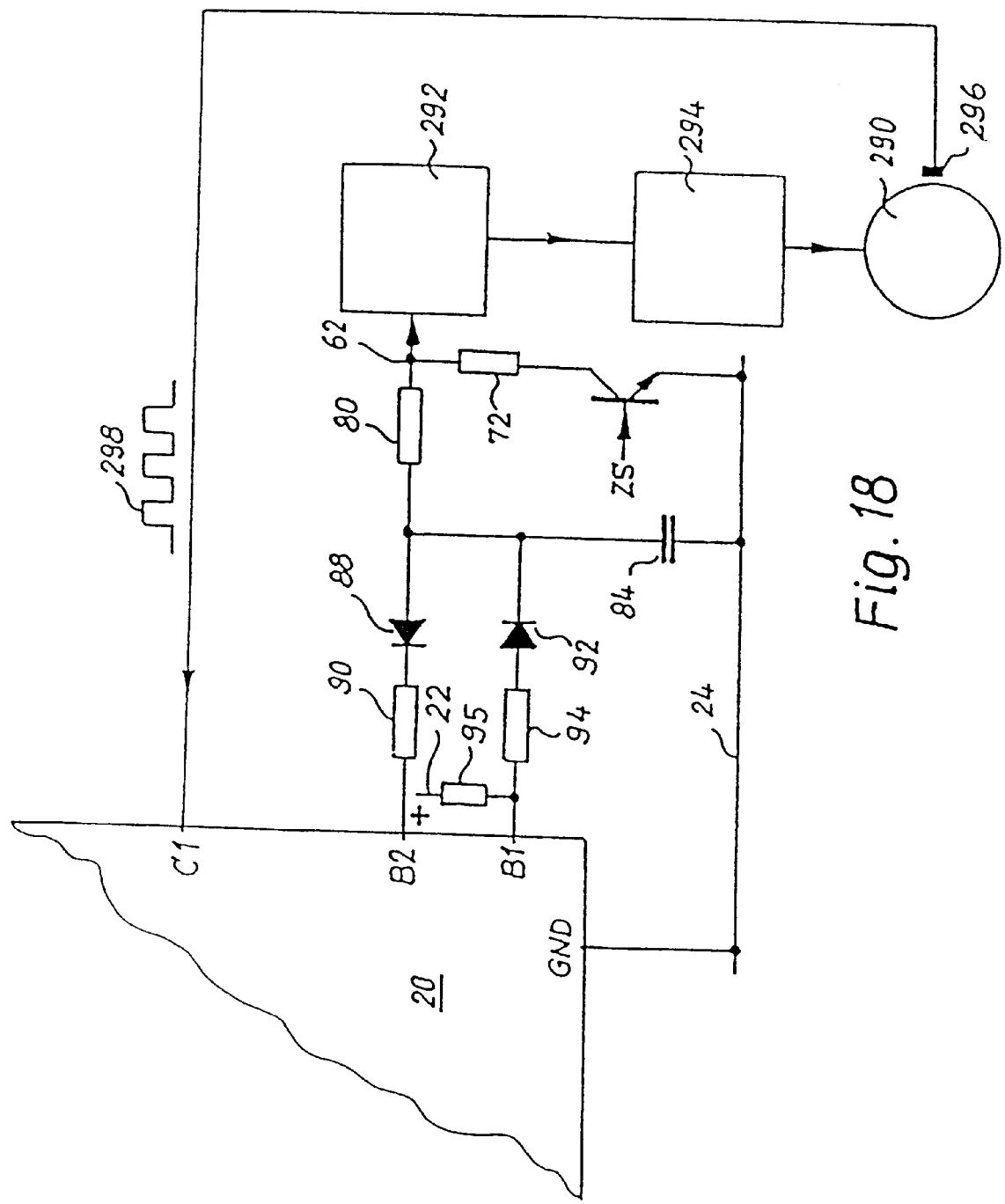
Figure 19:
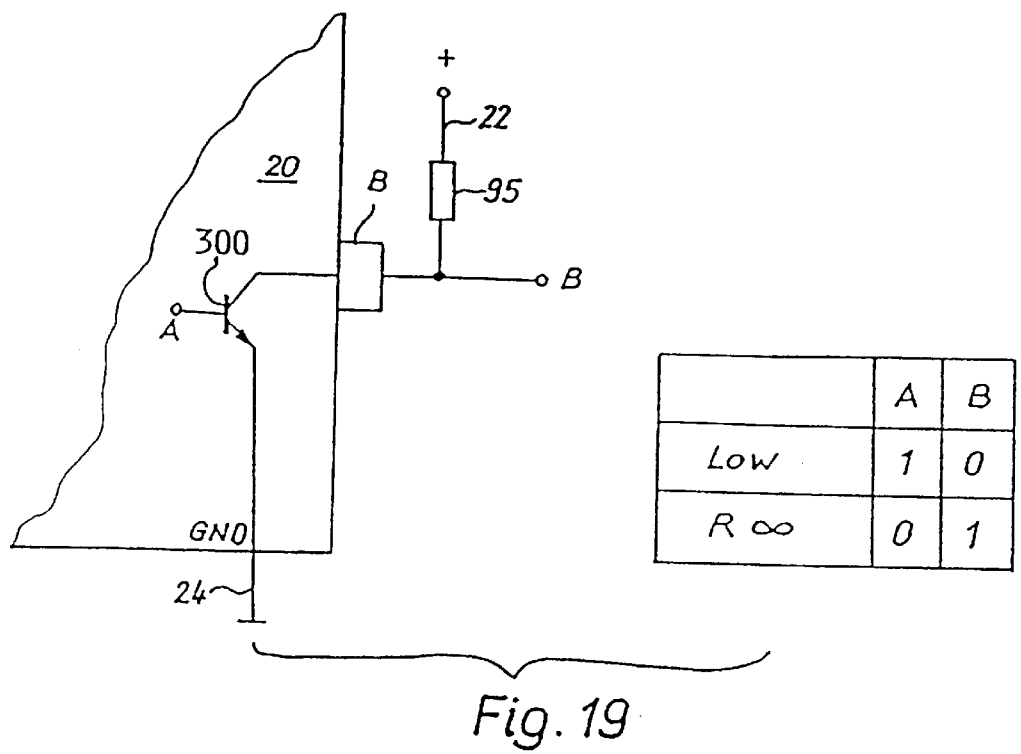
Figure 20:
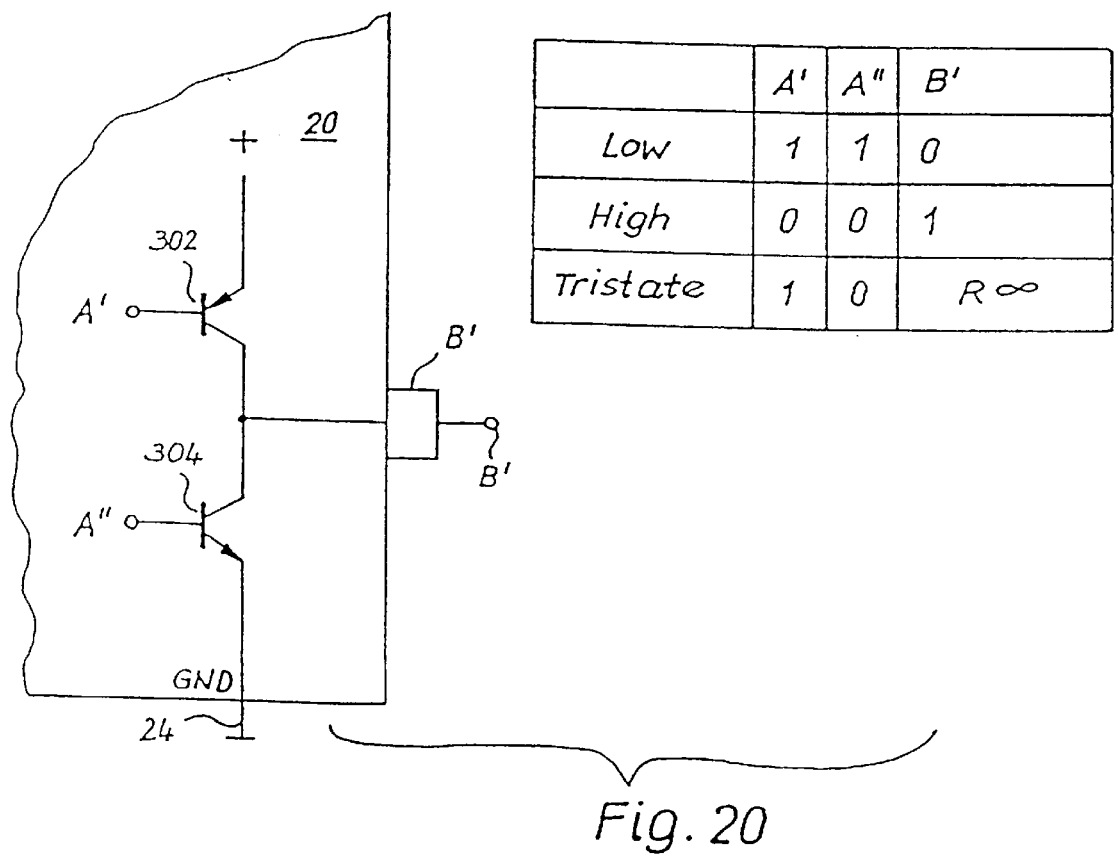
Figure 21:
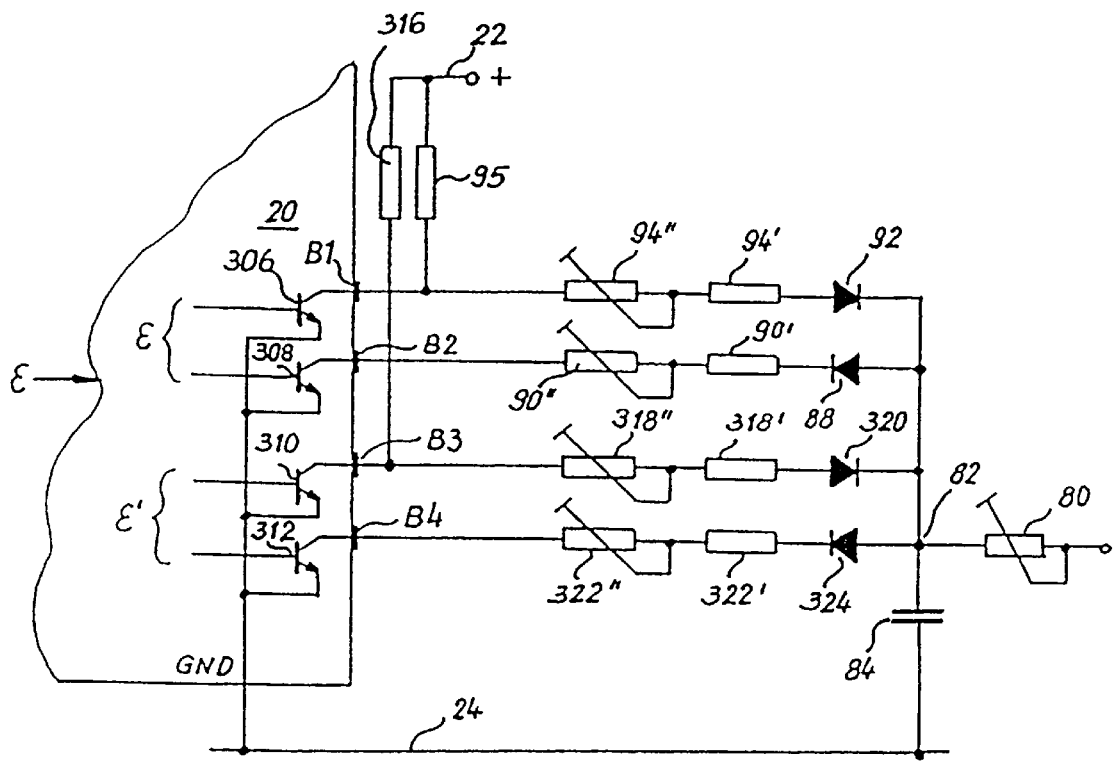
Figure 22:
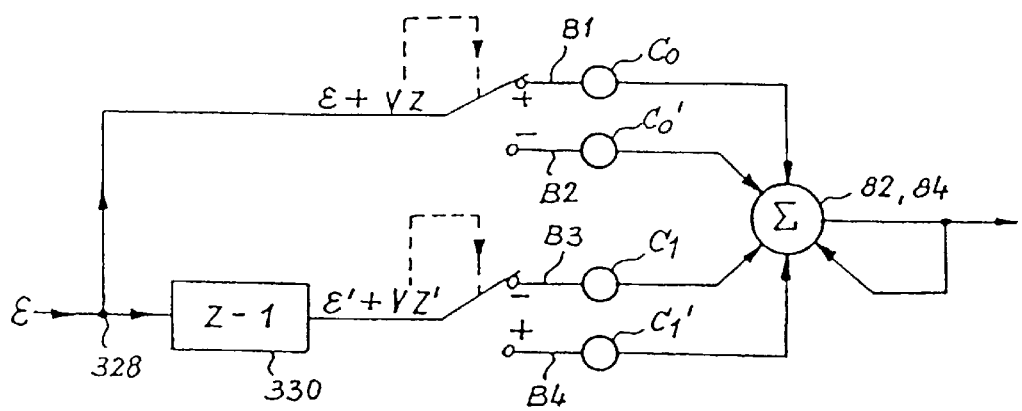
Figure 23:
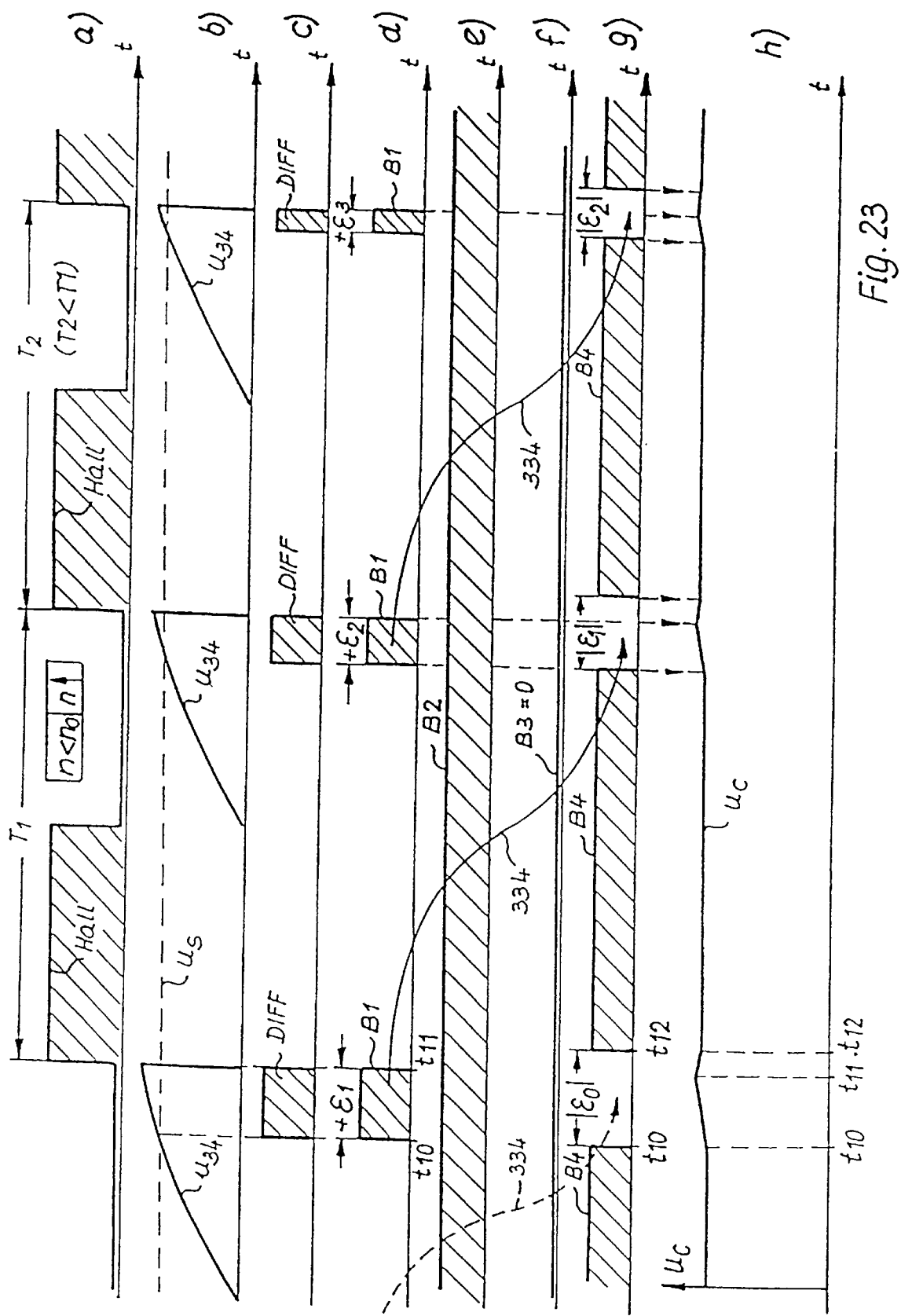
Figures 24, 25:
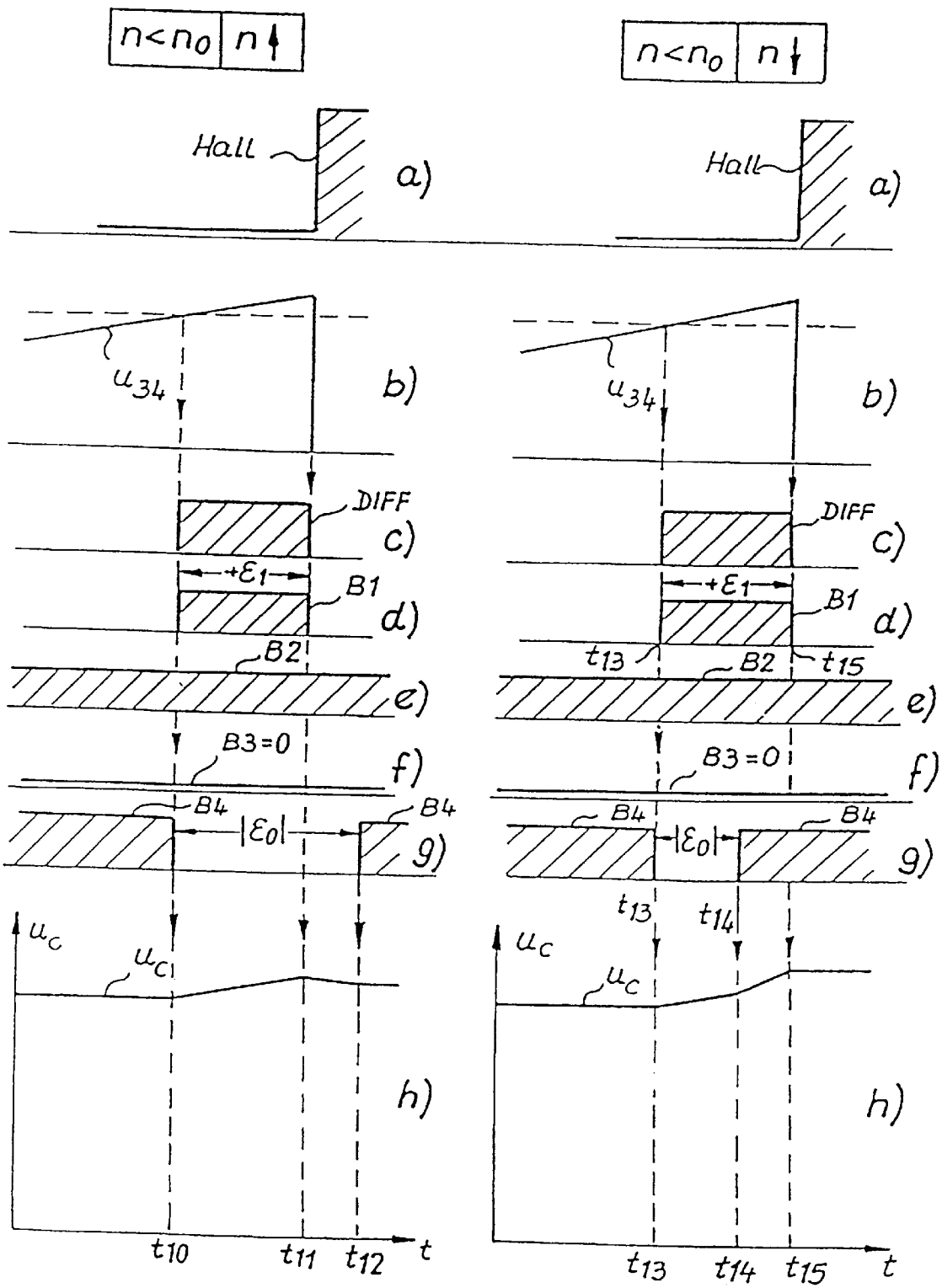
Figure 26:
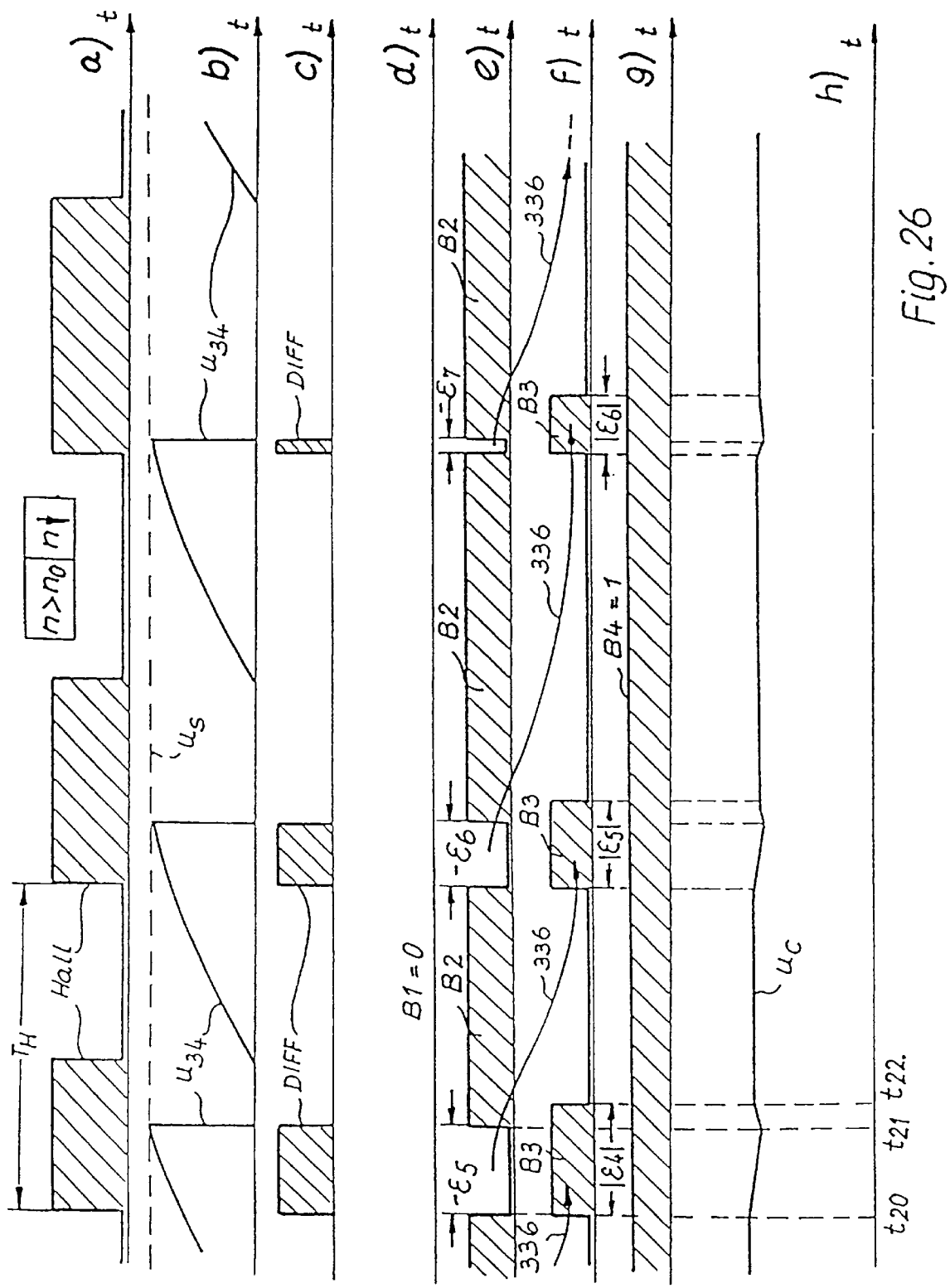
Figure 27:
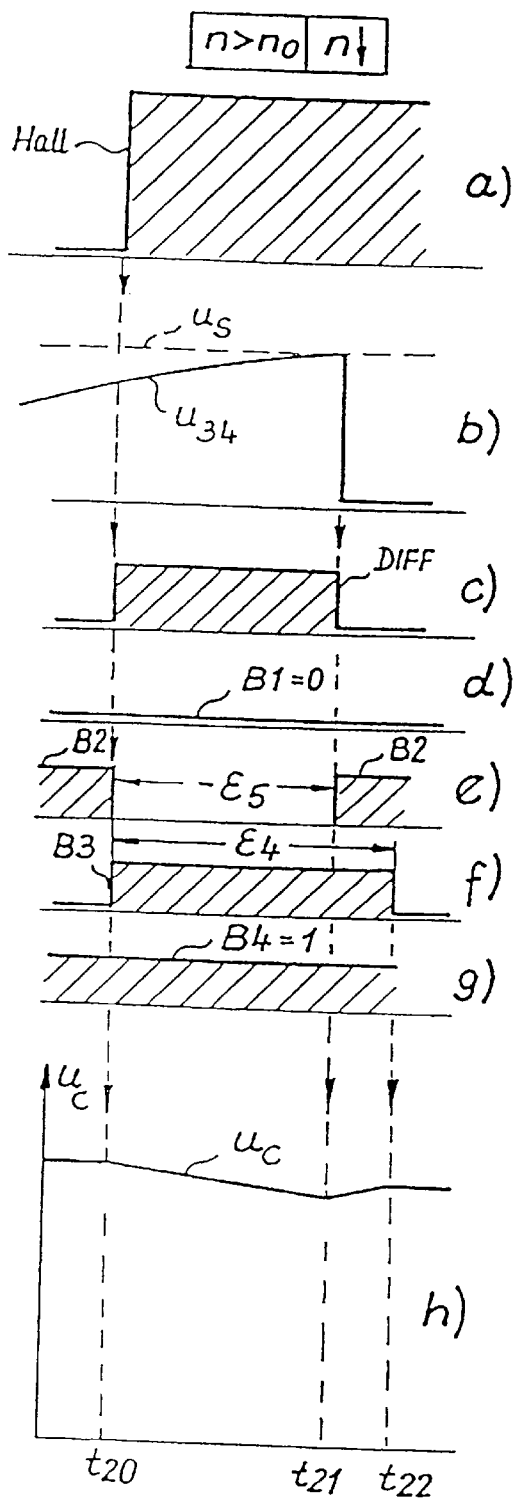
Figure 28:
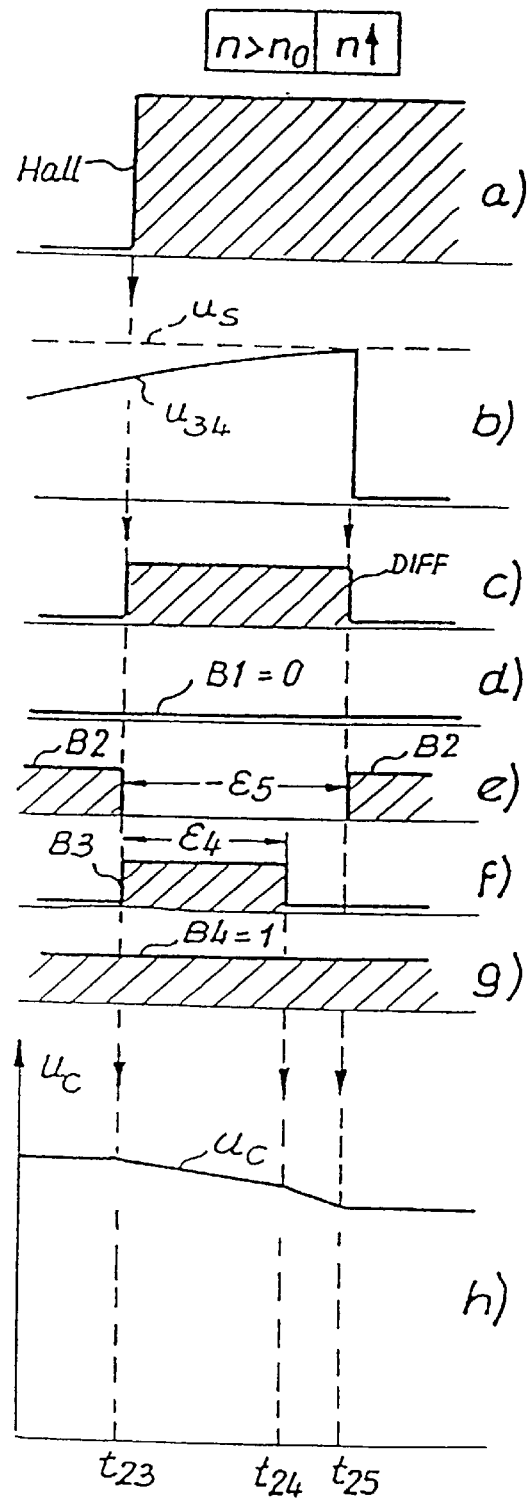
Figure 29:
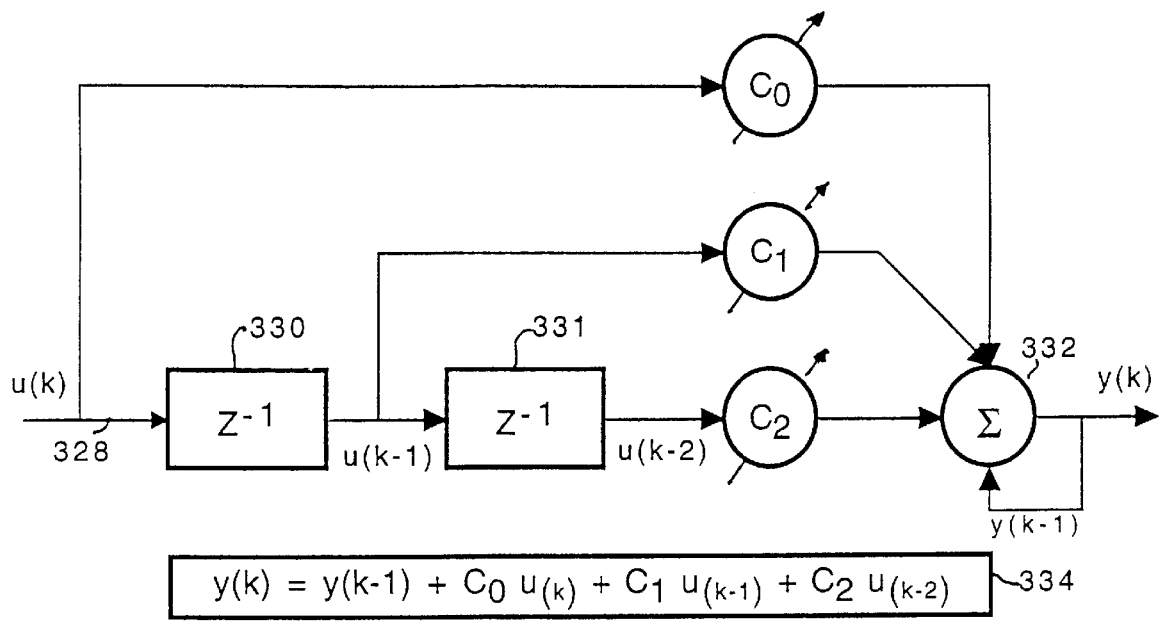
Figure 30:
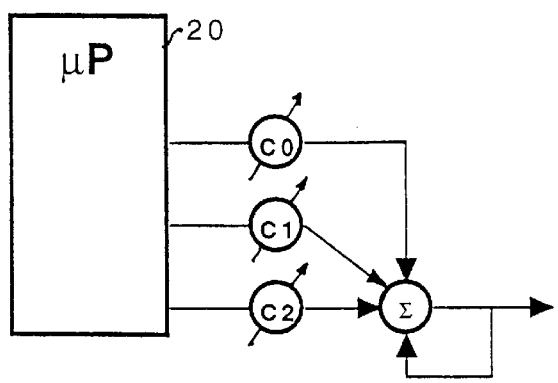
Figure 46:
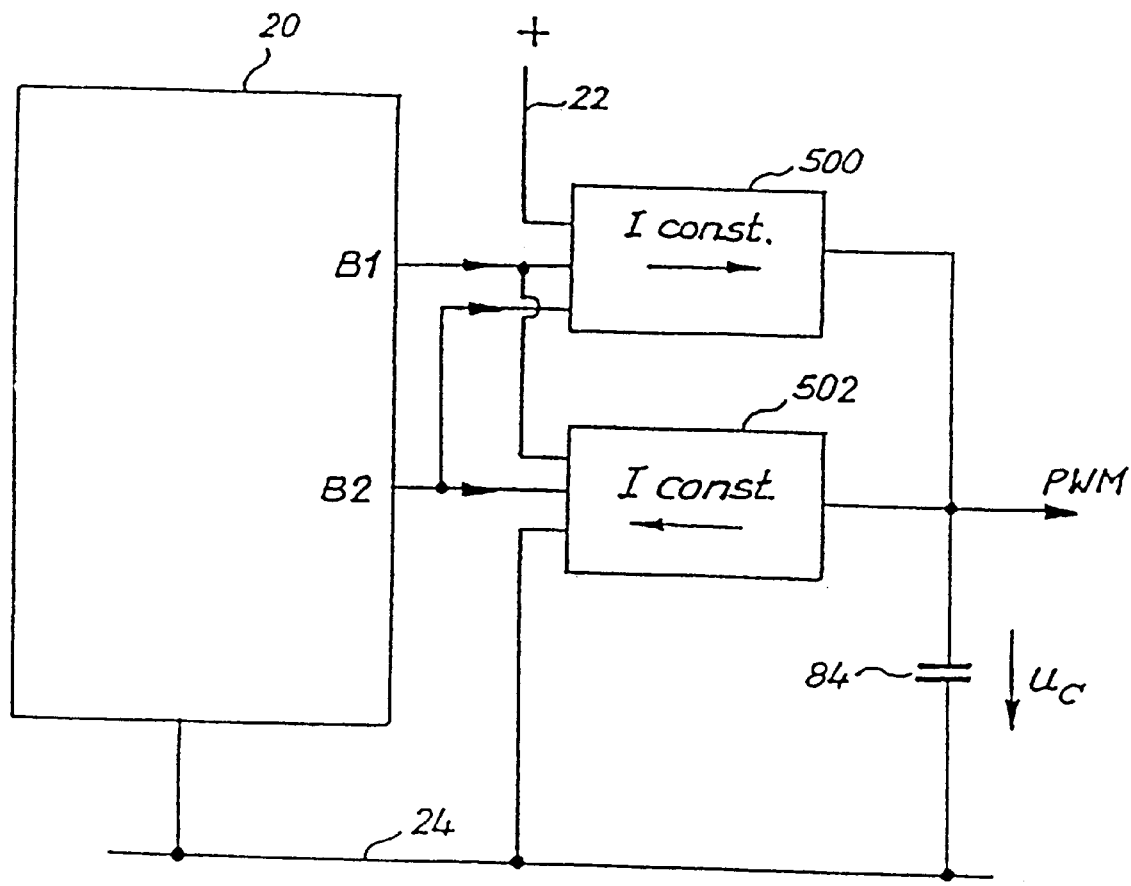

FIG. 46 shows a variation of FIG. 1/FIG. 3/FIG. 18. In the circuit according to FIGS. 3, the charge current through the resistor 94 decreases when the voltage $u_C$ at capacitor 84 increases. Likewise, the discharge current through the resistor 90 decreases when the voltage $u_C$ at capacitor 84 decreases. This causes nonlinearities which can, however, be tolerated in most applications, because during operation, the capacitor 84 is charged to a target voltage $u_{OC}$ which corresponds to the target rotation speed $n_0$, and because in the range of the target voltage these currents do not significantly depend on voltage variations around the value $u_{OC}$.

However, according to FIG. 46, a constant current source 500 can advantageously be used for charging capacitor 84 to avoid potential problems. The constant current source 500 is switched on when B1=B2=1, and switched off when B1=0 and B2=1.

Likewise, a constant current source 502 can be used for discharging capacitor 84 wherein the constant current source 502 is switched on when B1=B2=0, and switched off when B1=0 and B2=1, see table of FIG. 4. A constant amount of charge per unit time is then supplied to capacitor 84 by the constant current source 500 and a constant amount of charge per unit time is likewise removed from the capacitor 84 by the constant current source 502, independent of the magnitude of the voltage $u_C$. This is advantageous in some situations.

Figure 31:
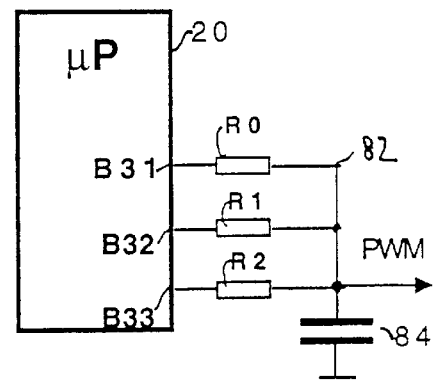
Figures 32, 33:
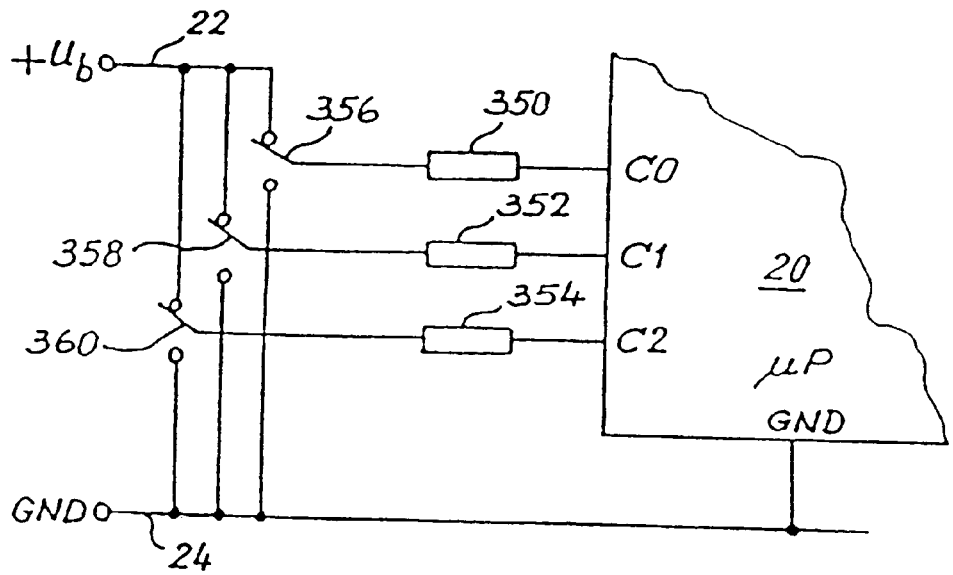
Figure 34:
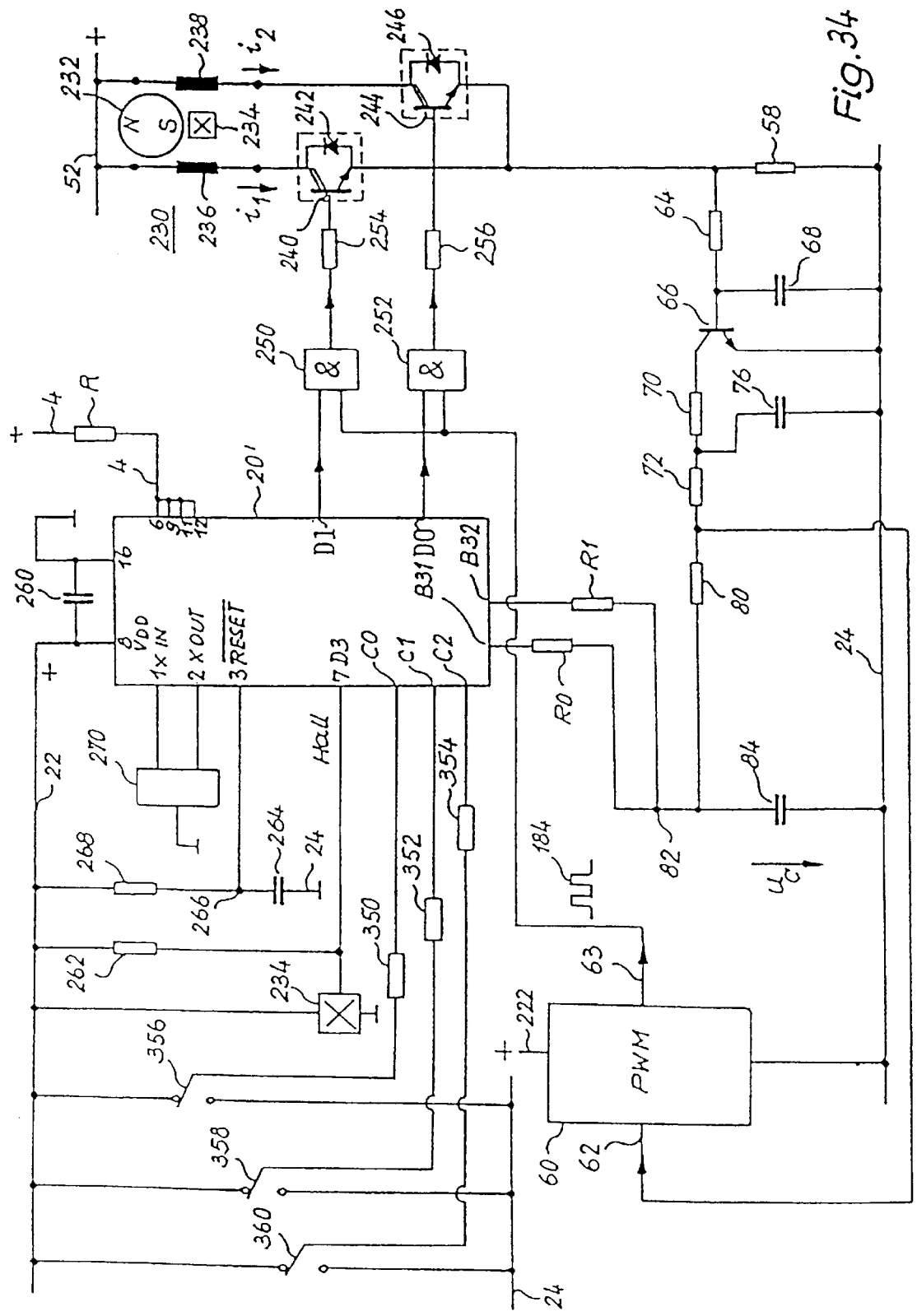
Figure 35:
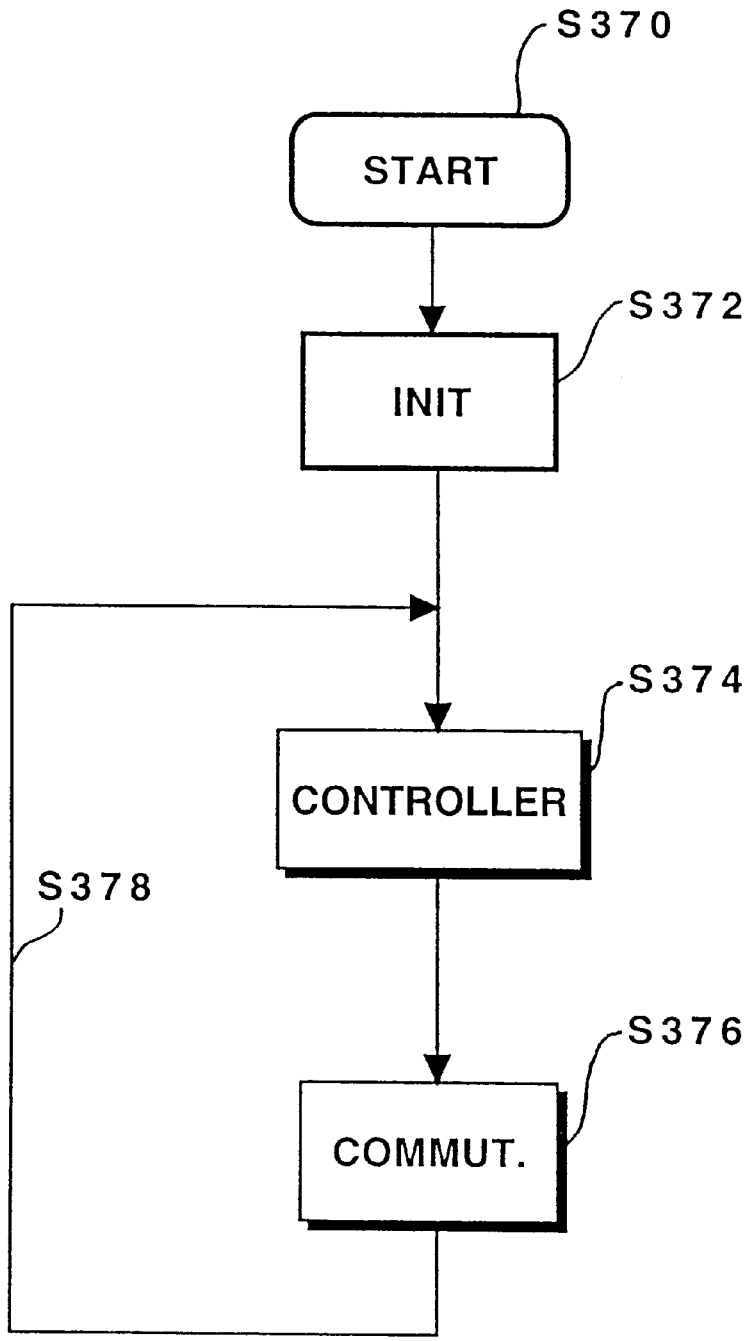
Figure 36:
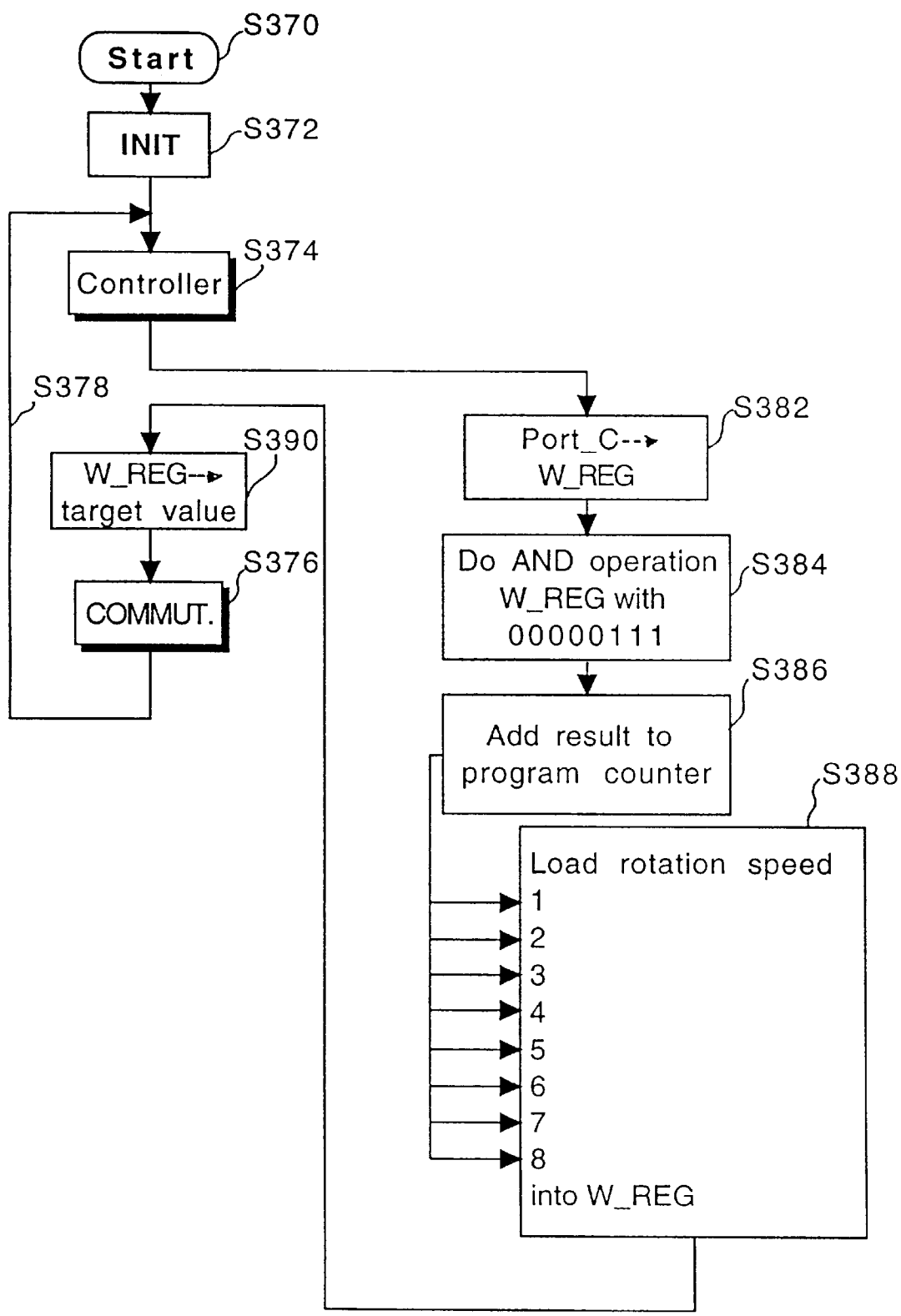
Figure 47:
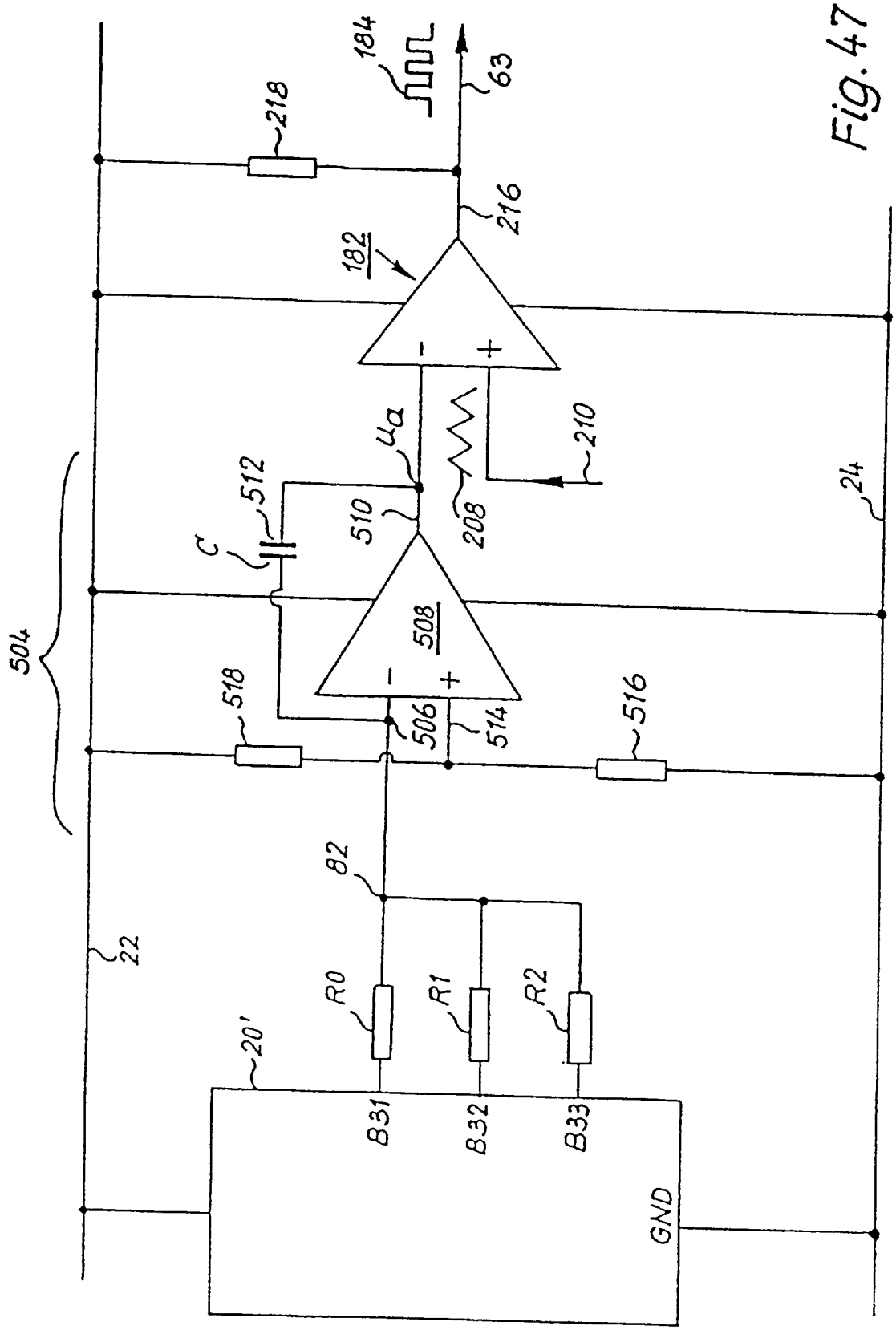

FIG. 47 shows a variation for the memory arrangement, in the form of an integrator 504 with a summing input 506. The node 82 (FIG. 31; FIG. 34) is connected to the summing input 506 of an operational amplifier 508. The output 510 of the operational amplifier 508 is connected via a capacitor 512 (with the value C) to the summing input 506 which is the negative input of the comparator 508. The positive input 514 is connected via a resistor 516 with the negative line 24 and via a resistor 518 with the positive line 22. Both resistors 516, 518 can be identical.

Typical values for the resistors R0, R1 and R2 have already been listed above. Each of the resistors 516 and 518 can have a value of, e.g., 500 kOhm, i.e. when the voltage between positive line 22 and negative line 24 is 5 V, then the +input is at +2.5 V, so that the integrator 504 integrates in both directions. The capacitor 512 can be e.g. 100 nF.

If the port B31 of microprocessor 20' is at the positive potential of the positive line 22, then this circuit integrates the output signal $u_a$ at output 510 with the time constant $R_0C$. The same holds for all the ports B31, B32, B33, i.e. the integration depends on the potentials at these three ports, weighted by the factors R0, R1 and R2. This circuit consequently operates as a memory arrangement, analog to the capacitor 84 of FIG. 34, wherein in this case the voltage at capacitor 512 increases.

Since the voltage $u_a$ at output 510 decreases when the voltage at capacitor 512 increases, the voltage $u_a$ has the inverse curve form as voltage $u_C$ in FIGS. 34.

If one of the ports B31, B32, B33 is at 0 V, then the voltage at capacitor 512 decreases due to the integration process, i.e. the output voltage $u_a$ increases in this case.

Figure 13:
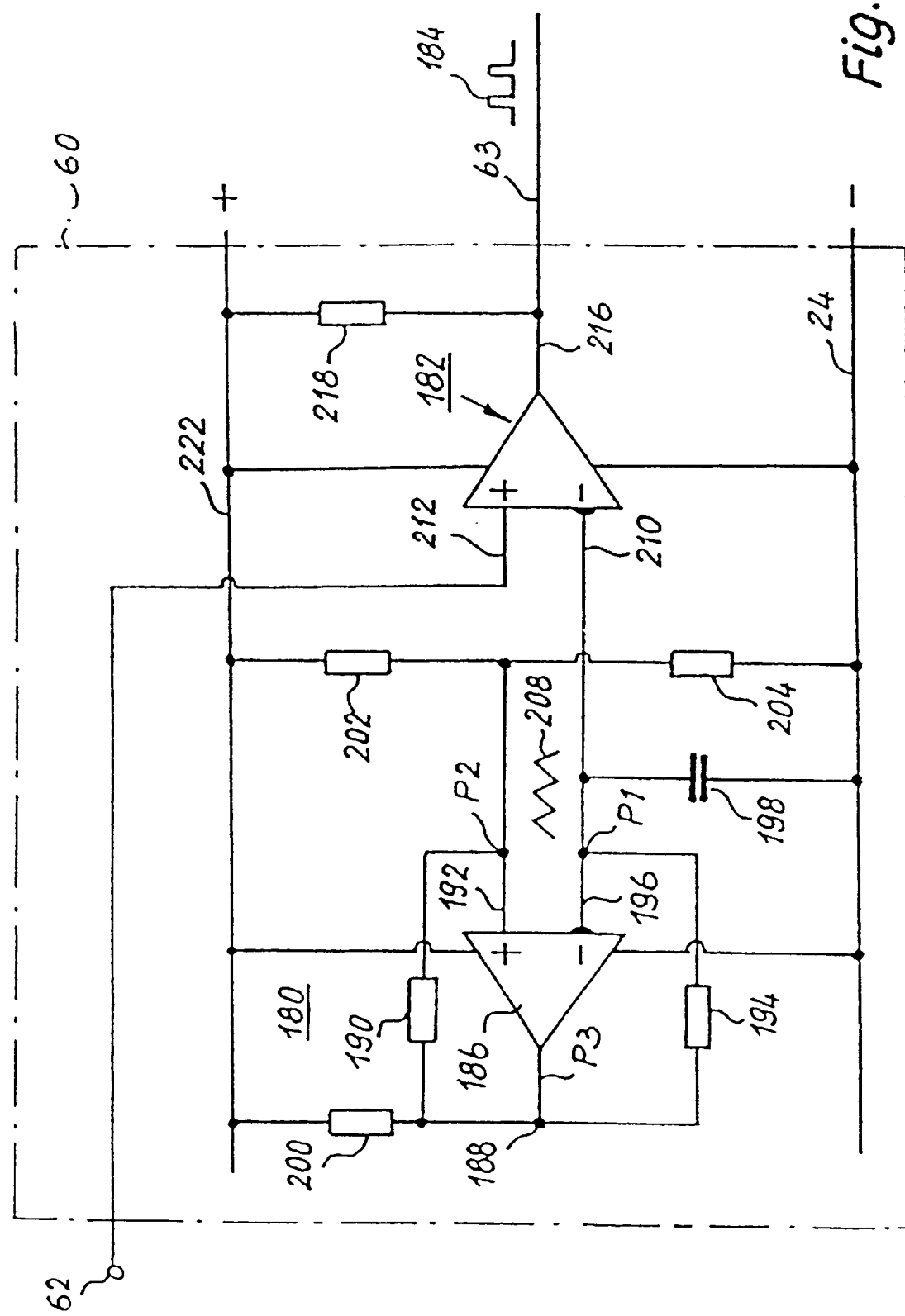
Figure 14:
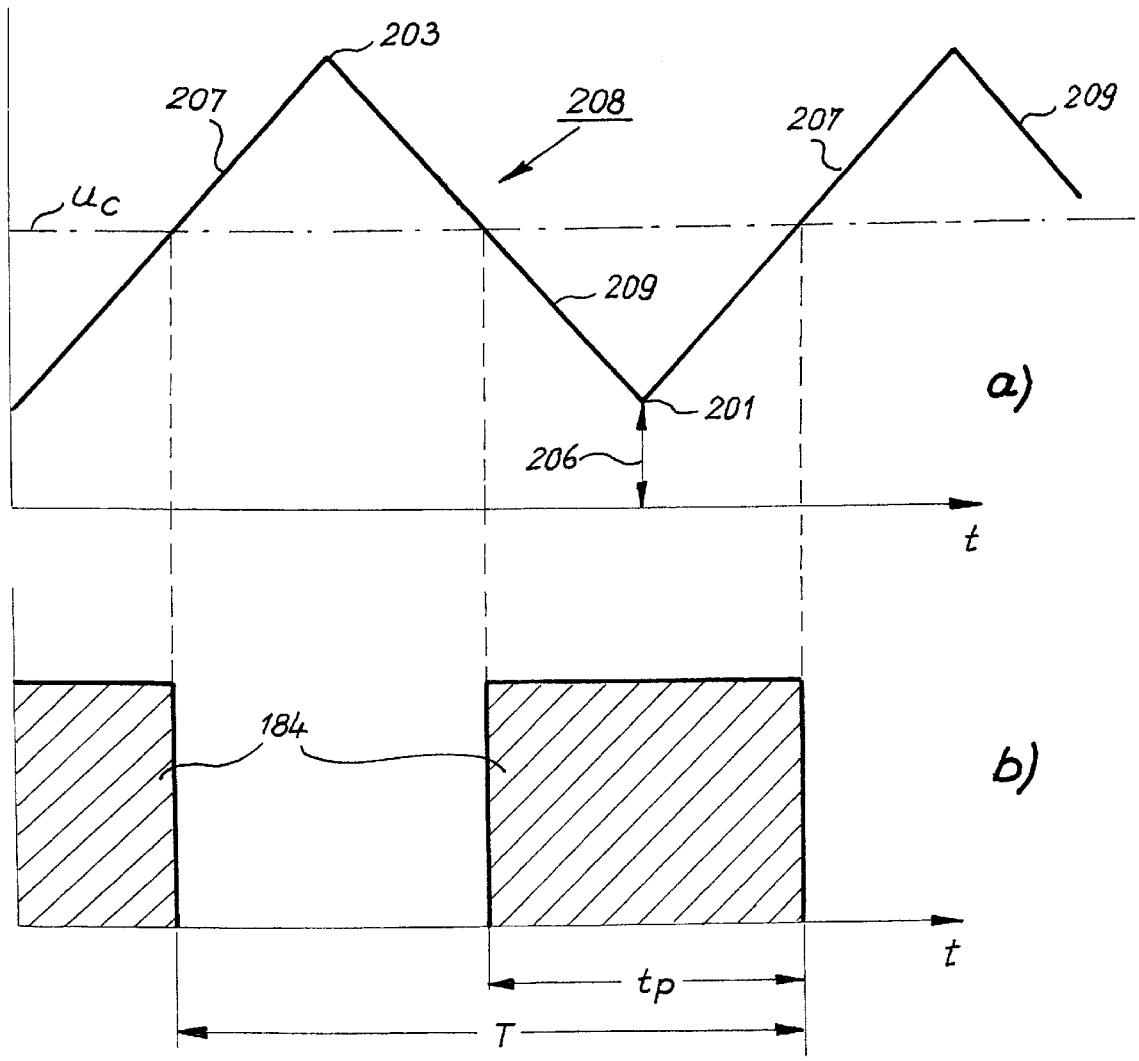

Consequently, in FIG. 13, the output voltage $u_a$ has to be supplied to the negative input of comparator 182, whereas the sawtooth voltage 208 is supplied to the positive input, as illustrated in FIG. 47. The PWM control device 60 then operates in the same manner as described with reference to FIG. 13.

The circuit of FIG. 47 is more accurate than a circuit with capacitor 84 since the integration processes described above take place independent of the voltage at capacitor 512. The costs are practically the same, since operational amplifiers are quite inexpensive.

Of course, many additional different and modified embodiments are feasible within the scope and the spirit of the present invention.

What is claimed is:

1. A method of controlling an actual value of a physical parameter to a target value, comprising the steps of:
    a) repetitively measuring, at time intervals, the deviation or difference of the actual value from the target value, hereinafter referred to as control deviation, and the sign of said difference, hereinafter referred to as control sign;
    b) during or after each measurement, converting said control deviation into at least one electrical signal whose duration, referred to hereinafter as control deviation duration, is proportional to the absolute value of the control deviation, at least in a range near the target value and whose value is a function of the control sign;
    c) controlling a charge on an analog electrical memory element as a function of said at least one electrical signal, during the control deviation duration; and
    d) controlling said physical parameter as a function of said charge of said electrical memory element, thereby keeping the physical parameter within a predetermined desired range adjacent said target value.

2. A method according to claim 1, further comprising
    performing said converting of the control deviation into an electrical signal in a microprocessor (20; 20') and
    generating said electrical signal at at least one output of the microprocessor as a digital or ternary signal, during or after a measurement, during the control deviation duration or during a time proportional to the control deviation duration.

3. A method according to claim 1, wherein said memory element is a capacitor, and said controlling of charge on said analog electrical memory element is performed via a resistor arrangement, by controlling a current flow to or from the capacitor when the electrical signal is present, during the control deviation duration or during a time proportional to the control deviation duration.

4. A method according to claim 1, wherein said step of controlling said physical parameter is performed by controlling the pulse duty cycle (TV) of a Pulse Width Modulation (PWM) control device according to the amount of charge of the memory element, and using the output signal of the PWM control device to directly or indirectly control the physical parameter.

5. A method according to claim 1, further comprising
    performing said measuring and converting steps digitally.

6. A method according to claim 1, wherein said charge-controlling step is executed in an analog fashion.

7. Method according to claim 1, wherein the control deviation (DIFF) is converted into the at least one electrical signal at the same time the control deviation is measured.

8. Method according to claim 1, wherein the control deviation (RGL-DIFF; RGL-DIFF') is converted into the at least one electrical signal subsequent to measurement of the control deviation.

9. Method according to claim 8, wherein the control deviation, before being converted into the at least one electrical signal, is multiplied by a predetermined factor ($C_g$; F).

10. Method according to claim 1, wherein each of the control deviation and the control sign from a measurement preceding the current values are temporarily stored as moving average values and are converted, in addition to the current control deviation (RGL-DIFF), into at least one electrical additional signal whose duration is proportional to the absolute value of this temporarily stored control deviation (RGL-DIFF-Old), at least in a range near the target value, and whose value is a function of the temporarily stored control sign (VZ-S), and wherein the charge of the analog electrical memory element is furthermore affected by this at least one electrical additional signal.

11. Method according to claim 10, wherein an inverse value of temporarily stored control sign (VZ-S) with respect to the sign (VZ) of the current control deviation (RGL-DIFF) is used.

12. Method of controlling a physical parameter to a target value, comprising the following steps:
   a) determining the absolute value and the sign or direction (positive or negative) of the control deviation ($\epsilon$) of the physical parameter measured by taking the deviation between the actual value and the target value of the physical parameter;
   b) converting said control deviation according to a predetermined computing rule into binary or ternary electrical signals;
   c) processing said binary or ternary electrical signals to control currents, to and from an analog electrical memory element; and
   d) controlling said physical parameter as a function of a charge state of said analog electrical memory element, thereby keeping the physical parameter within a predetermined desired range adjacent said target value.

13. Method according to claim 12, wherein said step of controlling currents to and from the analog electrical memory element includes directing said currents through resistors of a predetermined value.

Figure 10:
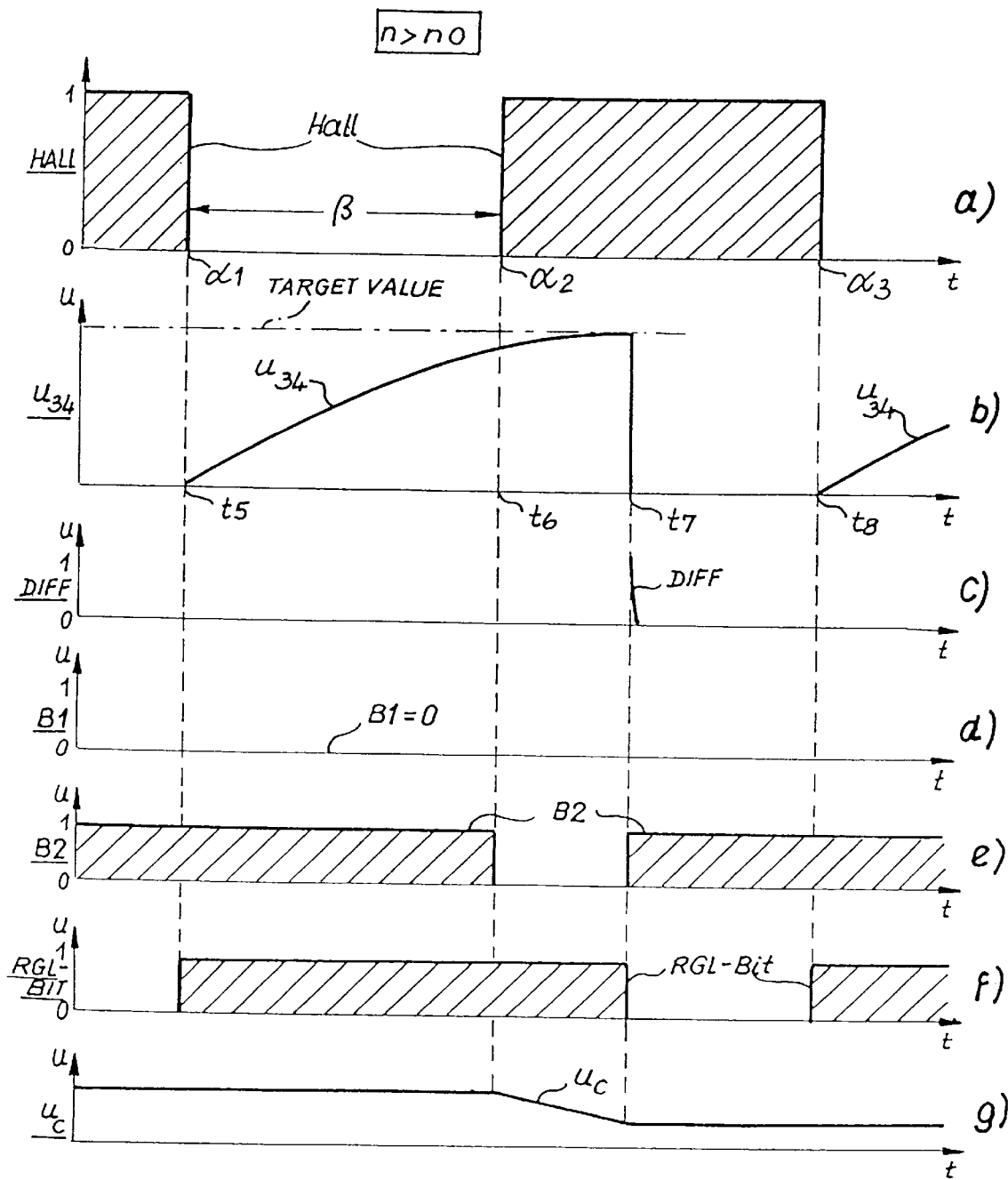
Figure 11:
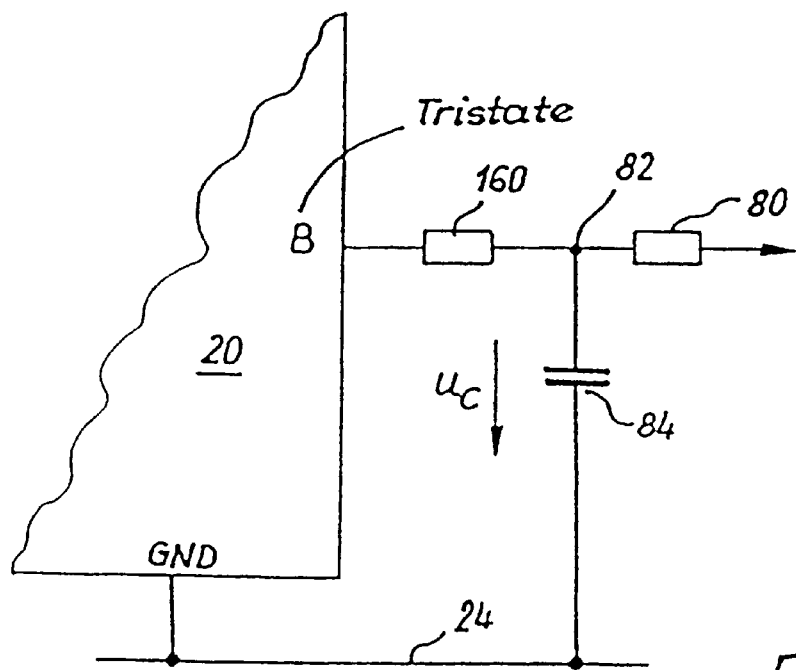
Figure 12:
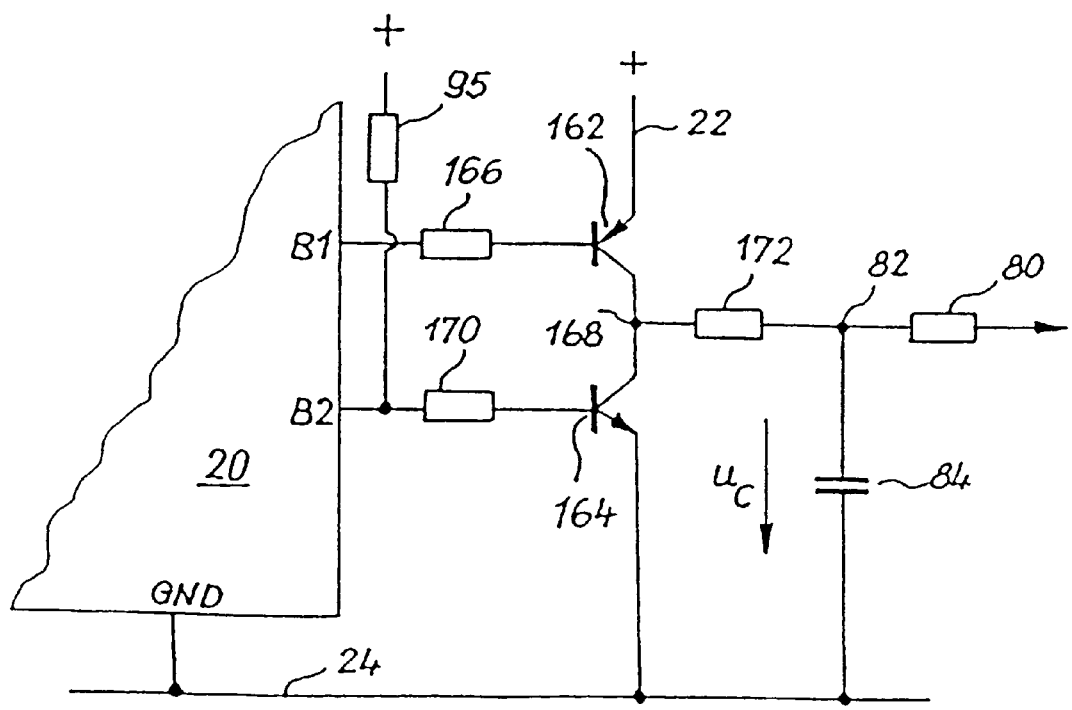
Figure 15:
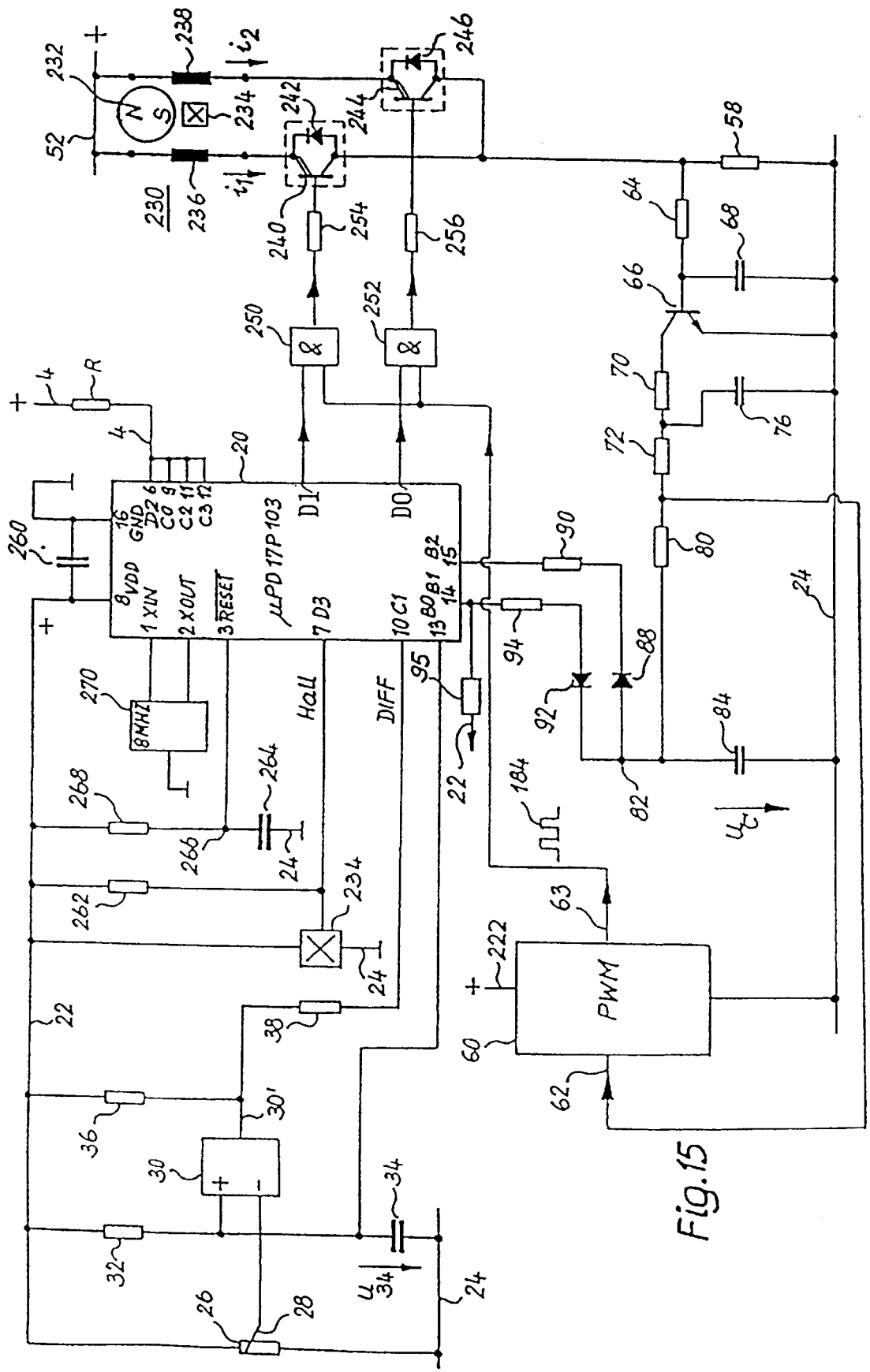
Figure 16:
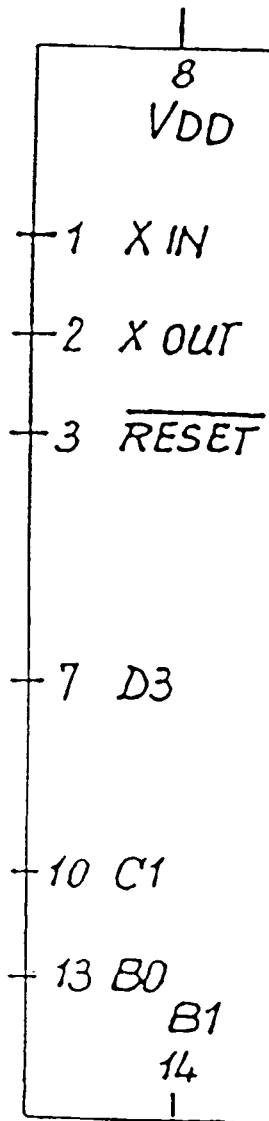
Figure 16:
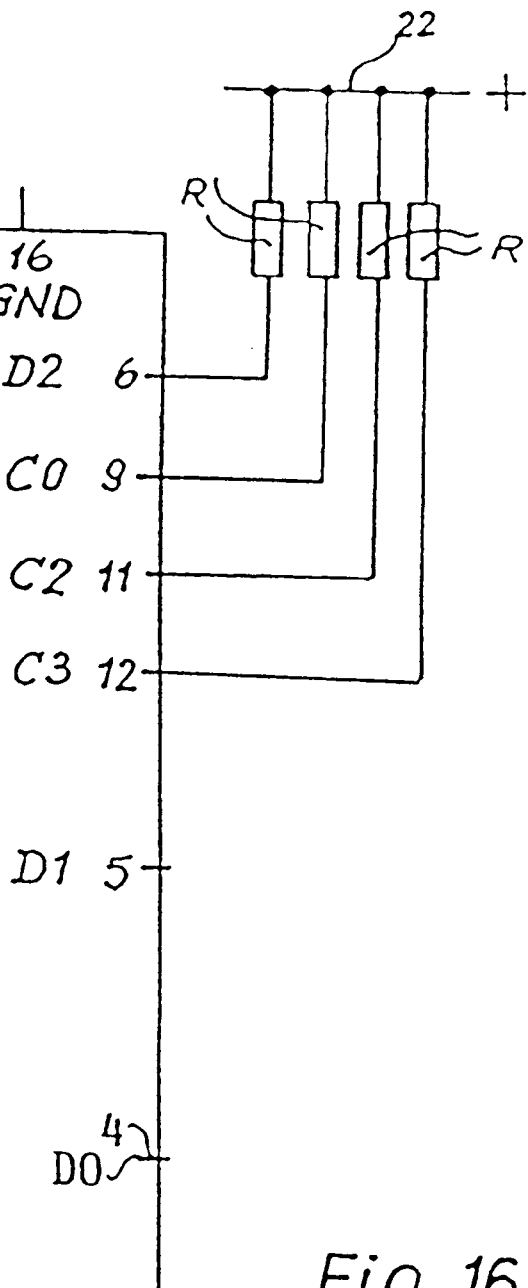
Figure 17:
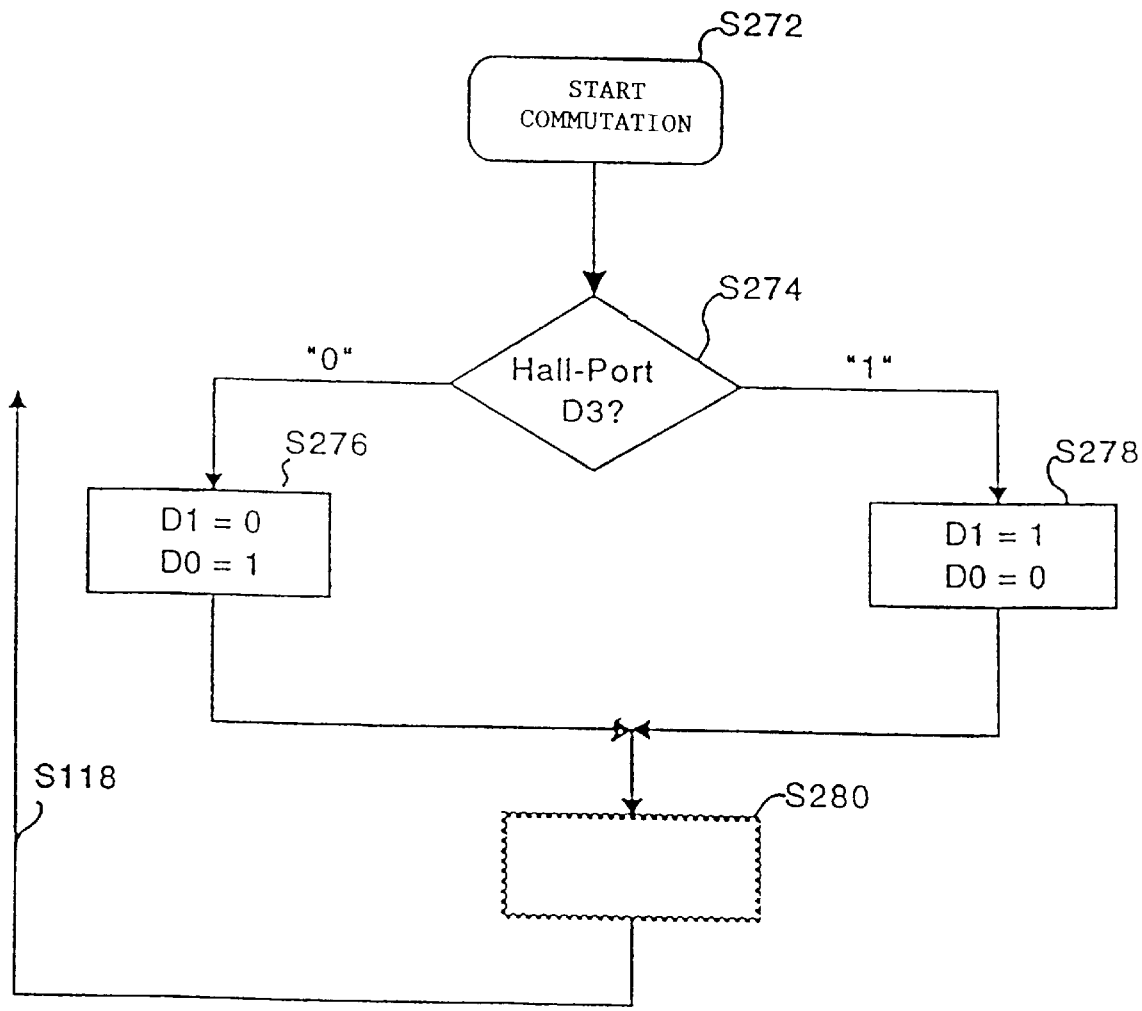

14. Method of controlling the rotation speed of a motor having a rotor and a stator, comprising the steps of,
   a) at a predetermined first angular position (FIG. 10: $\alpha_1$) of the rotor relative to the stator, starting a change, in the charge of a first memory element (34), as a function of time;
   b) determining a measurement instant (FIG. 8; t1; FIG. 10: t7) at which the charge ($u_{34}$) of the first memory element (34) reaches a predetermined value ("target value");
   c) if the measurement instant (FIG. 8: t1) occurs before a second measurement point (FIG. 8: t2) at which the rotor during operation has covered a predetermined angular interval (FIG. 10: $\beta$) relative to the first angular position (FIG. 10; $\alpha_1$), changing the charge of a second memory element (84), as a function of time in a time interval (FIG. 8: t1 to t2) from the measurement instant to the second measurement point, in a predetermined direction;
   d) if the measurement point (FIG. 10; t7) occurs later than the second measurement instant (FIG. 10: t6), changing the charge of a second memory element (84), as a function of time during the time interval between the two measurement instants (FIG. 10: t6 to t7), in a direction opposite to the predetermined direction; and
   e) controlling the amount of energy supplied to the motor per unit time (FIG. 1; FIG. 15) as a function of the value of the charge of the second memory element (84).

15. Method according to claim 14, wherein the energy supplied to the motor comprises a pulsed electrical current (i) and said energy-controlling step is performed using pulse width modulation (PWM) by changing the pulse duty cycle (TV) as a function of the amount of charge on the second memory element (84).

16. Method according to claim 14 wherein the first angular position (FIG. 10: $\alpha_1$) is determined by the change in potential of the output signal of a Hall sensor (FIG. 15: 234) provided on the motor, wherein the change in potential is generated by the transition from a North pole to a South pole or vice versa.

17. Method according to claim 16, wherein the predetermined angular interval ($\beta$) is defined by an essentially constant range of the output voltage of the Hall sensor (234) which follows the first angular position ($\alpha_1$).

18. Method according to claim 15 further comprising controlling current in the motor using a PWM control device (60) capable of adjusting the pulse duty cycle (TV) of the output signal as a function of a control voltage supplied to its input (62), and wherein the control voltage for a pulse duty cycle of 0% is different from zero and has the same sign as control voltages required for non-zero pulse duty cycles.

19. Method according to claim 14, wherein if the measurement instant (FIG. 8: $t_1$) occurs before the second measurement instant (FIG. 8: $t_2$), then the change in charge on the second memory element (84) in the predetermined direction occurs at a first time-dependent rate whose absolute value is larger than the absolute value of a second time-dependent rate at which the changes in the charge occurs, if the measurement instant ($t_7$) occurs after the second measurement instant ($t_6$).

20. Method according to claim 14, further comprising controlling charging and discharging of said first memory element (34) by a microprocessor (20).

21. Method according to claim 20, further comprising controlling charging and discharging of said first memory element (34) and said second memory element (84) by executing in said microprocessor (20) a computer program having a binary decision tree structure.

22. Method according to claim 21, wherein the program, for controlling the charging and discharging of the first and the second memory elements (34,84), has the form of repetitive loops with a short duration which have substantially the same duration, independent of the current branch path of executing the loop.

23. Method according to claim 22, wherein there are provided, in the path of a loop, testing or polling points for polling the charge state of the first memory element (34), which points cause different portions of the program loop to be executed, depending upon the charge state.

24. Method according to claim 20, wherein at least one electrical signal having a duration which is proportional to the absolute value of the control deviation ($\epsilon$), is generated essentially in parallel with determination of the control deviation.

25. Method according to claim 20, wherein the actual value of the parameter to be controlled is obtained, and the value and the sign of the control deviation ($\epsilon$) are determined by comparison with a target value, and wherein subsequently the at least one electrical signal, whose duration is proportional to the absolute value of the control deviation ($\epsilon$), is generated in parallel with determination of the subsequent value of the actual value.

26. Arrangement for carrying out a method of controlling a physical parameter to a predetermined target value by repetitively measuring, at time intervals, the deviation or difference of the actual value from the target value and the sign of said difference, hereinafter "control sign," converting said control deviation into an electrical signal whose duration, hereinafter referred to as control deviation duration, is proportional to the absolute value of said control deviation and whose value is a function of the control sign, controlling, during said control signal deviation, a charge on an analog electrical memory element as a function of said electrical signal, and controlling said physical parameter as a function of said charge on said electrical memory element, comprising a microprocessor (20, 20'), wherein, during operation, there is executed in the microprocessor (20, 20') a program for converting a control deviation (ε) with a given value and sign into at least one electrical signal at at least one output (B1, B2; B31, B32) of said microprocessor, the duration of the electrical signal being proportional to the absolute value and wherein the magnitude of the electrical signal has a discrete electrical value which depends on the sign.

27. Arrangement according to claim 26, wherein the at least one output of said microprocessor is connected via an ohmic resistor (FIG. 43: R0, R1, R2), to a memory element (84; 504).

28. Arrangement according to claim 27, wherein several outputs (FIGS. 31 and 43: B31, B32, B33) are provided, each associated with a separate ohmic resistor (R0, R1, R2), for connection to the memory element (84; 504).

29. Arrangement according claim 27, wherein the ohmic resistors (FIG. 21: 90", 94", 318", 322") are at least partially adjustable.

30. Arrangement according to claim 28, wherein the resistors (R0, R1, R2) which are connected to a plurality of outputs, are connected to each other and via a common resistor (FIG. 43: $R_g$) to the memory element (84; 504).

31. Arrangement according to claim 30, wherein the common resistor (FIG. 43: $R_g$) is adjustable for adjusting several control parameters simultaneously.

32. Arrangement according to claim 26, wherein the microprocessor (20; 20') comprises two outputs (FIG. 3: B1, B2) which can be switched by the program between LOW and HIGH impedance, and wherein both outputs are connected to the memory element (84; 504) via a diode (88, 92) connected in series with an impedance (90, 94), the diodes (88,92) being polarized in opposite directions and one of the outputs being connected to a voltage source via an impedance (95).

33. Arrangement according to claim 32, wherein the impedances (90, 94) have different values for generating different time constants for charging and discharging the memory element (84; 504).

34. Arrangement according to claim 32, wherein the memory element is an integrator (504).

35. Arrangement according to claim 34, wherein the integrator (504) comprises an operational amplifier (508) and wherein a capacitor (512) is disposed between the output (510) and an input (506) of the operational amplifier (508).

36. Arrangement according to claim 26, wherein the impedance is a constant current device (FIG. 46: 500, 502).

37. Motor for carrying out a method of controlling a physical parameter to a predetermined target value by repetitively measuring, at time intervals, the difference between the target value and the actual value, hereinafter "control deviation," and the sign of said difference, hereinafter "control sign," converting said control deviation into an electrical signal whose duration, hereinafter referred to as control deviation duration, is proportional to the absolute value of said control deviation and whose value is a function of the control sign, controlling, during said control signal deviation, a charge on an analog electrical memory element as a function of said electrical signal, and controlling said physical parameter as a function of said charge on said electrical memory element, comprising a microprocessor (20; 20'), wherein the output signals (B1, B2) of the microprocessor (20; 20') control the change in the charge of a second memory element (84; 504).

38. Motor according to claim 37, wherein the microprocessor (20; 20') comprises two outputs (B1, B2) and each of the outputs is switchable between the logical values "1" and "0".

39. Motor according to claim 38, wherein to each output (B1, B2) there are connected, in series, a resistor and a diode (94, 92; and 90, 88, respectively), each of the respective resistors and diodes connected in series being connected to the second memory element (84; 504) and the forward directions of the two diodes (88, 92) being opposite.

40. Motor according to claim 39, wherein the resistors (90,94) have different values.

41. Motor according to claim 40, further comprising a circuit controlling the rotation speed, wherein a first one (94) of said resistors which is associated with the change in the charge of the second memory element (84; 504) when the rotation speed is too low, is smaller than the other (90) of said resistors.

42. Motor according to claim 37, wherein the second memory element is a capacitor (84) and wherein the voltage of the capacitor (84) is supplied to the input (62) of a pulse width modulation (PWM) controller (60) via an adjustable high impedance resistor (80), said input (62) being connected via a resistor (72, 70, 66) variable as a function of the motor current (i; i1, i2) to a potential which causes the pulse duty cycle (TV) of the PWM control device (60) to decrease, when a current flows from the input (62) of the PWM control device (60) via the variable resistor (66, 70, 72) to this potential.

43. Motor according to claim 42, wherein the PWM controller (60) comprises a sawtooth generator (180) and a comparator (182), wherein a sawtooth voltage (208) is supplied by the sawtooth generator (180) to one input of the comparator (182), and an input signal is supplied to the other input of the comparator (182) by the second memory element (84; 504).

44. Motor according to claim 43, wherein the sawtooth signal (208) of the sawtooth generator (180) oscillates between a minimum value which is different from zero, and a maximum value which is different from zero.

45. Motor according to claim 43, wherein the sawtooth generator (180) comprises a comparator (186), the output (188) of the comparator (186) being connected to the negative input (196) via a negative feedback (194) and to the positive input (192) via a positive feedback (190), and wherein a storage capacitor (198) is associated with the negative input (196).

46. Motor according to claim 42, wherein there is provided at least one filter (70, 72, 76) between a current measurement device (58) for the motor current (i) and the input (62) of the PWM controller (60).

47. Motor according to claim 46, wherein the at least one filter is a T-filter (70, 72, 76).

* * * * *

UNITED STATES PATENT AND TRADEMARK OFFICE
CERTIFICATE OF CORRECTION

PATENT NO. : 6,091,887
DATED : July 18, 2000
INVENTOR(S) : Dieterle et al.

It is certified that error appears in the above-identified patent and that said Letters Patent is hereby corrected as shown below:

INID Under Foreign Patent Documents,
p. 2, after "31 15 243" the date "4/1982" should be -- 3/1982 --.

Column 8,
Line 16, "1" should be -- 0 --.

Column 9,
Line 67, "$U_{34}$" should be -- $u_{34}$ --.

Column 11,
Line 31, "a" should be deleted.

Column 16,
Line 25, "1" should be -- o --.

Column 18,
Line 66, "$\in$" should be -- $\in$' -- .

Column 19,
Line 12, "322'" should be -- 322" --.

Column 22,
Line 31, "C" should be -- C1 --.

Column 25,
Line 4, "$V_z$" should be -- VZ --.

Column 25,
Line 8, "1'" should be -- 1 --.

UNITED STATES PATENT AND TRADEMARK OFFICE
CERTIFICATE OF CORRECTION

PATENT NO. : 6,091,887
DATED : July 18, 2000
INVENTOR(S) : Dieterle et al.

It is certified that error appears in the above-identified patent and that said Letters Patent is hereby corrected as shown below:

Column 31, claims 14,
Line 2, "," should be -- : --.

Column 33, claim 37,
Lines 53, and 54, "the difference between the target value and the actual value" should be -- the deviation or difference the actual value from the target value --.
Lines 55, and 56, delete quotes before and after "control sign".

Column 34, claim 38,
Lines 8 and 9, delete quotes before and after "1" and "0".

Signed and Sealed this

Twenty-fifth Day of September, 2001

Attest:

NICHOLAS P. GODICI
Attesting Officer
Acting Director of the United States Patent and Trademark Office